(12) United States Patent
Hoffa et al.

(10) Patent No.: US 10,713,448 B2
(45) Date of Patent: Jul. 14, 2020

(54) CONFIGURING SIGNAL DEVICES IN THERMAL PROCESSING SYSTEMS

(71) Applicant: Hypertherm, Inc., Hanover, NH (US)

(72) Inventors: Michael Hoffa, Lebanon, NH (US); E. Michael Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 16/425,197

(22) Filed: May 29, 2019

(65) Prior Publication Data

US 2019/0303629 A1    Oct. 3, 2019

Related U.S. Application Data

(60) Continuation of application No. 15/863,402, filed on Jan. 5, 2018, now Pat. No. 10,346,647, which is a
(Continued)

(51) Int. Cl.
*B23K 10/02* (2006.01)
*G06K 7/10* (2006.01)
(Continued)

(52) U.S. Cl.
CPC ........... *G06K 7/10019* (2013.01); *B23K 5/00* (2013.01); *B23K 7/10* (2013.01); *B23K 10/006* (2013.01);
(Continued)

(58) Field of Classification Search
None
See application file for complete search history.

(56) References Cited

U.S. PATENT DOCUMENTS

| 2,985,050 A | 5/1961 | Schwacha |
| 3,010,012 A | 11/1961 | Tuthill |

(Continued)

FOREIGN PATENT DOCUMENTS

| CA | 2439213 C | 10/2006 |
| EP | 508482 A2 | 10/1992 |

(Continued)

OTHER PUBLICATIONS

Examination Report for corresponding Australian Patent Application No. 2013243978, dated Nov. 17, 2015, 4 pages.
(Continued)

*Primary Examiner* — Brent Swarthout
(74) *Attorney, Agent, or Firm* — Proskauer Rose LLP

(57) ABSTRACT

In some aspects, material processing head can include a body; an antenna disposed within the body; a first tag, associated with a first consumable component, disposed within a flux communication zone of the body at a first distance from the antenna, the first tag having a first resonant frequency; and a second tag, associated with a second consumable component, disposed within the flux communication zone of the body at a second distance from the antenna, the second tag having a second resonant frequency that is different than the first resonant frequency, where the first and second resonant frequencies are tuned based upon at least one of: i) a difference between the first distance and the second distance; or ii) a characteristic (e.g., shape) of the flux communication zone in which the first tag and/or the second tag is disposed.

14 Claims, 20 Drawing Sheets

Related U.S. Application Data division of application No. 14/807,679, filed on Jul. 23, 2015, now abandoned, which is a continuation-in-part of application No. 14/589,270, filed on Jan. 5, 2015, now Pat. No. 9,395,715, which is a continuation-in-part of application No. 14/135,714, filed on Dec. 20, 2013, now Pat. No. 9,144,882, which is a continuation-in-part of application No. 14/075,692, filed on Nov. 8, 2013, now abandoned, which is a continuation-in-part of application No. 13/439,259, filed on Apr. 4, 2012, said application No. 14/135,714 is a continuation-in-part of application No. 13/838,919, filed on Mar. 15, 2013, which is a continuation-in-part of application No. 13/560,059, filed on Jul. 27, 2012, now abandoned, which is a continuation-in-part of application No. 13/439,259, filed on Apr. 4, 2012.

(60) Provisional application No. 62/028,065, filed on Jul. 23, 2014.

(51) Int. Cl.

| | |
|---|---|
| *B23K 26/21* | (2014.01) |
| *B23K 5/00* | (2006.01) |
| *B23K 7/10* | (2006.01) |
| *B23K 10/00* | (2006.01) |
| *B24C 1/04* | (2006.01) |
| *B23K 26/38* | (2014.01) |
| *B26F 3/00* | (2006.01) |
| *H05H 1/34* | (2006.01) |
| *G05B 19/18* | (2006.01) |
| *B26D 5/00* | (2006.01) |
| *B23K 101/18* | (2006.01) |
| *B23K 103/04* | (2006.01) |

(52) U.S. Cl.
CPC .............. *B23K 10/02* (2013.01); *B23K 26/21* (2015.10); *B23K 26/38* (2013.01); *B24C 1/045* (2013.01); *B26F 3/004* (2013.01); *G05B 19/182* (2013.01); *G06K 7/10316* (2013.01); *H05H 1/34* (2013.01); *B23K 2101/18* (2018.08); *B23K 2103/04* (2018.08); *B26D 5/00* (2013.01); *G05B 2219/45041* (2013.01); *G05B 2219/49001* (2013.01); *H05H 2001/3473* (2013.01); *H05H 2001/3489* (2013.01); *H05H 2001/3494* (2013.01)

(56) References Cited

U.S. PATENT DOCUMENTS

| | | |
|---|---|---|
| 3,018,360 A | 1/1962 | Engel |
| 3,518,401 A | 6/1970 | Mathews |
| 3,602,683 A | 8/1971 | Hishida et al. |
| 4,125,754 A | 11/1978 | Wasserman et al. |
| 4,497,029 A | 1/1985 | Kiyokawa |
| 4,519,835 A | 5/1985 | Gauvin et al. |
| 4,588,880 A | 5/1986 | Hesser |
| 4,733,052 A | 3/1988 | Nilsson et al. |
| 4,742,470 A | 5/1988 | Juengel |
| 4,929,811 A | 5/1990 | Blankenship |
| 5,018,670 A | 5/1991 | Chalmers |
| 5,050,106 A | 9/1991 | Yamamato et al. |
| 5,086,655 A | 2/1992 | Fredericks et al. |
| 5,099,226 A | 3/1992 | Andrews |
| 5,248,867 A | 9/1993 | Ohba et al. |
| 5,309,683 A | 5/1994 | Hockett |
| 5,357,076 A | 10/1994 | Blankenship |
| 5,381,487 A | 1/1995 | Shamos |
| 5,388,965 A | 2/1995 | Fehn |
| 5,390,964 A | 2/1995 | Gray, Jr. |
| 5,400,389 A | 3/1995 | Niiyama et al. |
| 5,440,477 A | 8/1995 | Rohrberg et al. |
| 5,500,512 A | 3/1996 | Goldblatt |
| 5,556,562 A | 9/1996 | Sorenson |
| 5,653,264 A | 8/1997 | Atkinson |
| 5,717,187 A | 2/1998 | Rogozinski et al. |
| 5,860,849 A | 1/1999 | Miller |
| 5,994,663 A | 11/1999 | Lu |
| 6,047,579 A | 4/2000 | Schmitz |
| 6,130,407 A | 10/2000 | Villafuerte |
| 6,133,542 A | 10/2000 | Dvorak et al. |
| 6,201,207 B1 | 3/2001 | Maruyama et al. |
| 6,248,975 B1 | 6/2001 | Lanouette et al. |
| 6,259,059 B1 | 7/2001 | Hsu |
| 6,267,291 B1 | 7/2001 | Blankenship et al. |
| 6,326,583 B1 | 12/2001 | Hardwick et al. |
| 6,409,476 B2 | 6/2002 | Mills |
| 6,479,793 B1 | 11/2002 | Wittmann et al. |
| 6,510,984 B2 | 1/2003 | Blankenship et al. |
| 6,539,813 B1 | 4/2003 | Horiuchi et al. |
| 6,563,085 B2 | 5/2003 | Lanouette et al. |
| 6,657,162 B1 | 12/2003 | Jung et al. |
| 6,659,098 B1 | 12/2003 | Sekiya |
| 6,693,252 B2 | 2/2004 | Zhang et al. |
| 6,707,304 B2 | 3/2004 | Buhler et al. |
| 6,717,096 B2 | 4/2004 | Hewett et al. |
| 6,729,468 B1 | 5/2004 | Dobmeier |
| 6,772,040 B1 | 8/2004 | Picard et al. |
| 6,781,085 B2 | 8/2004 | Ulrich et al. |
| 6,836,698 B2 | 12/2004 | Fujishima et al. |
| 6,852,949 B2 | 2/2005 | Lanouette et al. |
| 6,933,462 B2 | 8/2005 | Iriyama et al. |
| 6,960,737 B2 | 11/2005 | Tatham |
| 6,980,704 B2 | 12/2005 | Kia et al. |
| 6,992,262 B2 | 1/2006 | Matus et al. |
| 6,995,545 B2 | 2/2006 | Tracy et al. |
| 7,030,337 B2 | 4/2006 | Baker et al. |
| 7,032,814 B2 | 4/2006 | Blankenship |
| 7,115,833 B2 | 10/2006 | Higgins et al. |
| 7,186,944 B2 | 3/2007 | Matus et al. |
| 7,307,533 B2 | 12/2007 | Ishii |
| 7,358,458 B2 | 4/2008 | Daniel |
| 7,375,302 B2 | 5/2008 | Twarog et al. |
| 7,411,154 B2 | 8/2008 | Fosbinder et al. |
| 7,645,960 B2 | 1/2010 | Stava |
| 7,671,294 B2 | 3/2010 | Belashchenko et al. |
| 7,680,625 B2 | 3/2010 | Trowbridge et al. |
| 7,755,484 B2 | 7/2010 | Cullen et al. |
| 7,843,334 B2 | 11/2010 | Kumagai et al. |
| 8,035,487 B2 | 10/2011 | Malackowski |
| 8,085,150 B2 | 12/2011 | Oberle |
| 8,141,240 B2 | 3/2012 | Hiew et al. |
| 8,203,095 B2 | 6/2012 | Storm et al. |
| 8,204,618 B2 | 6/2012 | Young, Jr. et al. |
| 8,242,907 B2 | 8/2012 | Butler et al. |
| 8,263,896 B2 | 9/2012 | Schneider |
| 8,272,794 B2 | 9/2012 | Silchenstedt et al. |
| 8,278,588 B2 | 10/2012 | Salsich et al. |
| 8,316,742 B2 | 11/2012 | Craig |
| 8,373,084 B2 | 2/2013 | Salsich |
| 8,376,671 B2 | 2/2013 | Kaneko |
| 8,395,076 B2 | 3/2013 | Matus |
| 8,431,862 B2 | 4/2013 | Kachline |
| 8,620,738 B2 | 12/2013 | Fordyce, III et al. |
| 8,658,941 B2 | 2/2014 | Albrecht |
| 8,686,318 B2 | 4/2014 | Albrecht |
| 8,748,776 B2 | 6/2014 | Albrecht |
| 8,759,715 B2 | 6/2014 | Narayanan et al. |
| 8,766,132 B2 | 7/2014 | Blankenship et al. |
| 8,859,828 B2 | 10/2014 | Liu et al. |
| 8,859,928 B2 | 10/2014 | Sommerfeld |
| 9,031,683 B2 | 5/2015 | Elfstrom et al. |
| 9,129,330 B2 | 9/2015 | Albrecht et al. |
| 9,229,436 B2 | 1/2016 | Stumpfl et al. |
| 9,233,480 B2 | 1/2016 | Nagai et al. |
| 2002/0117484 A1 | 8/2002 | Jones et al. |
| 2002/0194064 A1 | 12/2002 | Parry et al. |
| 2003/0025598 A1 | 2/2003 | Wolf et al. |
| 2003/0094487 A1 | 5/2003 | Blankenship et al. |

(56) References Cited

U.S. PATENT DOCUMENTS

| | | |
|---|---|---|
| 2003/0148709 A1 | 8/2003 | Anand et al. |
| 2004/0031776 A1 | 2/2004 | Gevelber et al. |
| 2004/0106101 A1 | 6/2004 | Evans |
| 2004/0193307 A1 | 9/2004 | Fujishima et al. |
| 2005/0045599 A1 | 3/2005 | Matus |
| 2005/0109738 A1 | 5/2005 | Hewett et al. |
| 2005/0145688 A1 | 7/2005 | Milenkovic et al. |
| 2005/0173390 A1 | 8/2005 | Lanouette et al. |
| 2006/0006154 A1 | 1/2006 | Koike |
| 2006/0070986 A1 | 4/2006 | Ihde et al. |
| 2006/0163228 A1 | 7/2006 | Daniel |
| 2006/0163230 A1 | 7/2006 | Kaufman |
| 2006/0201923 A1 | 9/2006 | Hutchison |
| 2006/0289406 A1 | 12/2006 | Helenius et al. |
| 2007/0012099 A1 | 1/2007 | Becourt |
| 2007/0080149 A1 | 4/2007 | Albrecht |
| 2007/0080151 A1 | 4/2007 | Albrecht |
| 2007/0080152 A1 | 4/2007 | Albrecht |
| 2007/0080153 A1 | 4/2007 | Albrecht et al. |
| 2007/0193988 A1 | 8/2007 | De Joannis et al. |
| 2007/0294608 A1 | 12/2007 | Winterhalter et al. |
| 2008/0001752 A1 | 1/2008 | Bruns |
| 2008/0011821 A1 | 1/2008 | Ellender et al. |
| 2008/0023451 A1 | 1/2008 | Salsich et al. |
| 2008/0061049 A1 | 3/2008 | Albrecht |
| 2008/0066596 A1 | 3/2008 | Yamaguchi |
| 2008/0093476 A1 | 4/2008 | Johnson et al. |
| 2008/0118253 A1 | 5/2008 | Abe |
| 2008/0149608 A1 | 6/2008 | Albrecht |
| 2008/0149686 A1 | 6/2008 | Daniel et al. |
| 2008/0156783 A1 | 7/2008 | Vanden Heuvel |
| 2008/0217305 A1* | 9/2008 | Sanders ............... H05H 1/28 219/121.49 |
| 2008/0223952 A1 | 9/2008 | Wernli et al. |
| 2008/0257874 A1 | 10/2008 | Kaufman et al. |
| 2008/0308641 A1 | 12/2008 | Finn |
| 2009/0008370 A1* | 1/2009 | Salsich ............... H05H 1/36 219/121.55 |
| 2009/0057286 A1 | 3/2009 | Ihara et al. |
| 2009/0065489 A1 | 3/2009 | Duffy |
| 2009/0078196 A1 | 3/2009 | Midorikawa |
| 2009/0107960 A1 | 4/2009 | Hampton |
| 2009/0152255 A1 | 6/2009 | Ma |
| 2009/0159572 A1 | 6/2009 | Salsich |
| 2009/0159575 A1 | 6/2009 | Salsich |
| 2009/0163130 A1 | 6/2009 | Zambergs |
| 2009/0184098 A1 | 7/2009 | Daniel et al. |
| 2009/0212027 A1 | 8/2009 | Borowy |
| 2009/0219136 A1 | 9/2009 | Brunet et al. |
| 2009/0222804 A1 | 9/2009 | Kaufman |
| 2009/0230097 A1 | 9/2009 | Liebold et al. |
| 2009/0240368 A1 | 9/2009 | Young, Jr. et al. |
| 2009/0288532 A1 | 11/2009 | Hashish |
| 2010/0046210 A1 | 2/2010 | Mathai et al. |
| 2010/0084381 A1 | 4/2010 | Indraczek et al. |
| 2010/0155377 A1 | 6/2010 | Lindsay et al. |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0114616 A1 | 5/2011 | Albrecht |
| 2011/0163857 A1 | 7/2011 | August et al. |
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0139692 A1 | 6/2012 | Neubauer et al. |
| 2012/0234803 A1 | 9/2012 | Liu et al. |
| 2012/0241428 A1 | 9/2012 | Kowaleski |
| 2013/0001221 A1 | 1/2013 | Lambert |
| 2013/0068732 A1 | 3/2013 | Watson et al. |
| 2013/0087537 A1 | 4/2013 | Barnett et al. |
| 2013/0179241 A1 | 7/2013 | Liu |
| 2013/0210319 A1 | 8/2013 | Gramling et al. |
| 2013/0263420 A1 | 10/2013 | Shipulski et al. |
| 2013/0264317 A1 | 10/2013 | Hoffa et al. |
| 2013/0264320 A1 | 10/2013 | Shipulski |
| 2014/0069895 A1 | 3/2014 | Brine et al. |
| 2014/0113527 A1* | 4/2014 | Lindsay ............... B23K 5/00 451/5 |
| 2014/0116217 A1 | 5/2014 | Hashish |
| 2014/0335761 A1 | 11/2014 | Chou et al. |
| 2015/0108223 A1 | 4/2015 | Weitzhandler |
| 2015/0127137 A1* | 5/2015 | Brandt ............... B23K 5/00 700/166 |
| 2015/0251267 A1 | 9/2015 | Winn et al. |
| 2015/0251331 A1 | 9/2015 | Vandergon et al. |
| 2015/0371129 A1 | 12/2015 | Hoffa et al. |
| 2017/0042011 A1 | 2/2017 | Sanders et al. |
| 2017/0042012 A1 | 2/2017 | Sanders et al. |
| 2017/0046544 A1 | 2/2017 | Ikemoto |
| 2017/0091634 A1 | 3/2017 | Ritter |

FOREIGN PATENT DOCUMENTS

| | | |
|---|---|---|
| EP | 1117279 A1 | 7/2001 |
| EP | 1288016 A1 | 3/2003 |
| JP | 6163368 A | 4/1986 |
| JP | H05154732 A | 6/1993 |
| JP | H11285831 A | 10/1999 |
| JP | 2003025176 A | 1/2003 |
| JP | 2003048134 A | 2/2003 |
| JP | 2009252085 A | 10/2009 |
| JP | 2012048287 A | 3/2012 |
| JP | 2012079221 A | 4/2012 |
| WO | WO 2008144785 A1 | 12/2008 |
| WO | WO 2010142858 A1 | 12/2010 |
| WO | WO 2013000700 A1 | 1/2013 |
| WO | WO 2013151886 A2 | 10/2013 |

OTHER PUBLICATIONS

International Search Report for International Application No. PCT/US2013/021364 dated Jan. 14, 2013 4 pages.
International Search Report for International Application No. PCT/US2013/034572 dated Mar. 29, 2013 4 pages.
International Search Report for International Application No. PCT/US2014/055638 dated Dec. 17, 2014, 5 pages.
Torchmate Arc Voltage Torch Height Control—Operation Manual, Applied Robotics, Inc., Oct. 2005, pp. 1-19.
Invitation to Pay Additional Fees with partial International Search Report for PCT/US2014/051106 dated Oct. 30, 2014, 6 pages.
International Search Report for International Application No. PCT/US2013/034572 dated Feb. 13, 2014 4 pages.
International Search Report for International Application No. PCT/US2013/021364 dated Feb. 5, 2014 4 pages.
Trumpf Press Release, New RFID lens provides LensLine sensor system with improved condition checking capabilities, online press release available at http://www.trumpf.com/nc/en/press/press-releases/press-release/rec-uid/266044.html, Aug. 12, 2013. (4 pages).

* cited by examiner

FIG. 25

| Process | Vent Off Valve | Supply Pressure (psig) | Plasma Gas Flow (scfh)* | POV Pressure (psig) | Vent Flow (scfh)** | Plasma Plenum Pressure (psig) |
|---|---|---|---|---|---|---|
| 400A MS | closed | 108.7 | 62.6 | 9.8 | 0 | 4.0 |
|  | open | 109.0 | 62.7 | 9.8 | 11.0 | n/a |
| 260A MS | closed | 108.3 | 59.4 | 21.9 | 0 | 4.0 |
|  | open | 109.1 | 58.8 | 21.6 | 5.5 | n/a |
| 200A MS | closed | 108.7 | 36.0 | 13.0 | 0 | 4.0 |
|  | open | 108.6 | 36.4 | 12.9 | 6.1 | n/a |
| 130A MS | closed | 108.2 | 27.7 | 11.4 | 0 | 4.0 |
|  | open | 108.9 | 27.8 | 11.4 | 3.8 | n/a |
| 80A MS | closed | 109.0 | 11.0 | 8.3 | 0 | 4.0 |
|  | open | 108.8 | 11.0 | 8.2 | 2.8 | n/a |
| 50A MS | closed | 107.5 | 4.7 | 6.7 | 0 | 4.0 |
|  | open | 107.9 | 6.2 | 6.4 | 4.4 | n/a |
| 30A MS | closed | 108.5 | 2.0 | 7.3 | 0 | 4.0 |
|  | open | 109.1 | 2.4 | 7.2 | 3.6 | n/a |

CONFIGURING SIGNAL DEVICES IN THERMAL PROCESSING SYSTEMS

RELATED APPLICATIONS

This application is a continuation of U.S. Ser. No. 15/863,402, filed Jan. 5, 2018, now U.S. Pat. No. 10,346,647, and titled "Configuring Signal Devices in Thermal Processing Systems," which is a divisional of U.S. Ser. No. 14/807,679, filed Jul. 23, 2015, now abandoned, and titled "Configuring Signal Devices in Thermal Processing Systems," which is a continuation-in-part of U.S. Ser. No. 14/589,270, filed Jan. 5, 2015, now U.S. Pat. No. 9,395,715, and titled "Identifying Components in a Material Processing System," which is a continuation-in-part of U.S. Ser. No. 14/135,714, filed Dec. 20, 2013, now U.S. Pat. No. 9,144,882, and titled "Identifying Liquid Jet Cutting System Components," which is a continuation-in-part of U.S. Ser. No. 14/075,692, filed Nov. 8, 2013 now abandoned, and titled "Identifying Thermal Processing Torch Components," which is a continuation-in-part of U.S. Ser. No. 13/439,259, filed Apr. 4, 2012 now U.S. Pat. No. 10,455,682, and titled "Optimization and Control of Material Processing Using a Thermal Processing Torch." U.S. Ser. No. 14/135,714 is also a continuation-in-part of U.S. Ser. No. 13/838,919, filed Mar. 15, 2013 now U.S. Pat. No. 10,486,260, and titled "Systems, Methods, and Devices for Transmitting Information to Thermal Processing Systems," which is a continuation-in-part of U.S. Ser. No. 13/560,059, filed Jul. 27, 2012 now abandoned, and titled "Optimization and Control of Material Processing Using a Thermal Processing Torch," which is a continuation-in-part of U.S. Ser. No. 13/439,259, filed Apr. 4, 2012 and titled "Optimization and Control of Material Processing Using a Thermal Processing Torch." The contents of all of these applications are hereby incorporated herein by reference in their entirety. U.S. Ser. No. 14/807,679 also claims the benefit of and priority to U.S. Provisional Patent Application No. 62/028,065, filed Jul. 23, 2014, the content of which is hereby incorporated herein by reference in its entirety.

TECHNICAL FIELD

This technology relates generally to thermal processing systems (e.g., plasma arc torch systems), and more specifically to configuring signal devices in thermal processing systems and related systems and methods.

BACKGROUND

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

Typically, a plasma arc torch includes multiple consumables. Each consumable can be selected to achieve optimal performance (e.g., an optimal current level, maximum lifespan, etc.) in view of specific processing constraints, such as the type of material being cut and/or the cut shape desired. Installing incorrect consumables into a torch can result in poor cut quality and decreased cut speed. In addition, incorrect consumables can reduce consumable life and lead to premature consumable failure. Even when correct consumables are installed in a torch, it can be difficult for an operator to manually configure and optimize torch operating parameters corresponding to the selected consumable set. Moreover, it can be difficult for a torch component manufacturer to guarantee performance if aftermarket consumables are used in a torch system.

SUMMARY

Thus, systems and methods are needed to detect consumables installed in a plasma arc torch (e.g., detect incompatible consumables installed in a plasma arc torch). In addition, systems and methods are needed to automatically adjust torch operating parameters to enhance cutting quality and prolong consumable life. Specifically, systems and methods are needed to efficiently convey information among various components of a torch system to facilitate operation control and optimization.

In addition to signal devices (e.g., data storage devices) arranged on the consumables to identify the consumables installed in the plasma arc torch, signal devices arranged in or on the consumables, as discussed below, can also be used to transfer information (e.g., information relating to torch system operation (e.g., operating data/parameters)) to the torch system by communicating with a receiver (e.g., a data reading device (e.g., an RFID reading device)) disposed in the torch.

In some aspects, a consumable for a material processing head for consistent orienting and positioning a ring-shaped data tag within a material processing head, the consumable comprising: a body that is substantially axially symmetric about a central longitudinal axis; and the ring-shaped data tag attached to the body, the data tag having a central axis that is substantially coaxial to the central longitudinal axis of the body, the data tag comprising a conductive coil formed around the central axis of the data tag.

In some aspects, a replaceable consumable component for a material processing head for consistently orienting and positioning a ring-shaped RFID tag within the material processing head can include a body defining a longitudinal axis and comprising a transmission region that conveys at least one of: a current, liquid, coolant, gas, light beam, or cutting medium through the body; and the ring-shaped RFID tag defining a central opening, the tag being coaxially disposed relative to the longitudinal axis of the body such that the at least one of: the current, liquid, coolant, gas, light beam, or cutting medium conveyed by the transmission passes through the central opening of the RFID tag.

The shape of the conductive coil (e.g., around the central axis of the consumable) can be useful to improve communications with a corresponding data tag reader and, in some cases, to limit adverse impacts of the communication system on the material processing head's functionality. For example, ring-shaped conductive coils formed around the consumables central axis can help better align the resulting magnetic flux, generated by current in the coil, with an operating current traveling through the consumable. Such alignment can reduce the likelihood of communication interference or operating current issues.

Embodiments can include one or more of the following features.

The conductive coil and/or the ring-shaped data tag can be symmetric about the central longitudinal axis.

The consumable can include a chip containing data. The chip can have at least 256 bits of data storage space.

The conductive coil can include two or more conductor turns about the central longitudinal axis. The conductive coil can include a conductive material. For example, the conductive coil can include a printed circuit. The conductive coil can be formed substantially symmetrical around the central axis. The conductive coil can encircle the central axis.

The consumable can include a consumable cartridge comprising two or more component bodies. For example, the two or more component bodies can include at least a nozzle and an electrode.

The RFID tag can be disposed perpendicularly to a central axis of the consumable. The RFID tag can include a conductive coil formed around the central opening. The conductive coil can have a single turn of a conductive material. The conductive coil can include multiple turns of a conductive material. The conductive coil can be a printed circuit. The conductive coil can be disposed perpendicularly to the transmission region. The conductive coil can be formed substantially symmetrical around the central axis. In some cases, a housing of the RFID tag can be rotationally asymmetrically shaped.

The RFID tag can include a chip having memory. The chip can include data. For example, the chip can have at least 256 bits of storage space.

In some aspects, a method for reducing communication interference of an RFID communication system in a material processing torch having a consumable component disposed therein by providing for consistent orienting and positioning a ring-shaped RFID tag within the torch, the torch conducting an operating current along a central axis thereof, can include providing the ring-shaped RFID tag, coaxially disposed relative to the consumable component, the tag defining an open central portion and has a conductive coil disposed substantially around the open central portion; positioning the consumable component within the torch such that the central axis of the consumable component is coaxial with the open central portion of the RFID tag; passing a current along a portion of the central axis of the torch that extends through the ring-shaped RFID tag; and generating, by a reader antenna coil within the torch, a tag current through the conductive coil, the tag current encircling a portion of the central axis of the torch.

Embodiments can include one or more of the following features.

Methods can also include providing an antenna in the torch for inducing a current in the RFID tag. Methods can also include communicating with the RFID tag. Methods can also include inserting a second RFID tag having a second conductive coil within the torch, wherein the second conductive coil is substantially parallel to the conductive coil of the first tag.

Generating the tag current can include generating current along a substantially circular path. The substantially circular path can be formed substantially symmetrically about the central axis. Communicating with the RFID tag can include reading and writing information to the RFID tag. Reader antenna within the torch can include a coil coaxially aligned with the central axis of the torch.

In some aspects, a consumable for consistent orienting and positioning a ring-shaped RFID tag within a material processing head can include a body; and a ring-shaped RFID tag coupled to the body, the RFID tag defining a central axis and comprising: a coiled antenna encircling the central axis of the RFID tag for transmitting data from the RFID tag, and a chip in communication with the coil, the chip having a storage capacity of at least 60 bits of data.

Embodiments can include one or more of the following features.

The storage capacity of the chip can be between about 256 bits and about 900 bits.

Data stored on the chip can be divided into two or more segments. A first segment of the data can be locked and a second segment of the data can be unlocked. Two or more segments can be locked independently of one another. Two or more segments can be locked at different times. A first segment of the data can include consumable identification data and a second segment of the data can include data pertaining to the operation of the consumable.

In some aspects, a material processing head for reducing communication interference between data tags and an antenna can include a body; the antenna disposed within the body; a first tag, associated with a first consumable component, disposed within a flux communication zone of the body at a first distance from the antenna, the first tag having a first resonant frequency; and a second tag, associated with a second consumable component, disposed within the flux communication zone of the body at a second distance from the antenna, the second tag having a second resonant frequency that is different than the first resonant frequency, wherein the first and second resonant frequencies are tuned based upon at least one of: i) a difference between the first distance and the second distance; or ii) a characteristic (e.g., shape) of the flux communication zone in which the first tag and/or the second tag is disposed.

Embodiments can include one or more of the following features.

The second distance can be greater than the first distance. The second tag can absorb more energy available from the antenna than the first tag. The second resonant frequency can be closer in frequency to a broadcast frequency than the broadcast frequency. The first tag can include a first coil having a first number of turns and the second tag can include a second coil having a second number of turns, the second number of turns being greater than the first number of turns. The first distance and the second distance can each be between 1 mm and 6 mm. At least one of the first tag or the second tag can be configured to resonate at about 13 MHz. At least one of the first consumable component or the second consumable component can be removably coupled to the material processing head.

In some aspects, a method of facilitating communication, and reducing communication interference, between an RFID tag reader of a material processing head of a material processing system and two or more RFID tags associated consumable components disposed within the material processing head can include positioning a first RFID tag attached to a first consumable component within the material processing head at a first distance from the RFID tag reader, the first RFID tag having a first resonant frequency; positioning a second RFID tag attached to a second consumable component within the material processing head at a second distance from the RFID tag reader that is greater than the first distance, the second RFID tag having a second resonant frequency; broadcasting a reader frequency from the RFID tag reader to the first and second RFID tags, the reader frequency being closer to the second resonant frequency than to the first resonant frequency.

Embodiments can include one or more of the following features.

Methods can also include tuning at least one of: the first resonant frequency or the second resonant frequency. Tuning the at least one of: the first resonant frequency or the second resonant frequency can include i) selecting a number of turns of a conductive antenna coil within the first RFID tag or the second RFID tag; ii) selecting a diameter of the coil of the first RFID tag that is different than the diameter of the coil of the second RFID tag; or iii) selecting an IC capacitor for the first RFID tag that has a different capacitance than the capacitor of the second RFID tag.

The second RFID tag can absorb more energy available to it from the antenna. The first resonant frequency can deviate more from the broadcast frequency than does the second resonant frequency. The first RFID tag can include a first coil having a first number of turns and the second RFID tag can include a second coil having a second number of turns, the second number of turns being greater than the first number of turns. At least one of the first consumable component or the second consumable component can be removably coupled to the material processing head.

In some aspects, a material processing head having a consumable component with a ring-shaped RFID tag, for reducing communication interference between the ring-shaped RFID tag and an antenna can include a processing head body; the antenna located on or within the body; a consumable removably installed in the processing head body; and a ring-shaped RFID tag associated with the consumable and located adjacent a substantially metallic component, wherein the tag: a) is removable from the processing head body, b) comprises a conductive coil that can be energized by the antenna, and c) is located within a flux communication zone defined by at least one of: (a) a region unobstructed by magnetic field inhibiting materials between the antenna and the tag, or (b) the presence of a magnetic field amplifier.

Embodiments can include one or more of the following features.

The flux communication zone can be a toroidal shape. The flux communication zone can include an unobstructed flux path between the RFID tag and the antenna.

The material processing head further comprises a second tag and a consumable within the flux communication zone.

A distance between the RFID tag and the antenna can be between 1 mm and 6 mm. The RFID tag can resonate at about 13 MHz. The region unobstructed by magnetic field inhibiting materials can include a region absent of magnetic field inhibiting material. The magnetic field amplifier can include a ferrite material. The ferrite material can include a flux tape material or a ferrite coating.

In some aspects, a method for improving RFID communication, and reducing communication interference, between a data tag of a consumable component of a material processing system and a data tag reader of a material processing head of the material processing system can include establishing a flux communication zone in a region of the material processing head adjacent a site for an antenna coil of the data tag reader by at least one of: reducing a volume of magnetic field inhibiting materials in the region adjacent the site for the antenna coil; or disposing a magnetic field amplifying materials along one or more surfaces of the magnetic field inhibiting materials in the region surrounding the site for the antenna coil, the flux communication zone reorienting a magnetic field produced by the antenna coil disposed in the site to be substantially toroidal about the antenna coil.

Embodiments can include one or more of the following features.

Methods can also include disposing the consumable component into the material processing head to position a conductive coil of the data tag within the reoriented magnetic field of the flux communication zone. The flux communication can define flux path between the conductive coil of the data tag and the antenna coil of the data tag reader. Methods can also include disposing a second consumable component having a second data tag into the material processing head to position a second conductive coil of the second data tag within the reoriented magnetic field of the flux communication zone. Decreasing the volume of magnetic field inhibiting materials in the region adjacent the site for the antenna coil can include removing metal from the material processing head adjacent the site for the antenna coil. Decreasing the volume of magnetic field inhibiting materials in the region adjacent the site for the antenna coil can include replacing at portion of the magnetic field inhibiting materials in the region adjacent the site for the antenna coil with non-conductive materials. Magnetic field amplifiers can include a ferrite material. Ferrite materials can include a flux tape material.

Unless explicitly described herein or inconsistent with the claims, the example embodiments of the systems and methods described above can generally be implemented and practiced individually, as well as in combination with one another. For example, in some embodiments, the methods described herein may optionally be carried out with one or more of the systems or devices described herein. Similarly, in some embodiments, various devices described herein can include one or more of the features or aspects of other devices described herein.

In some aspects, a replaceable consumable component for performing a cutting or welding operation can includes a body; and a readable data storage device coupled to the body or integrated within the body, wherein the data storage device contains an operation instruction for a cutting or welding device.

In some aspects, a torch for a cutting or welding process coupled to a controller of a thermal processing system can include a replaceable consumable component; a readable data storage device located in or on the replaceable consumable component; a data reading device in or on the torch for reading the data storage device; and a data transfer mechanism enabling communication between the data reading device and the controller, wherein the data storage device contains data for the operation of the thermal processing system.

In some aspects, a torch for a cutting or welding process, coupled to a controller, can include a receptacle within the torch, the torch being configured to receive a replacement consumable component; a data reading device in or on the torch; and a data transfer mechanism providing communication capabilities between the torch and the controller.

In some aspects, a method for at least partially controlling a process of a cutting or welding system can include providing a consumable having a data tag containing operating parameters (e.g., which can include a cutting program); assembling the consumable into a tool of the cutting or welding system; communicating the operating parameters to a control device of the tool; and controlling the cutting or welding process in accordance with operating parameters.

Embodiments can include one or more of the following features.

In some embodiments, the operation instruction comprises a cutting program. For example, the cutting program can include a current or gas ramping profile, torch system setup values, a workpiece cutting application.

In some embodiments, the operation instruction includes a firmware update.

In some embodiments, the replaceable consumable component comprises a component of a thermal processing torch. For example, the consumable component can include a nozzle, a shield, or an electrode.

In some embodiments, the readable data storage device includes an RFID tag. In some embodiments, the readable data storage device is also rewritable. In some cases, the data transfer mechanism comprises a wireless connection. In some cases, the readable data storage device is rewriteable.

In some embodiments, the readable data storage device is writable while in service and/or while disposed within the torch.

In some embodiments, the data includes a cutting program. In some embodiments, the data is configured to produce an altered performance characteristic of the thermal processing system. For example, the altered performance characteristic can include a better cut quality capability relative to an original cutting capability that would be possible using a substantially similar replaceable consumable component that does not transfer the data. The data can also include a firmware update for the thermal processing system.

In some embodiments, the data reading device can include an RFID reading device. In some cases, the data reading device is configured to communicate with a data storage device in or on a consumable component disposed in the torch. In some cases, the data reading device is also a data writing device configured to write data to the data storage device.

In some aspects, a method for providing operating data to a cutting or welding system using a replaceable consumable component comprising a readable data storage device can include facilitating communication between the readable data storage device and a data reading device of the cutting or welding system; and transferring operating data at least partially defining the operating parameter from the readable data storage device to the data reading device, the operating data being configured to affect an operation of the cutting or welding system.

In some embodiments, the readable data storage device comprises a first readable data storage device of a first replaceable consumable component and the data reading device comprises at least one data reading device of the cutting or welding system; and the operating data comprises a first set of operating data from the first readable data storage device, further comprising: facilitating communication between a second readable data storage device of a second replaceable consumable component and one of the at least one data reading devices of the cutting or welding system; and transferring a second set of operating data from the second readable data storage device to one of the at least one data reading devices, the second set of operating data being configured to adjust the operation of the cutting or welding system. In some cases, the first replaceable consumable component includes an electrode component and the second replaceable consumable component includes a nozzle component. In some cases, a combination of the first set of operating data and second set of operating data are required to fully operate the cutting or welding system.

In some embodiments, the replaceable consumable component is a first consumable component and the cutting or welding system is further configured to identify a second consumable component based on physical features of the second consumable component. For example, identifying the second consumable component based on physical features of the second consumable component can include measuring a gas flow through the second consumable component. In some cases, the measuring the gas flow can include: directing a gas flow through a flow-restriction element associated with the second consumable component disposed within the cutting or welding system; determining a first pressure of the gas flow at a location upstream relative to the flow-restriction element; determining a second pressure of the gas flow at a location downstream from the flow-restriction element; determining a flow rate of the gas flow passing through the flow-restriction element; and using the first pressure, the second pressure, and the flow rate to identify the second consumable component. For example, in some cases, determining the first pressure can include setting the gas flow to a known pressure; and determining a flow rate can include measuring the flow rate.

In some embodiments, the operating data includes a firmware update for the cutting or welding system. In some cases, the method also includes determining a firmware version being used by the cutting or welding system; and comparing the firmware version being used with a firmware version of the firmware update. In some cases, the firmware update can include a date code that is used to determine if the firmware update should be transferred to the cutting or welding system. In some cases, affect includes fully replacing the control software.

In some aspects, a method for storing information on a replaceable consumable component used in a thermal processing machine while the replaceable consumable component is in an operation configuration can include configuring a rewritable data storage device of the replaceable consumable component for communication with a data writing device of the thermal processing machine; and writing the information by the data writing device to the rewritable data storage device.

In some embodiments, the information can be associated with a previous use (e.g., a cutting or welding operation) of the replaceable consumable component. For example, the information can include information relating to a time duration of the previous use of the replaceable consumable component. The information can include information relating to a failure or error of a torch, the replaceable consumable component, or the thermal processing machine. The information can be rewritten while the consumable is operationally installed within the thermal processing machine. The information can be repeatedly rewritten while in operation. The information can include information relating to a frequency of use of the thermal processing machine. The information can include information relating to a number of cutting cycles for which the replaceable consumable component has been used. The information can include information relating to operating parameters of the thermal processing machine during the previous use of the replaceable consumable component.

In some embodiments, the operation configuration can include the thermal processing machine being in use.

The operating instructions/program can include: (e.g., cutting program, current or gas ramping profile, firmware updates, set up values of the system, cut cycle or life data, gas flow rates, gas types, pierce delay time, timing parameter, set points, error conditions, thresholds, coordination of multiple parameters).

In some embodiments, as a result of transferring the information (e.g., operating data, instructions, or programs) from the readable storage device to the data reading device, an operator of the thermal processing machine is not required to manually input as many operating parameters that would be required if the operating data was not transferred.

The replaceable consumable can include a component of a thermal processing torch (e.g., a nozzle, shield, or electrode). The data reading device can be an RFID reading device. The operating data can include a workpiece cutting application (e.g., a killer app.).

The operating data can be configured to produce an altered performance characteristic of the thermal processing machine. The altered performance characteristic can include a faster cutting capability relative to an original cutting capability that would be possible using a substantially similar replaceable consumable component that does not transfer the operating data.

The signal device (e.g., tag) can be rewriteable (writable while in service and while in the torch).

In one aspect, a method is provided for configuring a first thermal processing system and a second thermal processing system. The method includes providing a first consumable for use in a first thermal processing torch and a second consumable for use in a second thermal processing torch. The first consumable and the second consumable have substantially identical physical characteristics. The first consumable is associated with a first signal device encoded with first data and the second consumable is associated with a second signal device encoded with second data. The method includes mounting the first torch with the first consumable in the first thermal processing system and the second torch with the second consumable in the second thermal processing system. The method also includes sensing, by the first thermal processing system, the first data stored in the first signal device and sensing, by the second thermal processing system, the second data stored in the second signal device. The method further includes configuring, by the first thermal processing system, a parameter of the first thermal processing system for operating the first torch based on the sensed first data by assigning a first value to the parameter. In addition, the method includes configuring, by the second thermal processing system, the parameter of the second thermal processing system for operating the second torch based on the sensed second data by assigning a second value to the parameter. The second value can be different from the first value.

In another aspect, a method is provided for assembling a first thermal processing torch and a second thermal processing torch. The method includes providing a first consumable with a first signal device located on or within a body of the first consumable and providing a second consumable with a second signal device located on or within a body of the second consumable. The method includes encoding the first signal device with first data associated with the first consumable. The first data correlates to a first value of a parameter of a first thermal processing system for operating the first torch. The method further includes encoding the second signal device with second data associated with the second consumable. The second data correlates to a second value of the parameter of a second thermal processing system for operating the second torch. The second value can be different from the first value.

In other examples, any of the aspects above can include one or more of the following features. In some embodiments, at least one of the first or second data is independent of a detectable physical characteristic of the corresponding first or second consumable. At least one of the first or second data can identify a type of the corresponding first or second consumable. The type of the corresponding consumable can include a nozzle, a shield, an electrode, an inner retaining cap, an outer retaining cap, a swirl ring or a welding tip. In addition, at least one of the first or second data can identify a serial number unique to the corresponding first or second consumable. At least one of the first or second data can transmitted to the corresponding first or second thermal processing system as a pneumatic signal, a radio signal, a light signal, a magnetic signal or a hydraulic signal.

In some embodiments, at least one of the first signal device or the second signal device comprises a radio-frequency identification (RFID) tag. At least one of the first signal device or the second signal device can be located on or within a body of the corresponding first or second consumable. In some embodiments, the first or second signal device is located at a surface of the body of the corresponding first or second consumable to minimize heat exposure during torch operation. The surface can be adjacent to a cooling mechanism, remote from a plasma arc, or in an o-ring channel of the corresponding first or second consumable, or a combination thereof.

In some embodiments, the parameter includes a torch height above a workpiece, a flow rate of a plasma gas, a flow rate of a shield gas, a timing of plasma gas or current, or a process program for cutting the workpiece. In some embodiments, the parameter is included in a set of parameters configurable by at least one of the first or second thermal processing system to operate at least one of the first torch or second torch. In such a case, the first and second thermal processing systems can assign a value to each of the set of parameters for operating the respective first and second torches.

In some embodiments, the method further includes providing a first workpiece and a second workpiece for processing by the first torch and the second torch, respectively. The first and second workpieces are at least substantially the same.

In some embodiments, sensing the first data stored in the first signal device further includes using a signal detector of the first thermal processing system to sense the first data. The signal detector can be an RFID reader. The signal detector can be located external to the first torch.

In some embodiments, the first and second thermal processing systems are the same thermal processing system.

In another aspect, a method is provided for configuring a thermal processing system. The method includes providing a consumable for use in a thermal processing torch. The consumable has one or more physical characteristics that facilitate installation into the torch. The method includes mounting the consumable in the torch, connecting the torch to the thermal processing system and sensing, by the thermal processing system, data associated with the consumable. The method further includes configuring, by the thermal processing system, one or more parameters of the thermal processing system for operating the torch based on whether the sensed data satisfies a criterion.

In some embodiments, configuring one or more parameters of the thermal processing system includes preventing the thermal processing system from operating the torch if the data does not satisfy the criterion. The data can identify a manufacturer of the consumable that does not match a permitted manufacturer.

In some embodiments, the data is encoded in a signal device coupled to the consumable. Sensing can be performed by an RFID reader of the thermal processing system.

In some embodiments, the method further includes preventing configuration of one or more parameters of the thermal processing system in the absence of any data sensed by the thermal processing system.

In some aspects, some embodiments may have one or more of the following advantages. Using the systems and methods described herein that include using thermal processing system consumable components (e.g., plasma torch nozzles, shields, retaining caps, or other consumables) having data storage devices (e.g., readable or rewritable data storage devices) disposed in or on the consumable components can result in a thermal processing system (e.g., a cutting or welding system) that is easier to set up, use, and/or troubleshoot. For example, as discussed herein, data storage devices arranged in or on a consumable component can be used to provide information (e.g., operating parameters) to the thermal processing system on which the consumable component is used. In some cases, the information can be transmitted to the thermal processing system at least semi-automatically (e.g., automatically) upon assembly of the consumable component into a device of the system (e.g., a torch). As a result of the information being transmitted to the system, some or all of the operating parameters or instructions needed in order to operate the machine do not need to be input (e.g., programmed) into the system by an operator using the thermal processing system. Requiring less input from an operator can result in a processing system that is easier and less expensive to operate.

In some embodiments, using the systems and methods described herein can enable a thermal processing system to semi-automatically (or automatically) review and update system software (e.g., firmware) by transmitting software from the data storage device to the processing system when the consumable is installed in a device of the processing system (e.g., the torch). As a result of semi-automated software update capabilities, the systems and methods described herein typically require less maintenance (e.g., operator-initiated maintenance) and downtime, which could otherwise be needed to test the thermal processing system and update the software.

Additionally, using the systems and methods described herein to transmit thermal processing system setup information or operating parameters can enable customized cutting or welding properties being used for a particular consumable component. For example, as discussed below, two different structurally similar consumable components can each have a data storage device, where one of the data storage devices includes operating parameters that are better-suited to fast, rough cutting processes and the other data storage device includes operating parameters that are better-suited for slow cutting processes that produce higher quality cuts. That is, consumable components can be "pre-loaded" with information (e.g., operating parameters) that make the consumable preferred for any of various types of cutting performance characteristics. As a result of tailoring the data storage device for a particular use of the respective consumable, a consumer (e.g., machine operator) can merely choose a consumable according to the desired type of cutting or welding to be performed and install the consumable into the processing system (e.g., into the torch). Therefore, the processing system need not be fully set up and programmed by the operator, rather the processing system can be automatically set up upon installation of the consumable into the torch (e.g., when information is transmitted from the data storage device to the torch).

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

FIG. 25 is an example lookup table which can be used to identify a consumable component based gas flow characteristics of a thermal processing torch system in which the consumable component is installed.

DETAILED DESCRIPTION

In some aspects, material processing systems (e.g., plasma cutting systems or water-jet cutting systems) can include consumable components with data tags having conductive coils formed around their central axes which can improve communication performance and help to provide for a variety of communication system enhancements.

Figure 1:
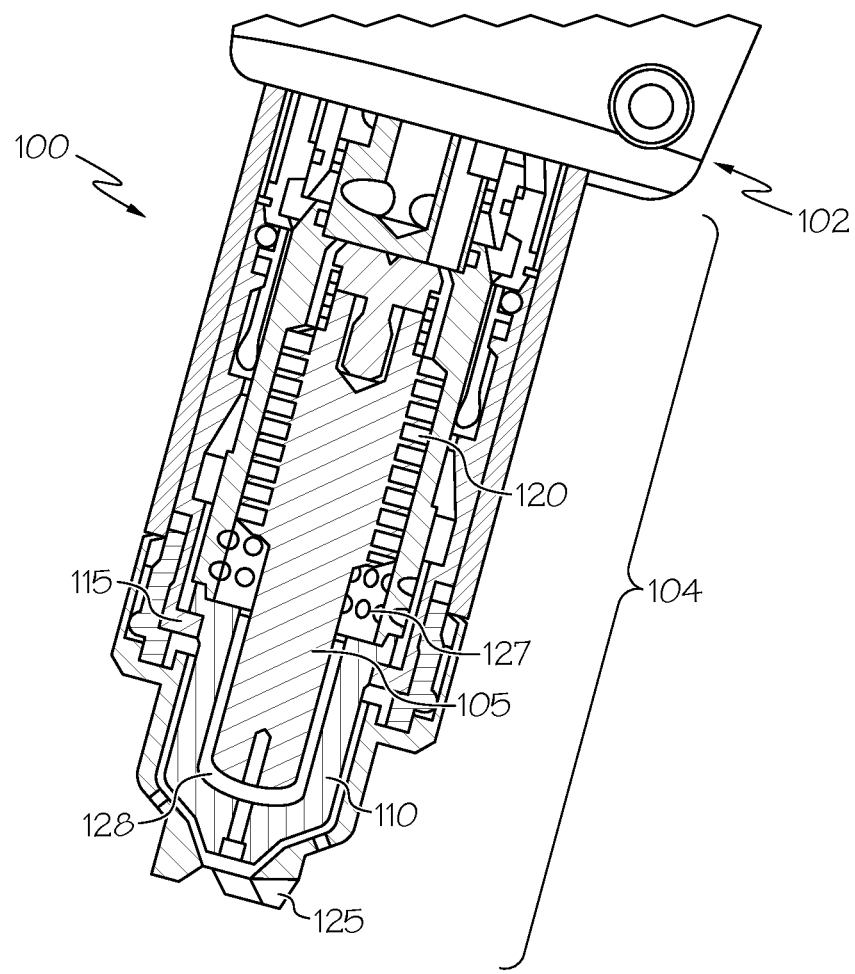
FIG. 1 is a cross-sectional view of an exemplary plasma arc torch.

FIG. 1 is a cross-sectional view of an exemplary plasma arc torch 100 of a thermal processing system (e.g., a cutting or welding system). The torch 100 typically includes a torch body 102 and a torch tip 104. The torch tip 104 includes one or more consumables (e.g., replaceable consumable components (e.g., an electrode 105, a nozzle 110, a retaining cap 115, a swirl ring 120, and a shield 125)) disposed within a receptacle (e.g., a consumable receptacle) that is configured to receive a replacement consumable. Each of the various consumables include a body that defines various features that, as discussed herein, can direct fluids (e.g., gas or liquids) during operation of the torch 100. The torch body 102, which has a generally cylindrical shape, supports the electrode 105 and the nozzle 110. The nozzle 110 is spaced from the electrode 105 and has a central exit orifice mounted within the torch body 102. The swirl ring 120 is mounted to the torch body 102 and has a set of radially offset or canted gas distribution holes 127 that impart a tangential velocity component to the plasma gas flow, causing the plasma gas flow to swirl. The shield 125, which also includes an exit orifice, is connected (e.g., threaded) to the retaining cap 115. The retaining cap 115 as shown is an inner retaining cap securely connected (e.g., threaded) to the nozzle 110. In some embodiments, an outer retaining cap (not shown) is secured relative to the shield 125. The torch 100 can additionally include electrical connections, passages for cooling, passages for arc control fluids (e.g., plasma gas), and a power supply. In some embodiments, the consumables include a welding tip, which is a nozzle for passing an ignited welding gas.

In operation, plasma gas flows through a gas inlet tube (not shown) and the gas distribution holes 127 in the swirl ring 120. From there, the plasma gas flows into a plasma chamber 128 and out of the torch 100 through the exit orifice of the nozzle 110 and the shield 125. A pilot arc is first generated between the electrode 105 and the nozzle 110. The pilot arc ionizes the gas passing through the nozzle exit orifice and the shield exit orifice. The arc then transfers from the nozzle 110 to a workpiece (not shown) for thermally processing (e.g., cutting or welding) the workpiece. It is noted that the illustrated details of the torch 100, including the arrangement of the components, the direction of gas and cooling fluid flows, and the electrical connections, can take a variety of forms.

Different operating processes often require different shield and/or plasma gas flow rates, which require different sets of consumables. This leads to a variety of consumables being used in the field. Using the correct consumables and matching them appropriately is necessary to achieve optimal cutting performance. Consumable mismatch (e.g., using a consumable made for operation at 65 Amps in a torch that is being operated at 105 Amps) can result in poor consumable life and/or poor performance of the plasma arc torch.

Figure 2:
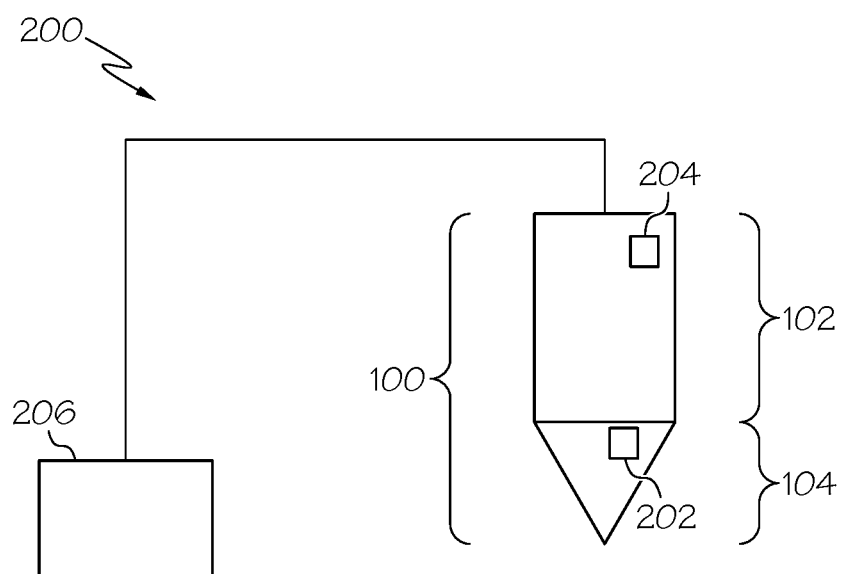
FIG. 2 is a schematic diagram of an exemplary communication network.

FIG. 2 shows an exemplary communication network 200 of the present invention. The communication network 200 includes one or more signal devices (e.g., a readable data storage device) 202, each assigned to a consumable of a thermal processing torch, such as the plasma arc torch 100 of FIG. 1. In some embodiments, the readable data storage device 202 is located on (e.g., coupled to) the body or located within (e.g., integrated within) the body. Exemplary consumables include the electrode 105, the nozzle 110, the retaining cap 115, the swirl ring 120, and the shield 125. In some embodiments, a signal device 202 is an electrically writable device configured to transmit information about a consumable in the form of one or more signals. For example, the signal device 202 can be a radio-frequency identification (RFID) tag or card, bar code label or tag, integrated circuit (IC) plate, or the like. In some embodiments, the readable data storage device 202 is rewritable. That is, a rewritable data storage device 202 is typically able to add new data after the initial writing of data (e.g., with or without deleting or overwriting other data present on the data storage device). In particular, the rewritable data storage device 202 is typically able to have new data written while disposed within the torch 100. In some embodiments, the readable storage device 202 is rewritable while outside of the torch (e.g., during service of the torch or the consumable) or disposed within a torch (e.g., during use of the torch). In some embodiments, a signal device 202 is a detector (e.g., a sensor) for detecting a physical characteristic of the consumable and transmitting the detected information in the form of one or more signals.

The communication network 200 also includes at least one receiver (e.g., a data reading device arranged in or on the torch) 204 for (i) receiving signals transmitted by the signal devices 202 (e.g., reading the data storage device 202), (ii) extracting data conveyed by the signals, and (iii) providing the extracted data to a processor 206 for analysis and further action. In some embodiments, the data reading device 204 is also a data writing device that is configured to write data to a rewritable storage device positioned within the torch. The processor (e.g., a controller) 206 can be a digital signal processor (DSP), microprocessor, microcontroller, computer, computer numeric controller (CNC) machine tool, programmable logic controller (PLC), application-specific integrated circuit (ASIC), or the like. In some embodiments, the torch 100 also includes a data transfer mechanism enabling communication between the data reading device 204 and the controller 206. For example, the data transfer mechanism can include a wired connection or a wireless connection that is configured to transmit data or signals received from signal device 202 to the controller 206. Alternatively or additionally, the data transfer mechanism can be configured to transmit data from the controller 206 back to a rewritable data storage device 202 disposed on a consumable via the data reading device 204.

In some embodiments, each signal device 202 is encoded with information pertaining to the consumable to which the signal device 202 is assigned. The encoded information can be generic or fixed information such as the consumable's name, trademark, manufacturer, serial number, and/or type. The encoded information, for example, can include a model number to generally indicate that the consumable is a nozzle. In some embodiments, the encoded information is unique to the consumable, such as metal composition of the consumable, weight of the consumable, date, time and/or location at which the consumable was manufactured, personnel responsible for the consumable, and the like. As an example, the encoded information can provide a serial number, which is unique to each torch component manufactured, to distinguish, for example, nozzle Type A, Serial #1 from nozzle Type A, Serial #2.

In some embodiments, information is encoded to a signal device 202 at the time of manufacture of the corresponding consumable. Information can also be encoded to a signal device 202 during the lifetime of the consumable, such as after each consumable use. Such information can include the date, time and location of consumable use, any abnormalities detected during use, and/or consumable conditions after use so that a log can be created to predict a failure event or end-of-life event associated with the consumable.

In some embodiments, the information encoded to a signal device 202 can also specify operating parameters (e.g., operation instructions or operating data). For example, for a signal device 202 associated with the shield 125, data encoded to the signal device 202 can indicate the type of shield gas and/or the appropriate gas flow rate for the shield 125. In some embodiments, encoded data of a signal device 202 provides information about other related torch components. For example, encoded data can identify other torch components that are compatible with the assigned consumable, assisting with installation of the entire consumable set in a torch to achieve certain performance metrics. In some embodiments, the operating parameters include one or more of various types of information or data that can be utilized by the thermal processing system 100 during use. Examples of operating parameters include a cutting program, an electrical current (e.g., ignition or cutting current) or gas (e.g., plasma or shield gas) ramping profile, set up values for the thermal processing system, cut cycle or life data of the torch of consumables, gas flow rates (e.g., ignition or cutting gas flow rates), gas types (e.g., gas selection instructions), pierce delay time, timing parameters, set points, error conditions, thresholds, or a coordination of multiple parameters. In some cases, the operating data includes a workpiece cutting application, such as "Killer App." For example, a "Killer App" can be configured to provide a desired operational performance characteristic, features, or cutting application.

In some embodiments, the information sent from the consumable component can include software information for the thermal processing system. For example, in some embodiments, the consumable can contain firmware updates for the thermal processing system. In some cases, the controller can determine the firmware version being used by the thermal processing system and compare it to a version of the firmware update contained on the readable data storage device in order to determine whether the firmware update residing on the readable data storage device is newer than that being used. By comparing the two firmware versions, the controller can determine whether or not the firmware update should be transmitted from the readable data storage device to the data reading device and subsequently installed onto the thermal processing system. For example, the firmware update residing on the readable data storage device can include an identifying code (e.g., a date code, a revision identifying (e.g., a revision number), or any of various other suitable identifying codes) which the data reading device can read and consider. In some cases, the information comprises full control software that can be sent to the data reading device and installed by the controller.

In some embodiments, the operating parameters sent to the torch are configured to produce an altered performance characteristic of the thermal processing system. For example, in some embodiments, the altered performance characteristic includes a faster cutting capability relative to an original cutting capability that would be possible using a substantially similar replaceable consumable component that does not transfer the operating parameters. That is, for example, two different substantially similar (e.g., structurally similar) nozzles can each include a data storage device having different cutting parameters so that one of the nozzles provides cutting parameters that are well-suited for fast cutting (i.e., fast movement of the plasma arc along a workpiece) and the other nozzle provides cutting parameters that are better suited for slow cutting and/or higher quality cut edges. That is, consumable components can be "preloaded" with information (e.g., operating parameters) that make the consumable preferred for any of various types of cutting performance characteristics. As a result of tailoring the data storage device for a particular use of the respective consumable, a consumer (e.g., machine operator) can merely choose a consumable according to the desired type of cutting or welding to be performed and install the consumable into the processing system (e.g., into the torch). Examples of preferred cutting characteristics include fast cutting, slow cutting, high quality cutting edges, reduced kerf, reduced workpiece splatter, straight line cutting, curved cutting, circle cutting, clockwise or counterclockwise cutting, or various other cutting characteristics.

Therefore, in some aspects, the processing system need not be fully set up and programmed by the operator, rather the processing system can be automatically set up upon installation of the consumables into the torch (e.g., when information is transmitted from the data storage device to the torch). For example, in some embodiments, an operator can install a consumable component (e.g., a nozzle) into a torch and a signal device (e.g., readable storage device (e.g., an RFID tag)) 202 in or on the nozzle can communicate with a receiver (e.g., a data reading device) 204 of the torch so that the machine setup information (e.g., the operating parameters) can be automatically programmed into the thermal processing system by the processor (e.g., controller) 206 for use. In some cases, as a result of transferring information (e.g., operating parameters, instructions, or programs) from the readable storage device to the data reading device, an operator of the thermal processing machine is not required to manually input as many operating parameters that would be required if the operating data was not transferred.

As discussed above, in some embodiments, the thermal processing system (e.g., data reading/writing device) is configured to transmit information (e.g., data) to the rewritable data storage device. In some cases, the thermal processing system is configured to periodically (e.g., repeatedly or continually) write data to the rewritable storage device while the consumable is disposed (e.g., operationally installed) within the torch (e.g., during use of the torch). The information transmitted to the rewritable storage device can be associated with the thermal processing system, the torch in which the consumable is installed, or a previous use (e.g., a cutting or welding operation) of the replaceable consumable component in or on which the rewritable storage device in installed. For example, the information can include information relating to the frequency of use (e.g., how many cutting or welding operations for which the replaceable consumable component has been used over a given time), relating to a number (e.g., a total number) of cutting cycles for which the replaceable consumable component has been used, or relating to a time duration of the previous use of the replaceable consumable component (i.e., how long the torch was in operation during the previous use).

In some embodiments, the information can relate to the operating parameters of the thermal processing machine during the previous use of the replaceable consumable component. In some cases, the information relates to a failure or error of the torch, consumable, or thermal processing system during the previous use.

In some embodiments, the signal device 202 and/or receiver 204 are encrypted in order to limit (e.g., prevent) a third party from interfering (e.g., fraudulently interfering) or altering data stored on the signal device 202. For example, encryption can help to limit a third party from fraudulently storing incorrect usage data or set up information (e.g., operating parameters) onto a consumable, which could cause a thermal processing system to mistake or misinterpret a used (e.g., used to the end life) consumable as an usable consumable. Alternatively or additionally, encryption can be used in order to code consumables for use with only one type (e.g., manufacturer or OEM brand) or thermal processing system.

In some embodiments, a signal device 202 includes information about the corresponding consumable independent of a detectable physical characteristic of the consumable. Examples of detectable physical characteristics of the consumable include magnetic properties, surface reflectivity, density, acoustic properties and other tactile features of the consumable measured by a detector installed in the torch. Therefore, examples of consumable data independent of a detectable physical characteristic of the consumable can include consumable name, type, manufacturer, manufacturing date, manufacturing location, serial number, or other non-tactile features of a consumable. In some embodiments, the signal device 202 stores pre-collected information of the consumable, including physical characteristics, before it is installed into the torch, but the signal device 202 is not configured to actively measure or detect the physical characteristics. However, the signal device 202 can store physical characteristics about the consumable measured or detected by another device, such as by a sensor.

In some embodiments, the signal device 202 is located inside or on the torch 100. For example, the signal device 202 can be attached to a surface of a consumable that is ultimately installed inside of the torch tip 104. The signal device 202 can also be attached to a component inside of the torch 100 other than the assigned consumable. For example, while a signal device 202 is assigned to store data about the electrode 105, the signal device 202 can be affixed to a surface of the retaining cap 115. In some embodiments, the signal device 202 is coupled to an external source that is not physically associated with the torch 100. For example, the signal device 202 can be attached to a package used to store the consumable and is remote from the consumable once it is installed in the torch 100. If a signal device 202 is located inside of the torch 100, the surface to which the signal device 202 is attached can be selected to reduce or otherwise minimize heat exposure during operation of the torch 100. For example, the signal device 202 can be located near a cooling mechanism, away from the plasma arc, and/or in an o-ring channel of the torch 100 to reduce or minimize heat exposure. In addition, the signal device 202 can be coated with a heat protective material to reduce the likelihood that the device will overheat during torch operation. Generally, the signal device 202 can be situated, such as being shielded by another torch component, to minimize exposure to thermal energy, radiation, damaging gases (e.g., ozone), and/or high-frequency energy.

In some embodiments, a signal device 202 is designed to be durable, i.e., functional during and after one or more torch ignitions. In some embodiments, a signal device 202 is disposable after each torch use or after several uses. In some embodiments, a signal device 202 is writable once, for example, to encode information about a consumable when the consumable is first manufactured. In some embodiments, a signal device 202 is writable multiple times, such as throughout the lifespan of the corresponding consumable.

In the communication network 200, the signal device 202 can wirelessly transmit its stored information to the receiver 204 in the form of one or more signals. The receiver 204 is adapted to process these signals to extract pertinent data about the consumable and forward the data to the processor 206 for analysis. In some embodiments, the receiver 204 is located in or on the plasma arc torch 100. For example, the receiver 204 can be located in the torch body 102. In some embodiments, the receiver 204 is at a location external to the torch 100, such as attached to a power supply module, a gas console, the processor 206, etc.

In some embodiments, at least one of the signal devices 202 is an RFID tag and the receiver 204 is a reader used to interrogate the RFID tag. In such embodiments, the RFID tag includes a microchip for storing information and an antenna for receiving and transmitting RF signals. The reader can include (1) an antenna for transmitting RF signals to the RFID tag to interrogate the tag and (2) components for decoding a response transmitted by the RFID tag before forwarding the response to the processor 206. The RFID tag can be either active or passive. An active RFID tag includes a battery to produce a stronger electromagnetic return signal to the reader, thereby increasing the possible transmission distance between the RFID tag and the reader. The distance between an RFID tag and a reader can be from less than one inch to 100 feet or more, depending on the power output, the radio frequency used and the type of material through which the RF signals need to travel. In one example, the distance between an RFID tag and an antenna of a corresponding reader can be about 2-4 cm. A reader antenna and remaining reader components do not need be in the same packaging. For example, the reader antenna can be located on or inside of the torch body 102 while the remaining reader components are external to the torch 100. Using an RFID tag is advantageous because it does not require direct contact (e.g., via wires) or direct line of sight (e.g., via optical signals) with the reader and is well suited for use in harsh environments.

Figure 3:
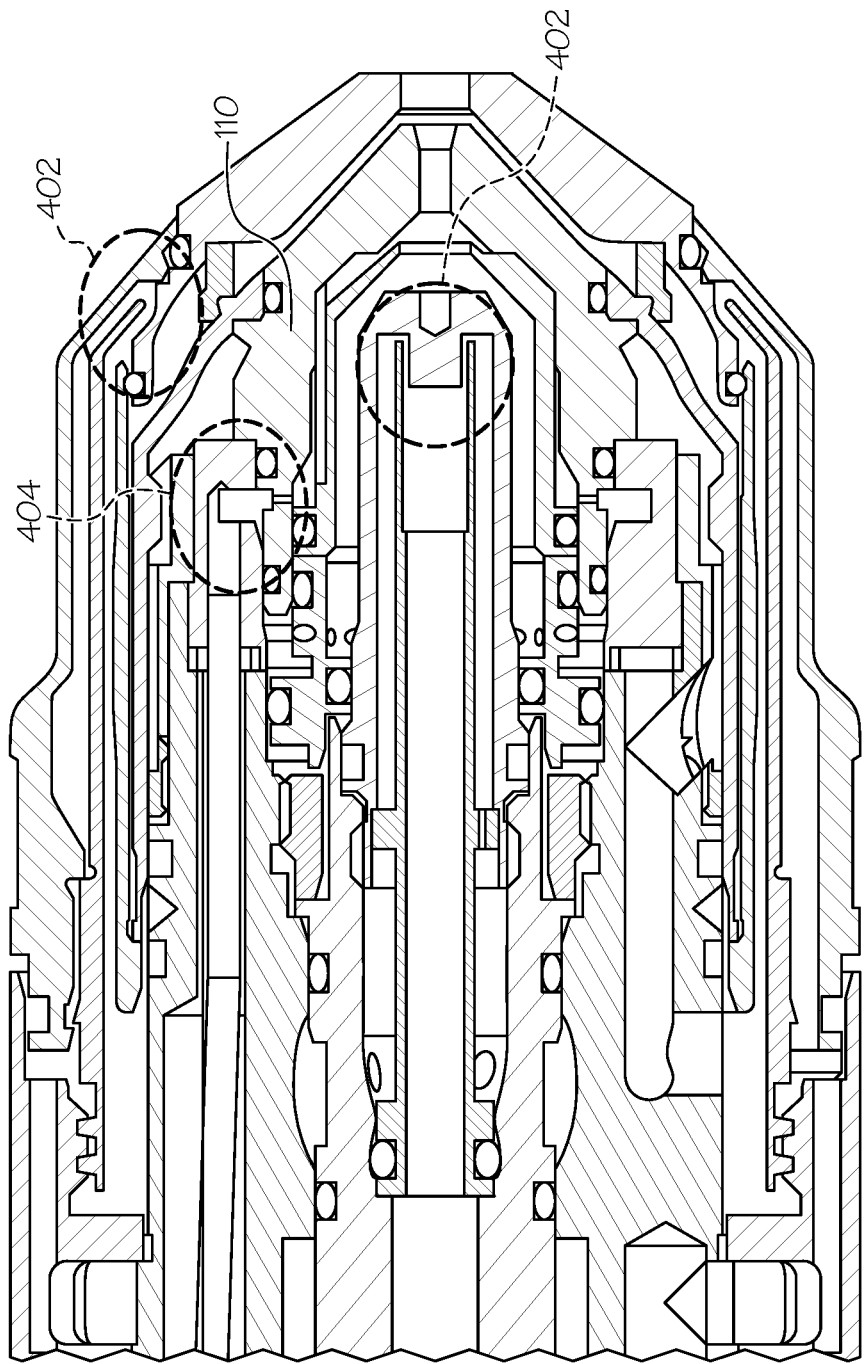
FIG. 3 is a cross-sectional view of an exemplary plasma arc torch illustrating an altered geometry of various consumable components of the plasma arc torch.

In some embodiments, a signal device 202 is a detector (e.g., a sensor) for detecting at least one physical marker of the consumable for uniquely identifying the consumable by its type or individually. The physical marker can be a physical alteration of the consumable, for example. As shown in FIG. 3, identification of a consumable is achieved by altering the geometry of the consumable such that, when it is installed in the torch 100, it affects the wall of an adjacent coolant passageway 402, which in turn alters the rate of a coolant flowing therethrough. Specifically, the altered section of the coolant passageway 402 can restrict the rate of the coolant flow. A signal device 202 can be used to measure the pressure change as a function of the coolant flow rate. Hence, the measured coolant pressure change serves as an identification of the consumable. In another example as shown in FIG. 3, an auxiliary vent line 404 that is connected to a valve and a flow meter is attached to the nozzle 110 to identify the nozzle 110. The valve is opened prior to plasma arc ignition and the auxiliary vent line flow rate is measured by a signal device 202 as a function of plasma pressure during a purge cycle. Therefore, the measured flow rate serves as an identification of the nozzle 110. In another example, one or more uniquely sized metering holes (not shown) can be drilled into the outer retain cap to identify the cap once it is installed in the torch 100. The size of each metering hole is configured to uniquely affect the off-valve pressure and/or the flow rate of the shield gas. Therefore, these measurements, taken by a signal device 202 in a pre-flow routine prior to pilot arc ignition, serve to identify the outer retaining cap.

In yet another example, the shield 125 can be identified by measuring the consumable's length relative to a reference torch datum. In an exemplary measurement process, a torch height controller is used to determine the height at which a known torch fires and begins to cut a workpiece. This height can serve as the reference torch datum. Then, after installing an unidentified consumable into the torch, the height relative to the reference datum is determined. Therefore, simple calculations involving the two heights can be used to determine the relative length of the unidentified consumable. In turn, the relative consumable length can be used to identify the consumable by, for example, referencing a looking-up table that correlates relative consumable lengths to consumable parts.

In some embodiments, a signal device 202 is a barcode that provides optical machine-representation of data about the corresponding consumable. A barcode can be read by the receiver 204 in the form of a barcode reader. Generally, a signal device 202 can convey data about a consumable in the form of any machine readable signals, including radio signals, optical or other light-based signals (e.g., infrared signals or ultraviolet signals), magnetic signals, pneumatic signals, or hydraulic signals.

In some embodiments, a single signal device 202 is assigned to each consumable of a torch to transmit pertinent information about the corresponding consumable. In some embodiments, two or more signal devices 202 are assigned to the same consumable to transmit different information about that consumable. For example, one signal device 202 can transmit information unique to the consumable type, such as the model number and operating parameters for the consumable type, while another signal device 202 can transmit information unique to the consumable itself, such as weight and usage history of the consumable. In some embodiments, the signal devices 202 in the communication network 200 employ different modes of data transmission. For example, while one signal device 202 transmits data as RF signals, another signal device 202 transmits data as optical signals. In some embodiments, the network 200 includes multiple receivers 204. Each receiver 204 is configured (e.g., tuned) to read signals from one or more of the signal devices 202 and transmit the extracted data to the processor 206. In some embodiments, a single receiver 204 is used to read signals from all signal devices 202 in the communication network 200. The processor 206 thus can simultaneously process data associated with multiple consumables.

Figure 4:
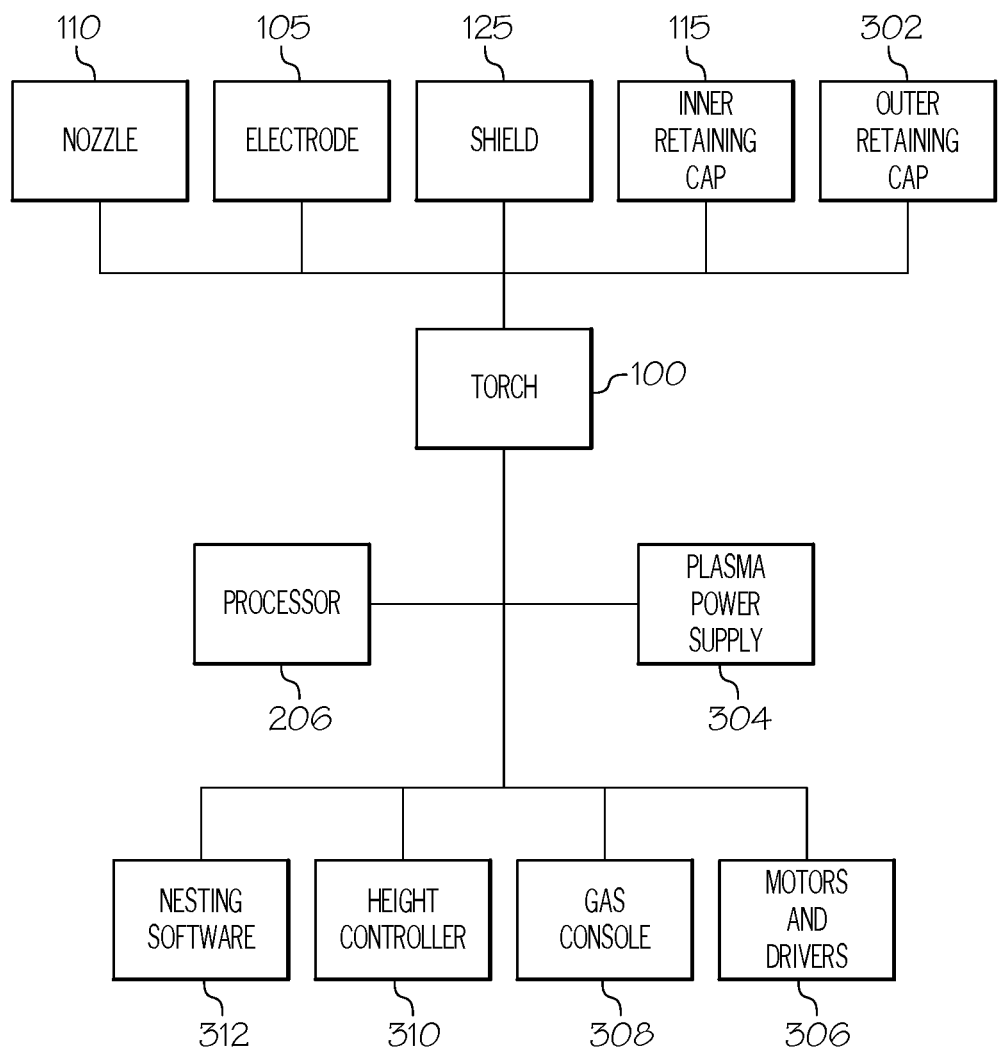
FIG. 4 is a schematic diagram of an exemplary thermal processing system using the communication network of FIG. 2 to control the operation of a thermal processing torch.

FIG. 4 is an exemplary thermal processing system 300 using the communication network of FIG. 2 to control the operation of a thermal processing torch, such as the plasma arc torch 100 of FIG. 1. The plasma arc torch 100 can include one or more consumables including the nozzle 110, the electrode 105, the shield 125, the inner retaining cap 115 and an outer retaining cap 302. At least one signal device 202 is assigned to at least one of the consumables for transmitting information about the corresponding consumable to the processor 206 via the receiver 204. The system 300 also includes a power supply 304 for providing the electrical current necessary to generate plasma arc in the torch 100. Data collected from the signal devices 202 about the respective consumables can be used by the processor 206 to control and optimize the operation of at least one of the plasma power supply 304, the motors and drivers 306, the gas console 308, the height controller 310 and the nesting software 312.

The processor 206 can be located inside or outside of the plasma arc torch 100. In some embodiments, the processor 206 is housed in the power supply 304. In some embodiments, each of the plasma power supply 304, the motors and drivers 306, the gas console 308, the height controller 310 and the nesting software 312 houses at least one processor for processing data from the signal devices 202 to control the functions of the respective module 304, 306, 308 or 310.

Based on the information collected from the signal devices 202, the processor 206 can regulate many plasma system functions simultaneously or near simultaneously and in real-time or near real-time. These system functions include, but not limited to, start sequence, CNC interface functions, gas and operating parameters, and shut off sequences. In some embodiments, the processor 206 uses consumable information to automatically set various parameters of the system 300. In some embodiments, the processor 206 uses consumable information to verify whether certain preset parameters of the system 300 are compatible with the consumables inside of the torch 100. As an example, based on the data collected about the multiple consumables of the torch 100, the processor 206 can control and verify one or more of the following system components: (i) settings of the power supply 304 for regulating power to the torch 100, (ii) settings of the nesting software 312 for processing a workpiece, (iii) settings of the gas console 308 for controlling shield and/or plasma gases supplied to the torch 100, (iv) settings of the height controller 310 for adjusting the height between the torch 100 and the workpiece, and (v) settings of various motors and drivers 306.

In some embodiments, based on the data collected from one or more signal devices 202, the processor 206 interacts with the nesting software 312 to automatically select a cutting program that sets parameters for processing a workpiece, such as the cutting speed, direction, paths, nesting sequences, etc. The cutting program can also define the gas types, gas pressure and/or flow settings and height control settings for the torch in view of the collected consumable data. Traditionally, when a set of consumables is assembled into a torch, an operator needs to manually configure the nesting software 312 to create the cutting program for the torch by supplying information to the software including the type and thickness of the workpiece material being processed, the type of gas being used, and the current rating of the consumable set. In particular, the operator needs to manually input into the processor 206 the current rating of the consumable set. In the present invention, because the current rating information for each consumable is stored in at least one signal device 202, the processor 206 can electronically collect such information from the one or more signal devices 202 and automatically determine the appropriate current setting without user input.

In some embodiments, based on the collected consumable data, the processor 206 selects a suitable cutting program from the nesting software 312 by taking into consideration of consumable data from the signal devices 202 and user-input operating parameters, including the characteristics of the workpiece being cut and the desired cut shape. For example, an operator can first send a generic program file to the nesting software 312. The generic program file specifies, for each workpiece thickness, variable cut speeds, gas flows, kerf compensations, torch heights, etc. that change with different consumable parts. Thus, after identifying the consumables using the signal devices 202, the processor 206 interacts with the generic program file to configure a cutting program for the torch. In some embodiments, after a cutting program is created, the processor 206 uses consumable data collected from the signal devices 202 to verify whether correct consumables are installed into the torch that are appropriate for the program. In addition, the processor 206 can instruct the nesting software 312 to automatically set or correct parameters of the program to enhance compatibility with the consumables loaded into the torch. For example, a consumable requiring 400A current has larger kerfs and lead-ins in comparison to a consumable requiring 130A current. Accordingly, the nesting software 312 can select fewer parts to fit on a nest of the program if the 400A consumable is loaded into a torch.

In some embodiments, based on the data collected from one or more signal devices 202, the processor 206 can manipulate a gas console 308 to control flow of plasma and shield gases to the torch 100 by verifying and adjusting the gas console settings. The gas console 308 houses solenoid valves, flow meters, pressure gauges, and switches used for plasma and shield gas flow control. For example, the flow meters are used to set the pre-flow rates and cut flow rates for the plasma and shield gases. The gas console 308 can also have a multi-inlet gas supply area where the plasma and shield gases are connected. A toggle switch can be used to select the desired gases. The plasma and shield gases are monitored by gas pressure sensors. In one example, a signal device 202 associated with the shield 125 of the plasma arc torch 100 can store information about the type and composition of one or more shield gases suitable for use with the shield 125, along with the optimal flow rate setting of the shield gases. Based on this data, the processor 206 can interact with the gas console 308 to provide the plasma arc torch 100 with the appropriate shield gas at the optimal flow rate.

In some embodiments, based on the data collected from one or more signal devices 202, the processor 206 manipulates the torch height controller 310, which sets the height of the torch 100 relative to the workpiece. The torch height controller 310 can include a control module to control an arc voltage during cutting by adjusting the standoff (i.e., the distance between the torch 100 and the work piece) to maintain a predetermined arc voltage value. The torch height controller 310 can also include an external control module to control the standoff. The torch height controller 310 can further include a lifter, which is controlled by the control module through a motor or driver 306, to slide the torch 100 in a vertical direction relative to the workpiece to maintain the desired voltage during cutting. In one example, based on the data collected from the consumables of a torch, the torch height controller 310 can automatically determine the height to position the torch relative to the top of a workpiece. Therefore, the torch height controller 310 does not need to perform a height sense in order to set an appropriate pierce height and cut height before beginning arc voltage control. In some embodiments, based on the data collected from one or more signal devices 202, the processor 206 manipulates the motors and drivers 306 to move the torch 100 laterally in relation to the surface of the workpiece. The processor 206 can also manipulate the height controller 310 to move the torch 100 vertically in relation to the surface of the workpiece.

In some embodiments, the processor 206 is configured to prevent the thermal processing system 300 from commencing an operation on the workpiece if it determines that the consumables installed in the torch 100 are mismatched with each other, not compatible with the thermal processing system 300 or inconsistent with other pre-selected operating parameters input by an operator. If such a determination is made, the processor 206 can trigger an audio or visual alert indicating to the operator that one or more of the connected consumables are unsupported and that the consumables should be replaced or operator inputs should be revised. Additionally, the processor 206 can prevent initiation of an operation if an alert is triggered. For example, the processor 206 can stop torch operation if the current setting of the shield 125, which is conveyed to the processor 206 by a signal device 202 assigned to the shield 125, is different from the current setting of the nozzle 110, which is conveyed to the processor 206 by a different or the same signal device 202 corresponding to the nozzle 110.

In some embodiments, the processor 206 is configured to prevent the thermal processing system 300 from operating if it determines that at least one of the consumables installed in the torch 100 is not manufactured or otherwise supported by an accepted manufacturer. For example, the processor 206 can stop torch operation if it does not recognize the manufacturer identification, serial number and/or parts number conveyed by a signal device of a consumable. Hence, the thermal processing system 300 can be used to detect and prevent the use of inferior or counterfeit consumables.

In some embodiments, the processor 206 recommends one or more remedial actions to the operator to address alarm situations. For example, the processor 206 can suggest one or more consumables to install in the torch 100 to avoid potential mismatch with other components of thermal processing system 300. The processor 206 can suggest suitable types of workpiece for processing based on the ratings of the installed consumable set. The processor 206 can recommend a cutting sequence that reconciles the settings of the installed consumables with settings provided by the operator.

Generally, the signal devices 202 can store information about torch components other than consumables. For example, the signal devices 202 can store information about the torch body 102 or about one or more leads. Therefore, as one in the art will fully appreciate, the exemplary communication network 200 of FIG. 2 and the configuration of FIG. 3 can be easily adapted to store information about any torch component.

Figure 5:
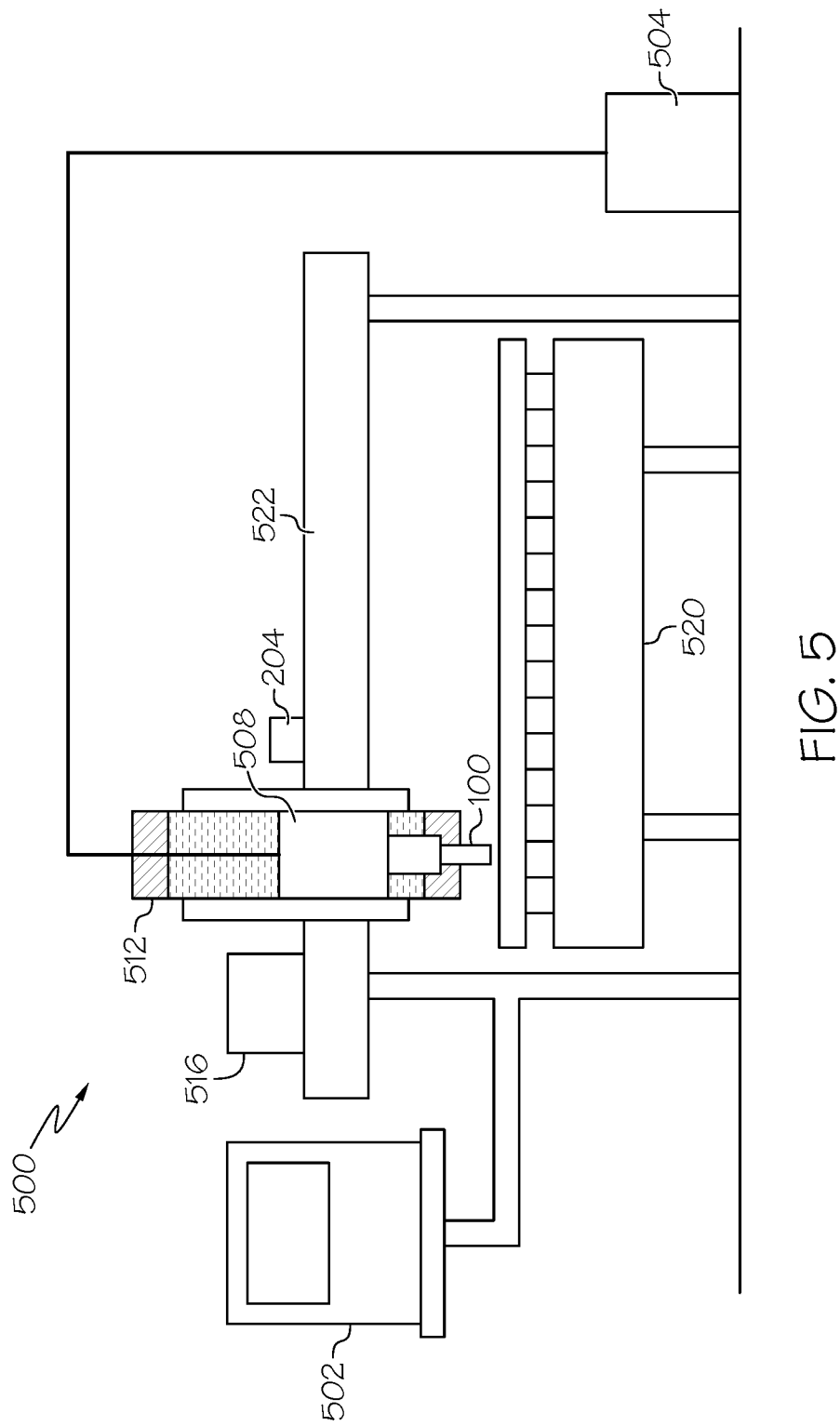
FIG. 5 is a diagram of another exemplary thermal processing system using the communication network of FIG. 2 to control the operation of a thermal processing torch.

FIG. 5 is another exemplary thermal processing system 500 using the communication network 200 of FIG. 2 to influence, control, or otherwise affect the operation of a thermal processing torch, such as the plasma arc torch 100 of FIG. 1. The thermal processing system 500 includes a computerized numeric controller (CNC) 502, a power supply 504, an automatic process controller 508, a torch height controller 512 and a driver system 516, which are similar to the processor 206, the power supply 304, the gas console 308, the height controller 310 and the motor and drivers 306, respectively, of the operating system 400. In addition, the thermal processing system 500 includes a cutting table 520.

To operate the thermal processing system 500, an operator places a workpiece on the cutting table 520 and mounts the torch 100 into the torch height controller 512, which is attached to the gantry 522. The driver system 516 and the height controller 512 provide relative motion between the tip of the torch 100 and the workpiece while the torch 100 directs plasma arc along a processing path on the workpiece. In some embodiments, at least one receiver 204 is attached to a component of the thermal processing system 500 to receive signals emitted by at least one signal device 202 associated with one or more consumables of the torch 100. For example, a receiver 204 can be coupled to the gantry 522 to read signals from the torch 100 after the torch 100 is installed into the system 500. The receiver 204 can also be attached to other system components including, for example, the CNC 502, the height controller 512, the driver system 516 or the cutting table 520. In some embodiments, the receiver 204 is mounted inside or on the surface of the torch 100. In some embodiments, multiple receivers 204 are disbursed throughout the system 500 external to the torch 100, each receiver 204 being tuned to read data concerning one or more specific consumables of the torch 100. For example, while one receiver 204 is used to receive data from a signal device 202 assigned to a nozzle, another receiver 204 is used to read data from a signal device 202 assigned to a shield. After obtaining information from a signal device 202, the receiver 204 can transmit the information to the CNC 502, which uses the information to configure the thermal processing system 500 for processing.

In some embodiments, signal devices 202 associated with two sets of physically identical (or at least substantially identical) consumables are encoded with different consumable information and installed into two different torches. For example, a signal device for the nozzle of one torch can be encoded with Serial Number A while another signal device for the nozzle of a second torch can be encoded with Serial Number B, even though the two nozzles are manufactured to identical design specifications. The nozzles are installed into the respective torches. The two torches are installed into their respective thermal processing systems, and the receiver 204 of each thermal processing system can receive consumable data from the signal device 202 of each torch. In some embodiments, based on the different consumable data, the thermal processing systems are adapted to suitably adjust one or more operating parameters of the systems so as to operate the torches differently, even when the consumables of the two torches are physically identical to each other and all extraneous factors are the same (e.g., the material type and thickness of the workpieces being processed by the two torches are the same). For example, based on the different consumable data, the consumable data can cause the thermal processing systems to interact with the respective nesting software 312 to enable different cutting programs for the two torches and/or interact with the respective height controllers 512 to set different heights for the two torches. In general, based on the different consumable data, one thermal processing system corresponding to one torch can be configured to include features A, B, or C while a second thermal processing system corresponding to the other torch can be configured to include features X, Y or Z. In some embodiments, the same thermal processing system can be configured in different manners depending on the consumable data encoded in the two torches. Exemplary features customizable by a thermal processing system include: plasma gas flow and timing, shield gas flow and timing, cutting current and timing, pilot arc initiation and timing, torch height above the surface of a workpiece and/or torch lateral motion parallel to the surface of a workpiece.

In some embodiments, a thermal processing system is adapted to activate a proprietary process for operating a torch only after determining that the information about one or more consumables in the torch satisfies certain criteria, such as being manufactured by a specific manufacturer. This information is stored on one or more signal devices 202 coupled to the consumables, and may be accessed by the thermal processing system. Therefore, if the consumables are produced by a different manufacturer and do not have the correct (or any) information encoded in their signal devices 202, the thermal processing system does not initiate the proprietary process, even if the "incorrect" consumables are physically identical to the consumables produced by the desired manufacturer. In some embodiments, a thermal processing system does not initiate a proprietary process when the system does not sense any data from the torch consumable. This can occur if, for example, the consumable is not associated with a signal device 202 or the signal device is defective. Therefore, a configuration process executed by a thermal processing system can simply involve the system detecting whether a consumable is associated with the correct data and/or alert the operator if incorrect or no information is detected from the consumable. An exemplary alert include an alarm, a visual indicator, or a combination thereof. In addition, the system can prevent operation of a torch in response to detecting incorrect or no information from the consumable.

The various types of signal devices and receivers described herein can be arranged and packaged within plasma torch components (e.g., consumable components or a torch body) in any of various configurations that can provide adequate structural and thermofluidic protection, as well as enable necessary communication between the signal device and the receiver. For example, referring to FIG. 12, in some embodiments, a thermal processing torch 1200 can include multiple receivers (e.g., RFID reading devices, for example, as discussed above) arranged at different locations along a torch body 1201. Each of the receivers are configured to communicate (e.g., read data) with one or more signal devices (e.g., readable or rewritable RFID devices, for example, as discussed above).

As illustrated, in some embodiments, a first receiver (e.g., a torch body RFID reader) 1204a is arranged within the torch body 1201 and is configured to communicate with various signal devices affixed to different torch components (e.g., consumable components). In particular, the receiver 1204a can communicate with (e.g., to identify or write to) one or more of a torch body signal device 1202a disposed on the torch body 1201, an electrode signal device 1202b disposed on an electrode 1205, a swirl ring signal device 1202c disposed on a plasma gas swirl 1220, and/or a nozzle signal device 1202d disposed on a nozzle 1210.

Additionally, a second receiver (e.g., a retaining cap RFID reader) 1204b is arranged along a structural element of a retaining cap 1215 of the torch in order to communicate with (e.g., to identify) one or more of an outer retaining cap signal device 1202e disposed on an outer retaining cap (e.g., a shield retaining cap) 1215, an inner retaining cap signal device 1202f disposed on an inner retaining cap (e.g., a nozzle retaining cap) 1217, and/or a shield signal device 1202g disposed along a shield 1225.

Figure 12:
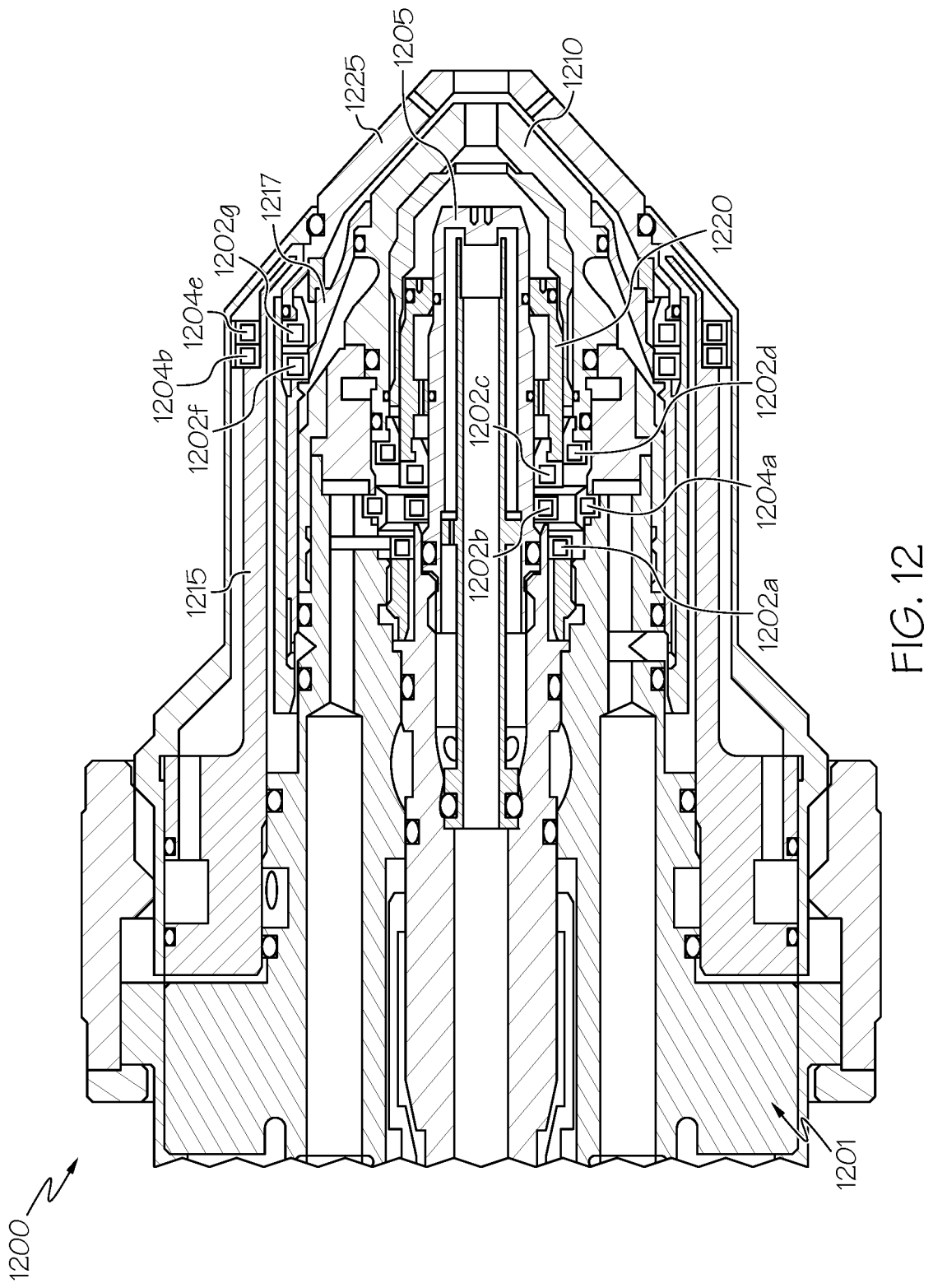
FIG. 12 is a cross-sectional view of an example thermal processing torch illustrating various signal devices affixed to various torch components.

As illustrated in FIG. 12, the signal devices are generally arranged within the respective components in order to help aid in the communication between the signal devices and the receivers. For example, each signal device is typically positioned relatively close to the receiver with which it is intended to communicate. While the permitted spacing between a receiver and a signal device can vary based on the types of devices being used and the type and amount of material surrounding or otherwise in the vicinity of the devices, the signal devices described herein are typically separated from a receiver by a spacing that is about 0 mm to about 10 mm (e.g., about 3 mm to about 6 mm). Additionally, as illustrated with respect to the torch body RFID reader 1204a, the spacing between the receiver and the various signal devices with which the receiver communicates is typically unobstructed by other components (i.e., little or no material (e.g., no metal material) is disposed in the spacing) to enable or improve communication capabilities between the torch body RFID reader 1204a and the signal devices with which is communicates. That is, obstructions (e.g., metal pieces) in between a receiver and signal devices can inhibit (e.g., prevent) effective communication between the devices, so such obstructions are typically avoided. To help enable effective communication between a signal device and a receiver, components that are disposed between the signal device and the receiver (e.g., the baffle of the shield retaining cap 1215) can be formed of non-metal materials, such as one or more of a variety of plastic materials.

The signal devices 1202a-g can be in various forms and configurations that are suitable to communicate with the receivers 1204a, 1204b. For example, in some embodiments, the signal devices are formed of circular, ring-like components containing or enclosing one or more RFID tags that store information relating to the various torch components on which they are installed. The ring-like signal devices can be affixed to the respective torch components by any of various connection techniques including threaded connections, adhesives or a welded connection, or a press or friction fit. Alternatively or additionally, in some embodiments, the ring-like signal devices can be integrally formed as a feature of the torch consumable. However, other arrangements and configurations are possible.

As discussed herein, the various signal devices can provide information associated with the consumable on which they are installed to the torch (e.g., the receivers on the torch) that can be used for torch system setup and use. For example, in some embodiments, using the signal devices, a torch system can identify the particular combination of consumables attached to the torch in order to automatically program torch operating parameters for use. The signal devices can also be used to provide a variety of other types of information to the torch system.

The signal devices described above can be used to execute one or more processes to transfer information to and from a thermal processing system.

For example, in some aspects, a thermal processing system (e.g., the thermal processing system torch 100) having a receiver (e.g., data reading and/or data writing device) 204 (or receiver 1204a, 1204b) that communicates with a signal device (e.g., the data storage device or data tag) 202 (or signal devices 1202a-g) disposed in or on a consumable component arranged within the torch can be used to transmit information (e.g., operating instructions or information about the torch use) between a controller (e.g., processor) 206 of the system and the consumable installed within the torch.

Figure 9:
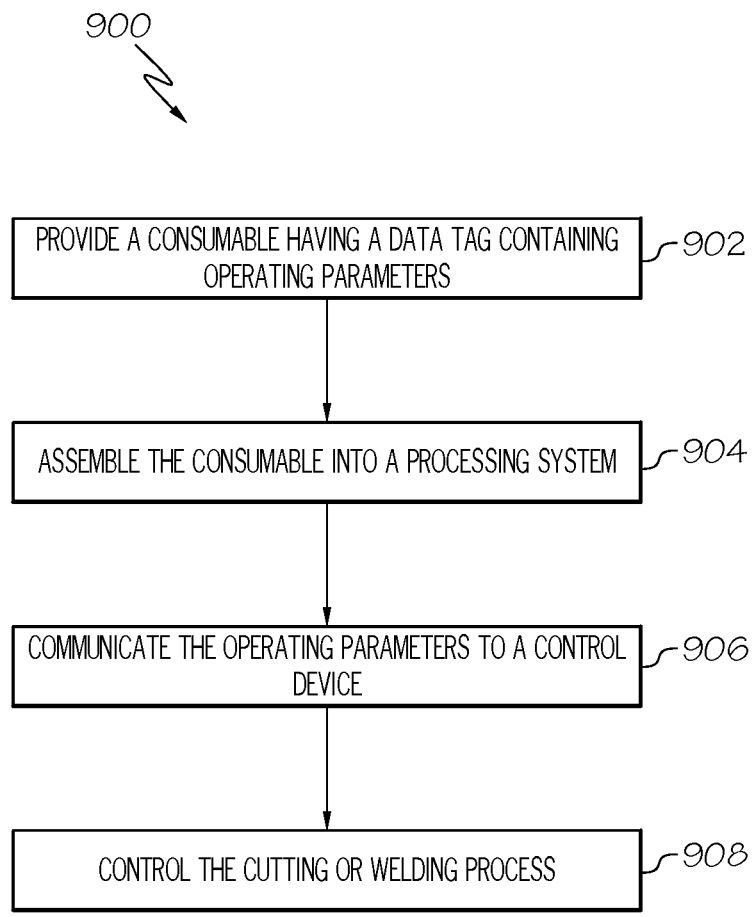
FIG. 9 is a flow chart illustrating an exemplary method for at least partially controlling a process of a thermal processing system using a data storage device disposed in or on a consumable component used by the thermal processing system.

For example, referring to FIG. 9, in some aspects, an exemplary method (900) for at least partially controlling a process of a cutting or welding system includes providing a consumable component (e.g., the electrode 105, the nozzle 110, the swirl ring 120, the shield 125, or other consumable components) having a readable data tag containing information (e.g., operating parameters) (902). For example, the data tag can include the signal device 202 (or signal devices 1202a-g) and, as discussed above, can be in the form of an RFID tag or an optical tag having a visual characteristic to convey information about the consumable component. In some cases, the data tag is rewritable, for example, while the data tag is arranged in the torch.

The consumable component is then assembled into a processing system (904). For example, the consumable component can be installed into a tool (e.g., a torch) of a cutting or welding system. In some cases, the consumable component is inserted into a designated recess within the torch and held in place via any of various retention mechanisms, such as threaded connections (e.g., threaded retaining caps).

With the consumable component in place within the torch, the operating parameters can be communicated (e.g., sent) to a control device of the processing system (906). For example, in some embodiments, the signal device (e.g., readable data tag) is placed in communication (e.g., wired or wireless communication) with the receiver (e.g., the data reading device) disposed within the torch. In some examples, the data tag is an RFID tag and is placed in wireless communication (e.g., near-field communication) by which the data reading device can read the operating parameters from the data tag and transmit the information (e.g., operating parameters) to the thermal processing system.

Once the data reading device has read and transmitted the operating parameters to the thermal processing system, the thermal processing system can control a process (e.g., a cutting or welding process) in accordance with the operating parameters communicated from the data tag (908). As discussed herein, the operating parameters contained on the data tag of the consumable component can include any of various parameters including a cutting program, cutting applications, an electrical current (e.g., ignition or cutting current) or gas (e.g., plasma or shield gas) ramping profile, set up values for the thermal processing system, cut cycle or life data of the torch of consumables, gas flow rates (e.g., ignition or cutting gas flow rates), gas types (e.g., gas selection instructions), pierce delay time, timing parameters, set points, error conditions, thresholds, or a coordination of multiple parameters.

In some cases, as a result of transferring information (e.g., operating parameters, instructions, or programs) from the readable storage device to the data reading device, an operator of the thermal processing machine is not required to manually input as many operating parameters that would be required if the operating data was not transferred. That is, in some aspects, using the method 900 of using consumable components having readable data tags can permit automated or semi-automated setup and operation of the thermal processing machine.

Figure 10:
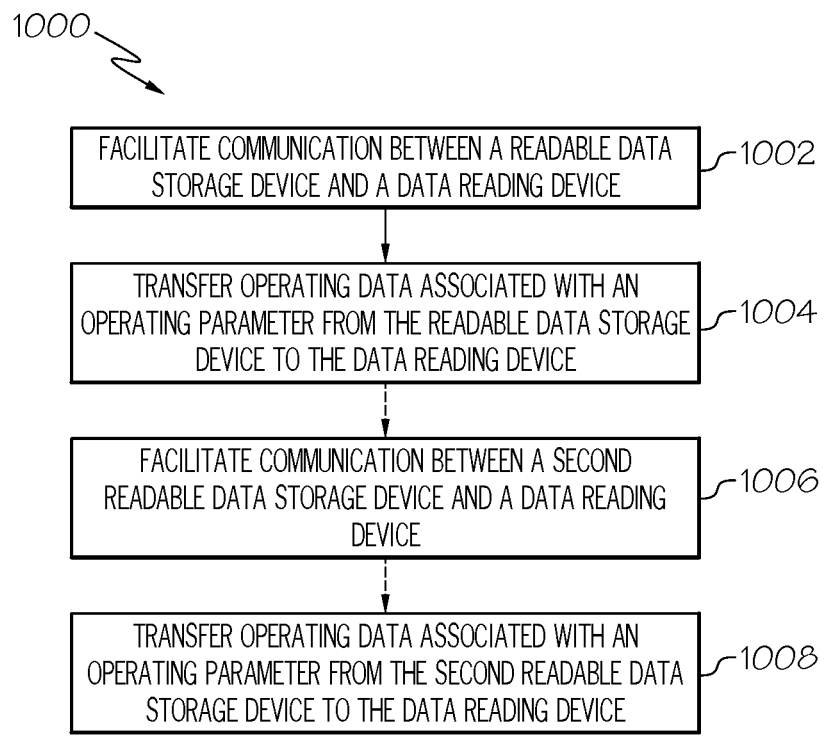
FIG. 10 is a flow chart illustrating another exemplary method for providing information to a thermal processing system using a data storage device disposed in or on a consumable component used by the thermal processing system.

In some embodiments, the methods of transferring information from a signal device of a consumable to a processing system can be executed in combination with methods for identifying consumables based on physical features of consumables. For examples, in some cases, one consumable installed into a torch can include a signal device configured to transfer information to the torch system and another consumable installed into the torch can be identified using physical features of the consumable. For example, as discussed with reference to FIGS. 7-8, changes in fluid flow in or around various consumables can be monitored and used in order to identify consumables installed in the torch In some aspects, referring to FIG. 10, an example method (1000) for providing information (e.g., an operating parameter) to a thermal processing system (e.g., a cutting or welding system) using a replaceable consumable component having a readable data storage device (e.g., the signal device 202 or the signal devices 1202a-g) includes first facilitating communication (e.g., wired or wireless communication) between the readable data storage device and a data reading device (e.g., the receiver 204 or the receivers 1204a-b) of the cutting or welding system (1002). For example, as discussed herein, the readable data storage device can be in the form of an RFID tag and can be placed in wireless communication (e.g., near-field communication) with the readable data storage device.

Once communication is established between the readable data storage device and the data reading device, information (e.g., operating data at least partially defining the operating parameter) is transferred from the readable data storage device to the data reading device (1004). For example, the operating data is typically configured to affect an operation of the cutting or welding system. As discussed herein, the operating data contained on the data tag of the consumable component can be configured to affect any of various operation characteristics including a cutting program, cutting applications, an electrical current (e.g., ignition or cutting current) or gas (e.g., shield or plasma gas) ramping profile, set up values for the thermal processing system, cut cycle or life data of the torch of consumables, gas flow rates (e.g., ignition or cutting gas flow rates), gas types (e.g., gas selection instructions), pierce delay time, timing parameters, set points, error conditions, thresholds, or a coordination of multiple parameters. In some cases, as discussed above, the information sent from the storage device can include software information for the thermal processing system. For example, in some examples, the consumable can contain firmware updates for the thermal processing system. In some cases, the controller can determine the firmware version being used by the thermal processing system and compare it to a version of the firmware update contained on the readable data storage device in order to determine whether the firmware update residing on the readable data storage device is newer than that being used.

In some cases, the operating parameters can be divided and distributed onto two or more data storage devices arranged on two or more replaceable consumable components (e.g., a nozzle and an electrode, a nozzle and a shield, or any other combinations of consumables) that can be installed into a torch. For example, in some embodiments, the method (1000) also includes facilitating communication (e.g., wired or wireless communication) between a second readable data storage device and a data reading device (e.g., the receiver 204 or the receivers 1204a-b) of the cutting or welding system (1006). For example, as discussed herein, the readable data storage device can be in the form of an RFID tag and can be placed in wireless communication (e.g., near-field communication) with the readable data storage device. The second readable data storage device can be placed in communication with the same data reading device with which the first readable data storage device is in communication or a different data reading device (in communication with a common controller as the first reading device) arranged within the torch. Once communication is established between the readable data storage device and the data reading device, operating data at least partially defining the operating parameter is transferred from the readable data storage device to the data reading device (1004).

By dividing or distributing data onto different consumable components, less data is typically required to be stored on a single signal device which can result in easier to configure, program, and manage signal devices. Additionally, dividing data onto different consumable components is expected to create a more versatile and customizable thermal processing system as a result of different consumable components being able to be mixed and matched in various different configurations while properly providing adequate operating parameters to the torch system.

Figure 11:
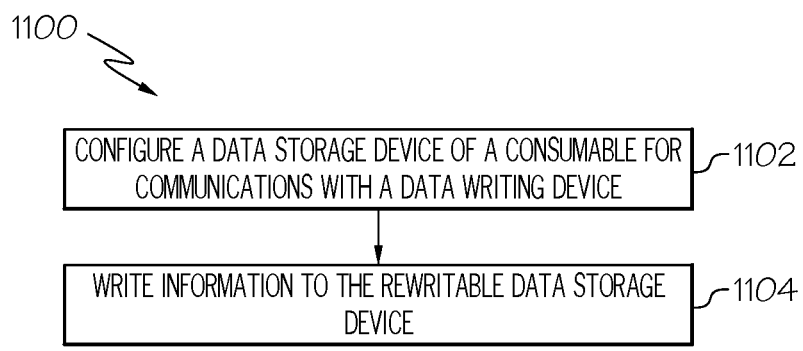
FIG. 11 is a flow chart illustrating an exemplary method for storing information from a thermal processing system to a data storage device disposed in or on a consumable component used by the thermal processing system.

In some aspects, information can be transmitted from the thermal processing system and stored onto the data storage device disposed in or on a consumable component while the replaceable consumable component is in an operation configuration. For example, referring to FIG. 11, an example method (1100) for storing information on a replaceable consumable component used in a thermal processing machine includes configuring a data storage device (e.g., the signal device 202 or the signal devices 1202a-g) for communication with a data writing device (e.g., the receiver 204 or the receivers 1204a-b) (1102). For example, in some embodiments, the data storage device is a rewritable data storage device (e.g., a rewritable RFID tag). That is, a rewritable data storage device is typically able to add new data after the initial writing of data (e.g., with or without deleting or overwriting other data present on the data storage device). In particular, the rewritable data storage device is typically able to have new data written while disposed within the torch. In some embodiments, the operation configuration includes the consumable component being installed within a torch of the thermal processing system ready for use. In some cases, the operation configuration includes the thermal processing system being turned on for operation (e.g., being used). For example, the operation configuration can include the torch being in use (e.g., undergoing a processing (e.g., cutting) operation in the field).

Once configured, the information can be written to the data storage device (1104). For example, in some embodiments, the data writing device transmits (writes) information to the data storage device. The information transmitted to the rewritable storage device can be associated with the thermal processing system, the torch in which the consumable is installed, or a previous use (e.g., a cutting or welding operation) of the replaceable consumable component in or on which the rewritable storage device in installed. For example, as discussed above, the information can include information relating to the frequency of use (e.g., how many cutting or welding operations for which the replaceable consumable component has been used over a given time), relating to a number (e.g., a total number) of cutting cycles for which the replaceable consumable component has been used, or relating to a time duration of the previous use of the replaceable consumable component (i.e., how long the torch was in operation during the previous use.

In some embodiments, the information can relate to the operating parameters of the thermal processing machine during the previous use of the replaceable consumable component. In some cases, the information relates to a failure or error of the torch, consumable, or thermal processing system during the previous use. In some cases, the thermal processing system is configured to periodically (e.g., repeatedly or continually) write data to the rewritable storage device while the consumable is disposed (e.g., operationally installed) within the torch (e.g., during use of the torch). Such information written to the data storage device can potentially be used for various purposes. For example, the information could be used to track usage in order to troubleshoot the machine, in order to review and handle warranty issues (e.g., by being able to observe how an operator was previous using the consumable and thermal processing system prior to inquiring about a warranty), or in order to predict the end of life of the consumable.

In some embodiments, as a result of use data being written to the data storage device as the consumable is used, the operating parameters transferred from the data storage device to the torch controller during subsequent installations into a torch can be altered or updated based on prior use of the consumable. That is, as a particular consumable is used for longer time periods, the preferred operating parameters can change so that the operating parameters transferred to the torch to set up use of the particular consumable can be changed accordingly. For example, as an electrode gets closer to its end of life and the electrode's emitter wears, the preferred torch height setting (e.g., height away from a workpiece during use) may need to be adjusted to compensate for the arc emitting from the electrode a deeper point from the face of the electrode than occurs with an unused electrode.

The signal devices (e.g., data tags (e.g., RFID data tags)) can be designed and arranged within a material processing head (e.g., a plasma torch) in certain configurations that help to provide better RFID communication, and in some cases, better torch performance. In some aspects, signal devices can include antenna coils that are generally formed around a consumable (e.g., around a central axis of the consumable). For example, referring to FIG. 13, a consumable 1300 can include a consumable body (e.g., a unitary body) 1302 and a ring-shaped (e.g., round, orbicular, toroidal, annular, encircling) signal device 1304. As discussed herein, the signal device can be a data tag (e.g., an RFID data tag) configured to communicate with a reading device of a material processing head. As illustrated, the data tag 1304 can have a central axis 1305 (shown in FIG. 14) that is substantially coaxial with the central longitudinal axis 1301 of the body 1302. In some examples, the data tag can be disposed substantially perpendicular to the central longitudinal axis 1301 of the body.

The body 1302 can define a transmission region 1303 that conveys (e.g., delivers, transmits) matter or energy through the body, for example, to be used for material processing (e.g., cutting or welding). For example, the transmission region 1303 can convey a current (e.g., when the consumable is an electrode), a liquid (e.g., water for water-jet cutting), a coolant, a gas (e.g., through a nozzle or a shield), light (e.g., a light beam in laser cutting), or a cutting medium material (e.g., in water-jet cutting) through the body.

The consumable (e.g., the body) can be shaped and configured for use in any of various material processing systems. For example, as discussed herein, the consumable can be one or more plasma torch components, such as an electrode, a nozzle, a retaining cap, a swirl ring, and a shield.

In some embodiments, the consumable can include a cartridge consumable device that is configured to replace one or more other consumable components. A cartridge consumable device is a component that typically includes a housing, a connection mechanism for coupling the cartridge to a plasma arc torch, and components including at least an arc constrictor (e.g. a nozzle) and an arc emitter (e.g. an electrode), and optionally including a swirl ring or swirling feature, a shield, and/or a retaining cap.

In some embodiments, a cartridge can include one or more consumable components, such as a frame or body having one or more sections; an arc emitter (e.g., an electrode); an arc constrictor or arc constricting member (e.g., a nozzle); a feature to impart a swirl to a gas within the plasma torch (e.g., a swirl feature built into the nozzle, a swirl ring, or another swirl feature); a shield (e.g., a nozzle shield that is electrically isolated by the use of aluminum, anodized aluminum and/or a plastic material); an emitting element (e.g., a hafnium emitter); and/or an end cap. In some embodiments, a cartridge can include a substantially copper portion (e.g., an inner core made of above 80%, preferably above 90%, pure or substantially pure copper, or a copper alloy) and a substantially non-copper portion (e.g., a non-copper portion external to the inner core). In some embodiments, a cartridge can be used on a handheld plasma cutting system and/or a mechanized plasma cutting system.

In some embodiments, a cartridge can have enhanced cooling and insulative capabilities, reduced manufacturing and material costs, and/or improved recyclability, durability and performance. In some embodiments, the cartridge provides consumable components in one integrated piece. In some embodiments, the cartridge provides for significantly reduced assembly time (e.g., by a factor of 5-10). In some embodiments, the cartridge can provide for better mating and/or complementary parts so that parts can be chosen correctly for a given cutting task by reducing the need for the user to choose and assemble parts in the field, which can provide for easier recognition of appropriate consumable components for a given cutting task and reducing operator error. In some embodiments, the cartridge enhances consumable alignment and/or spacing because cartridge parts are assembled in a manufacturing setting, thereby achieving tighter tolerances than are possible in the field. In some embodiments, the cartridge improves heat dissipation and/or conduction capabilities. In some embodiments, heat is moved substantially away from the torch, but not so far as to heat or melt plastic components.

Example cartridge components are described in Applicant's co-pending U.S. Patent Publication No. US2014/0069895, filed on Nov. 13, 2013 and entitled "Automated cartridge detection for a plasma arc cutting system" and in Applicant's co-pending U.S. patent application Ser. No. 14/708,972, the contents of both of which are incorporated herein by reference in their entirety. In embodiments in which the consumable comprises a cartridge, the data tag can be disposed around (e.g., encircle) the cartridge (e.g., the cartridge body) such that, as discussed herein, a conductive coil of the data tag can be disposed coaxially with the cartridge.

Figure 14:
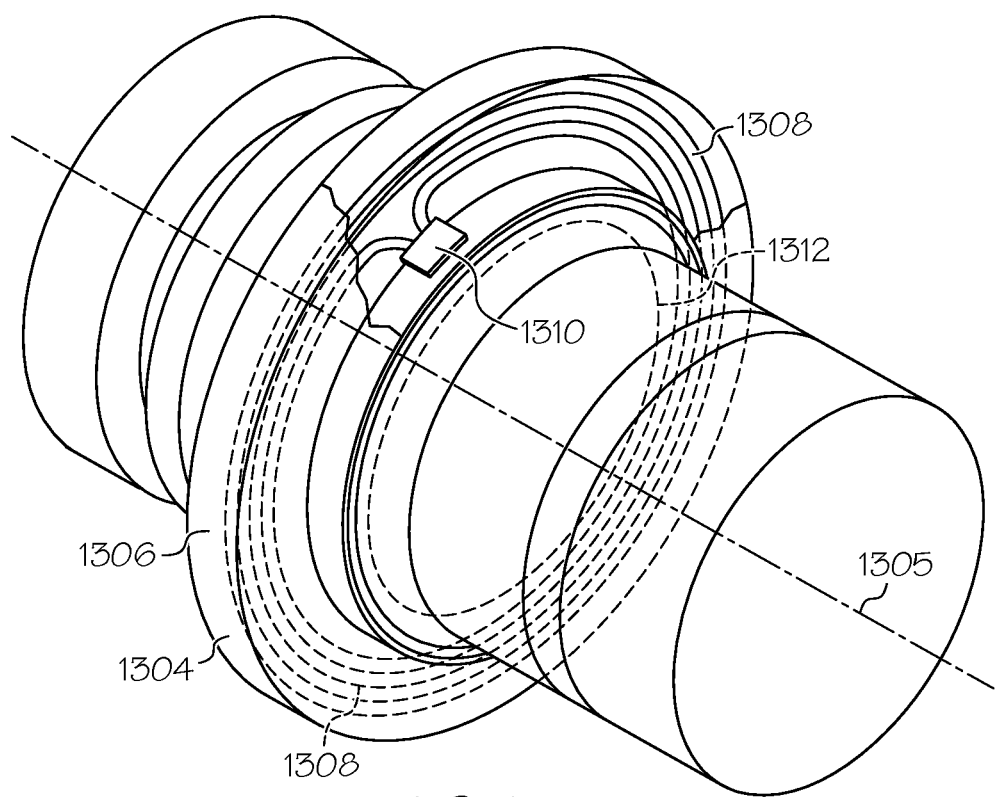
FIG. 14 is a perspective cutaway view of an example ring-shaped data tag on a consumable illustrating a conductive coil around the consumable.

Referring to FIG. 14, the data tag 1304 can include a housing 1306, a conductive antenna coil 1308, and an electronics chip 1310. The housing 1306 can be an enclosure configured to house and protect other components of the data tag, such as the conductive coil 1308 and the chip 1310. As illustrated, the housing 1306 can be generally ring-shaped to define a central opening 1312, which can define a transmission region through which any number of material processing matter can pass (e.g., which can be similar to the transmission region of the body). While the data tag generally defines a central opening, the housing 1306 can be substantially asymmetric about its central axis 1305. For example, the housing can have an outer shape that is non-circular, such as polygonal (e.g., triangular, square, hexagonal) or other non-circular shapes. The housing 1306 can be formed of any structurally suitable (and in some cases chemically resistant) materials such as various plastics.

Figure 17:
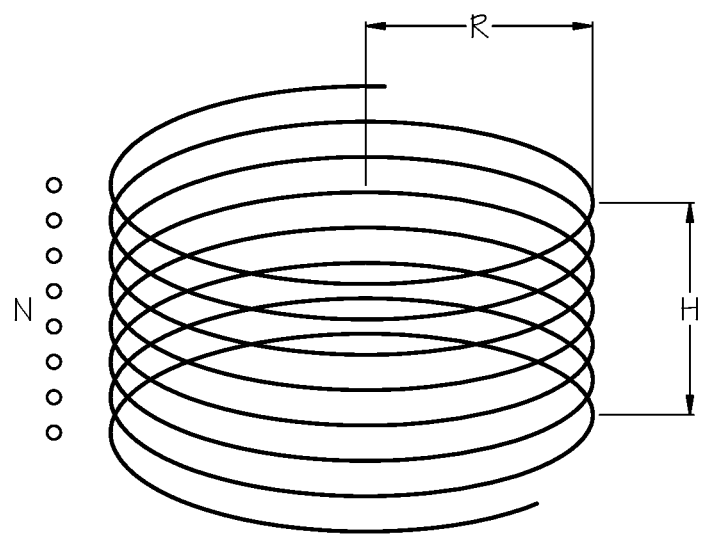
FIG. 17 is a schematic diagram illustrating a conductive coil having a number of turns.

The conductive coil 1308 is typically formed around the central axis 1305 of the data tag 1304. For example, the conductive coil 1308 can encircle (e.g., symmetrically surround) the central axis 1305. The conductive coil 1308 can include substantially a single turn (e.g., to form a ring) or can include multiple turns and can be formed along a substantially helical path. For example, FIG. 17 illustrates an example helical coil having a radius R, a height H, and a number of turns N (e.g., number of revolutions of the coil). As discussed below, the number of turns N of the coil can be adjusted to improve communications, for example, to tune a resonant frequency of the data tag.

The conductive coil 1308 can be formed of any of various materials. For example, the conductive coil 1308 can be formed of a metallic material (e.g., a helical coil). In some examples, the conductive coil 1308 can include a winding of wire (e.g., bare metal wire (e.g., copper wire)). In some cases, the conductive coil can be a printed circuit. For example, the printed circuit can include a printed coil of a conductive material (e.g., a conductive ink material).

During use, the conductive coil can be energized by a broadcasting antenna of a data tag reading device within a material processing head. For example, a magnetic field emanating from a broadcasting antenna (e.g., within a reading device) can couple with the data tag conductive coil. If the coupled field is of sufficient strength, the data tag receives energy from the coupled field which energizes the data tag's internal IC chip and awaits instructions from the reading device for processing and reply.

Figure 15:
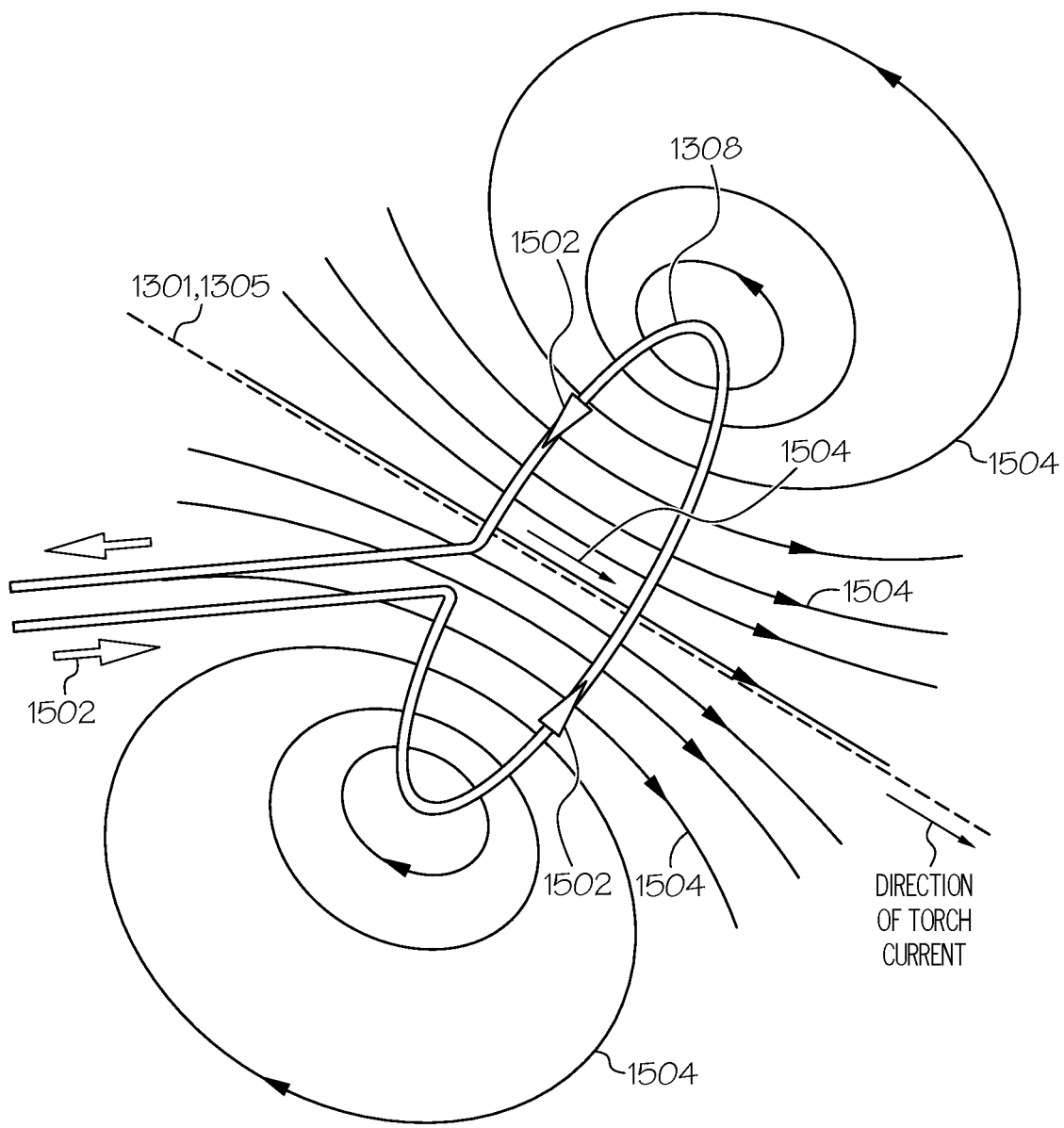
FIG. 15 is a schematic diagram illustrating a current passing through a ring-shaped conductive coil and a resulting magnetic flux generated therefrom.

The shape of the conductive coil (e.g., around the central axis of the consumable) can be useful to improve communications with a corresponding data tag reader and, in some cases, to limit adverse impacts of the communication system on the material processing head's functionality. For example, FIG. 15 depicts an example path of a coil current 1502 (e.g., a current traveling through a ring-shaped conductive coil (e.g., coil 1308)). As discussed above, the coil 1308 can be disposed substantially symmetrically about the central axis 1301 of the consumable, which can be coaxial with the central axis 1305 of the data tag. Since the coil current 1502 follows a generally circular path about the central axes 1301, 1305, a resulting magnetic flux 1504 produced by the coil passes around the circular coil (e.g., in a toroidal shape), and in the central portions of the body, in-line with the central axes 1301, 1305 (consistent with Ampere's right hand rule). That is, by positioning the conductive coil 1308 such that the consumable body 1302 passes substantially through the coil 1308, the resulting magnetic flux 1504 can pass substantially centrally therethrough.

In some cases, aligning the magnetic flux 1504 centrally through the consumable body 1302 can help to limit adverse effects on the material processing head operation or on communication of the data tag. For example, in a plasma arc torch in which an operating current travels through the body 1302, aligning the operating current and the magnetic flux 1502 can reduce the likelihood that the flux would adversely impact the operating current. Additionally or alternatively, such alignment could reduce the likelihood that the operating current could distort or otherwise affect the magnetic flux 1504, which could affect the tag current and the ability for the tag to function properly.

The chip 1310 includes an integrated circuit that is used to store and process information. For example, the chip 1310 modulates and demodulates a radio-frequency (RF) signal, collects DC power from a signal from an incident reader (e.g., a data tag reading device in a material processing head), and performs various other functions. The chip 1310 can include memory to store data for any of the various uses discussed herein. For example, the chip 1310 can have a storage capacity of at least 60 bits of data (e.g., between about 256 bits and about 1.9020 kbits (e.g., about 256 bits and about 900 bits)).

The data tags can be configured to resonate at any of various frequencies, which may coincide with a frequency broadcast by the reading device of the material processing head. For example, the reading device can broadcast a signal at a frequency of about 12 MHz to about 14 MHz (e.g., about 13 MHz). Therefore, the data tags can be designed and configured to have a resonant frequency at or about 12 MHz to about 14 MHz (e.g., about 13 MHz (e.g., about 13.56 MHz)).

In some embodiments, the memory can be of a readable and writable (RW) configuration so that the data tag can be read and written to repetitively. In some examples, the memory can be written a number of times (e.g., multiple times) and then locked (e.g., permanently locked) to limit (e.g., prevent) further writing operations. In some cases, the memory does not need to be locked all at once but rather can be locked at different times and include different percentages of the total data space locked.

That is, in some embodiments, data stored on the chip is divided into two or more segments. For example, a first segment of the data can be locked and a second segment of the data can be unlocked. In some cases, the first segment and the second segment can both be locked, for example, independently of one another. As a result, the first segment and second segment can typically be locked and unlocked at different times and for different purposes, such as during system use or during consumable set up.

In some cases, the first segment of the data can include consumable identification data (e.g., serial numbers, manufacturer information, a type of a consumable, etc.) and the second segment of the data can include data pertaining to the operation of the consumable (e.g., number of hours used in operation, operating conditions used during operation, estimated hours until failure, desired operating instructions to be used with the consumable, etc.).

Other examples of potential data locking configurations can include: i) locking the unique identification number (e.g., serial numbers) at the time when the data tag is manufactured; ii) locking some data at different times and steps (e.g., milestones) while the data tag is being manufactured; iii) locking some data at different times as the data tag is being distributed (e.g., passing through its distribution channel); iv) locking some data at different times during the data tag's usage or service life; and/or v) never locking certain portions of data space.

Memory can also be portioned (e.g., partitioned, divided, etc.) and potentially locked by certain business partners involved in the data tag or consumables manufacture and distribution, such as a manufacture, wholesale distributor, retail seller, equipment servicer, or other involved party. Examples of potential data portioning configurations can include: i) a portion of the memory can be controlled by the data tag manufacturer including data content and locking; ii) a portion of the memory can be reserved for a channel partner to determine the memory content (e.g., data to be stored) and locking procedures; and/or iii) a portion of the memory can be reserved for an end-user of the tag to determine the memory content (e.g., data to be stored) and locking procedures. Memory portioning techniques can be implemented in addition to, or in combination with, one or more of the data locking configurations described above.

Other uses or implementations of memory portioning and data storage are possible.

Using consumables having ring-shaped data communication signal devices can help to configure material processing systems (e.g., plasma arc systems) to have better communication between signal devices associated with consumables and a reading device of the material processing system. In some examples, ring-shaped data tags (e.g., ring-shaped conductive coils) can help limit undesired interference between the communication system (e.g., the data tag and the reading device) and other portions of the material processing system, such as electrical systems used to operate the material processing system.

For example, methods for reducing communication interference of an RFID communication system in a plasma arc or welding torch having a consumable component disposed therein can include providing a ring-shaped RFID tag (e.g., the data tag 1304) coaxially disposed relative to the consumable component (e.g., the consumable body 1302). As discussed herein, the data tag can define an open central portion (e.g., central opening 1312) and has a conductive coil (e.g., the coil 1308) disposed substantially around the open central portion. For example, as discussed above, the conductive coil can include a magnetic material (e.g., wire) wound in a circular shape to be disposed around the open central portion.

The consumable component can be positioned in a torch such that the central axis of the consumable component is disposed along a substantially similar or common axis (e.g., be coaxial with) the open central portion of the RFID tag. For example, the data tag can be coupled around the consumable body or at an end of the body so that the conductive coil of the data tag is substantially centered around the central axis of the body.

A current can be passed along a portion of the central axis of the torch (e.g., along the portion of the consumable) that extends through the ring-shaped RFID tag. That is, a torch current can be passed through a torch (e.g., along a consumable) to generate a cutting medium, such as a plasma cutting current. In some cases, a cutting current can be passed through a central region of the consumable.

A tag current can be generated through the conductive coil. The tag current can flow around (e.g., encircling) at least a portion of the central axis of the torch. The tag current can be generated by a data tag reader antenna (e.g., a conductive coil) within the torch. For example, the data tag reader antenna can be excited (e.g., energized) to broadcast a frequency (e.g., a broadcast frequency). In some examples, generating the tag current can include generating current along a helical path. In some examples, the helical path is formed substantially symmetrically about the central axis. For example, the current in the tag's conductive coil is generated through electromagnetic induction as described by Faraday's law of induction and more generally by the Maxwell-Faraday equation. The time-varying magnetic flux created by the reader antenna induces an electro-motive force (EMF) in the tag's conductive coil which drives a current flow in the tag's conductive coil.

As a result, at least in part, of the substantially circular path along which the tag current flows, a magnetic flux given off from the conductive coil can form a general toroidal path around the coil, as discussed above and depicted in FIG. 15. As discussed herein, at least in part as a result of the orientation of the ring-shaped conductive coil being formed around the consumable body, the flux path given off by the conductive coil is better aligned with the cutting current flowing through the consumable. At least in part as a result of the better aligned current and magnetic flux, the likelihood of interference between the RFID communication system and the torch operation can be reduced, which can yield better torch performance as discussed herein.

Figure 13:
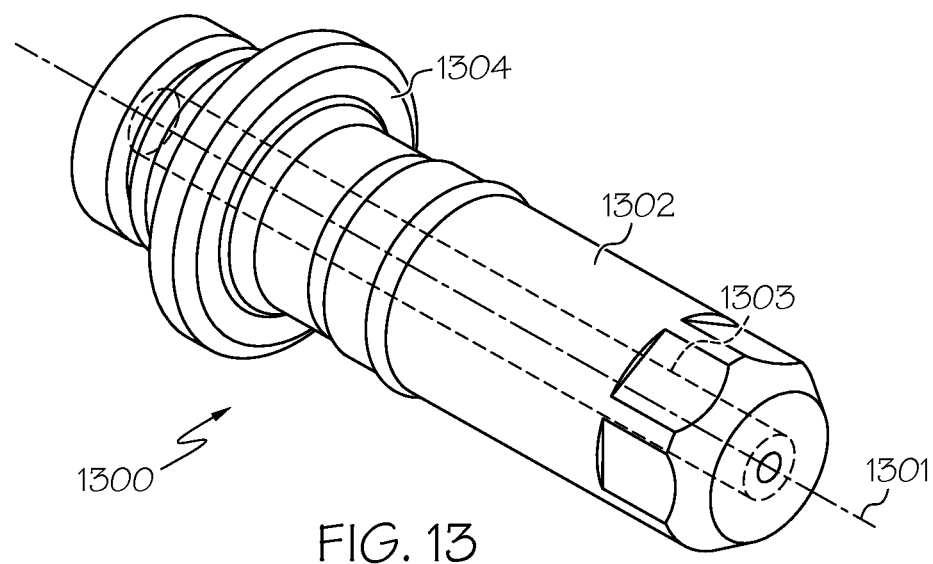
FIG. 13 is a perspective view of an example consumable for a material processing head having a ring-shaped data tag.
Figure 16:
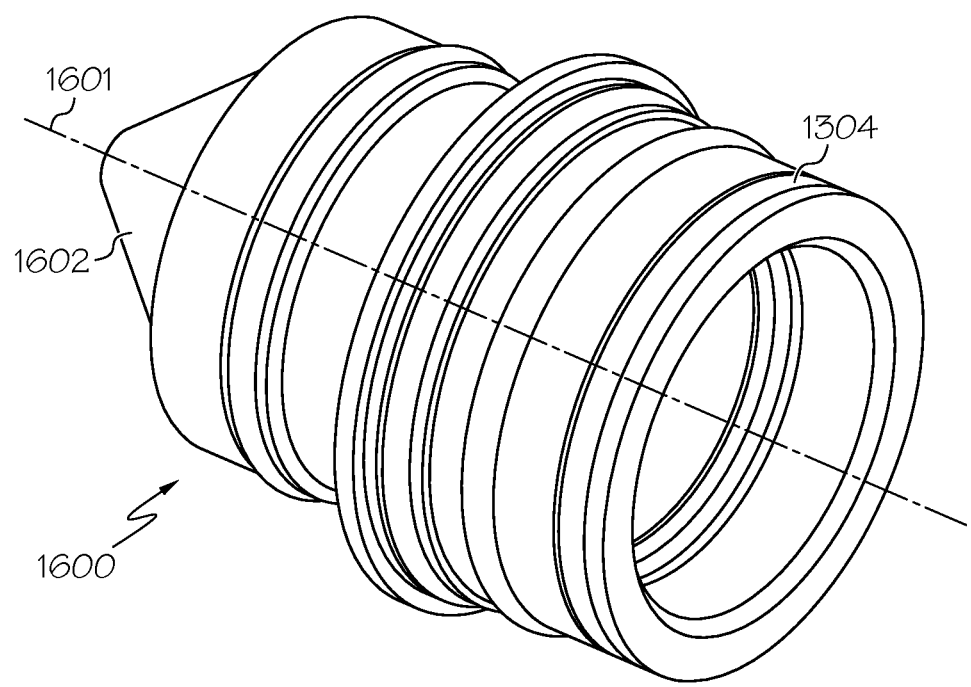
FIG. 16 is another example of a consumable for a material processing head having a ring-shaped data tag.

While FIG. 13 illustrates a certain type of consumable (e.g., a plasma torch electrode), the data tag components and methods described herein can be implemented on any of various other types of consumable components. For example, FIG. 16 illustrates a plasma torch consumable (e.g., a nozzle) 1600 including a body 1602 shaped to receive an electrode. The nozzle 1600 also includes a data tag 1304 attached to an end of the body. As illustrated and described herein, the data tag 1304 can be disposed substantially coaxially with a central longitudinal axis 1601 of the body 1602. The data tags described herein can also be used in association with any of various other consumable components, such as torch components (e.g., shields or retaining caps) water jet components (e.g., water tubes or orifices), or laser cutting head consumables (e.g., lenses).

As discussed above, material processing heads can include multiple data tags, which can each be associated with one or more consumable components disposed in a material processing head. Using multiple data tags can help the material processing head identify individual components for any of the various reasons or uses discussed herein. As discussed below, multiple data tags can be constructed and arranged within a material processing head in a manner that helps to facilitate better communication between multiple data tags and a data tag reader.

The level of energy transferred to a data tag typically increases as the data tag is closer to the reading device. As a result of the energy transfer to the data tag, a current is induced in the tag from the energy transfer as discussed herein. An integrated circuit (IC) of the data tag (e.g., within the chip) typically requires a certain amount of energy to function properly. Energy received that exceeds this required energy level to function can be turned into heat by the chip, as the chip shunts some or all of the current that it does not need to function. Therefore, when a data tag is very close to a reading device (e.g., an antenna coil of the reading device), it receives a very strong magnetic field strength and typically receives more energy than it needs and a current larger than what it needs is induced in it. As a result of the high current, the unneeded current can simply be shunted away.

However, the current induced within the data tag generates its own magnetic field that may counteract or reduce the field from the reading device antenna coil. Another factor that could affect the data tag's current level is the data tag's Quality Factor (the "Q" of the circuit), which is related to the circuit's resonant frequency. Therefore, changing the resonant frequency of the data tag (e.g., of the conductive coil of the data tag) to more greatly deviate from the reading device's frequency can have the effect of lowering the data tag's Q, which will lower the induced current for a given magnetic field strength. A lower induced current will generate a lower countering magnetic field, which results in a higher magnetic field reaching the other, further data tags.

Figure 18:
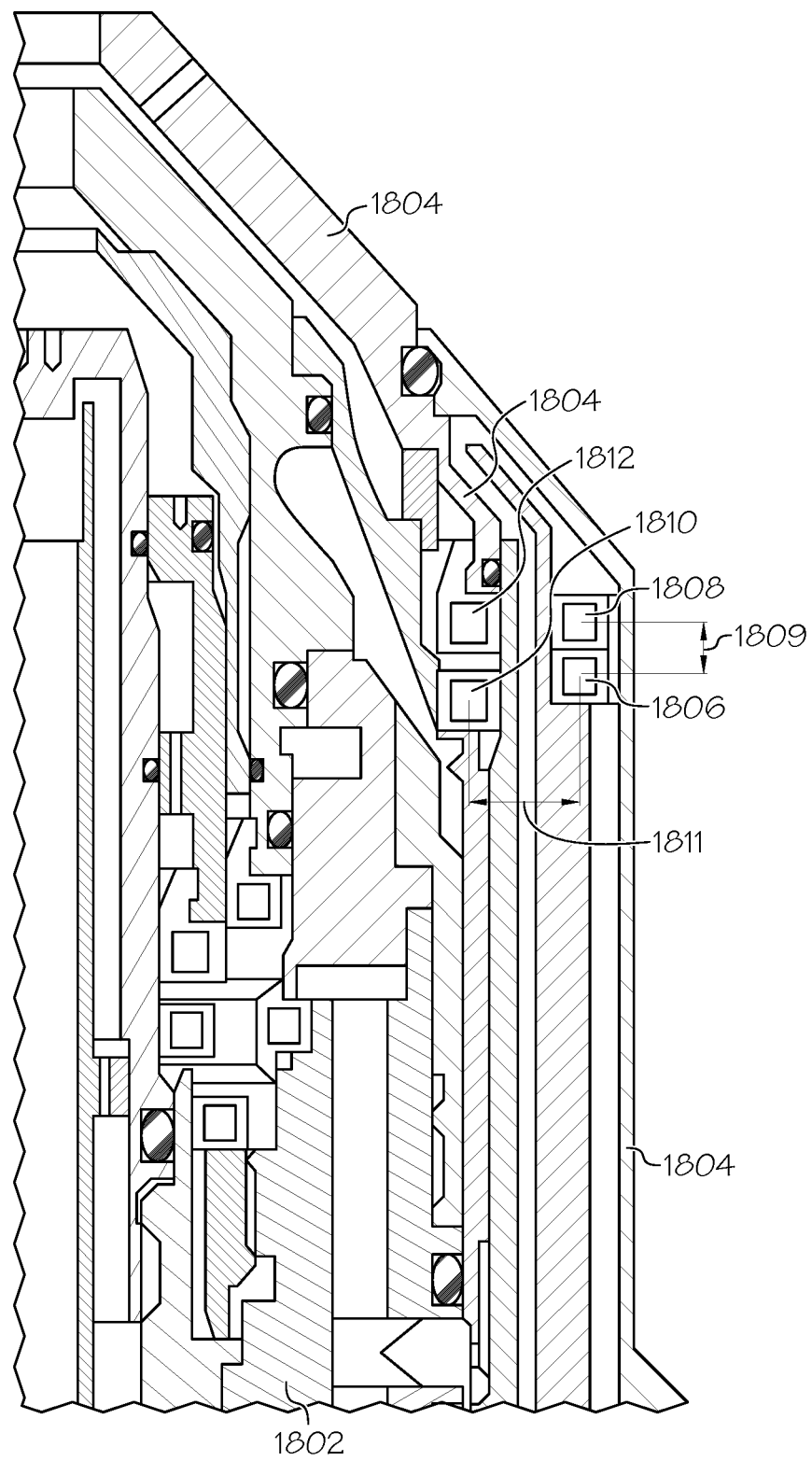
FIG. 18 is a cross sectional view of an example material processing head having multiple data tags in communication with a data tag reading device.

Referring to FIG. 18, a material processing head 1800 can include a material processing head body 1802 and multiple consumable components 1804 removably attached to the material processing head 1800. For example, the consumable components can include a nozzle, a nozzle retaining cap, a shield, a shield retaining cap, or an electrode. The consumable components 1804 can include one or more data tags configured to communicate with a data tag reading device (e.g., an RFID reading device with an antenna) 1806.

For example, the material processing head 1800 can include a first data tag 1808 associated with (e.g., coupled to) a first consumable component (e.g., a shield retaining cap), a second data tag 1810 associated with (e.g., coupled to) a second consumable component (e.g., a nozzle retaining cap), and a third data tag 1812 associated with (e.g., coupled to) a third consumable component (e.g., a shield). As illustrated, the data tags 1808, 1810, 1812 can be arranged at different lengths away from the reading device 1806 depending on any number of factors including torch configuration and consumable design. In some embodiments, the data tags can be about 1 mm to about 6 mm away from the reading device. Based on their respective positions relative to the reading device, the data tags can be specifically designed and configured to better communicate with the reading device by tuning (e.g., manipulating a resonant frequency) each data tag for communicating with the reading device. Data tags that are positioned further from the reading device can be designed to better communicate with the reading device than a data tag that is closer to the reading device so that the reading device can properly communicate with both the close tag and the far tag.

For example, the second data tag 1810, which is separated from the reading device 1806 by a second spacing 1811 is farther from the reading device 1806 than the first data tag 1808, which is separated from the reading device by a first spacing 1809. If the first data tag 1808 and the second data tag 1810 were to have the same resonant frequency, it would be possible that a majority (e.g., a significant majority) of the energy given off by the reading device would be absorbed or captured by the closer, first data tag 1808, resulting in a large induced current that is predominantly discarded by the first data tag 1808 and resulting in a large counter magnetic flux from the predominantly discarded induced current in the first data tag 1808 which lowers the net magnetic flux reaching the second data tag 1810 and finally results in poor communication between the reading device and the second data tag 1810. To help counteract communication problems with farther data tags, the farther tags can be configured to better communicate with the reading device than the closer tags. That is, the closer data tags (e.g., data tag 1808 in the example of FIG. 18) can be de-tuned to have reduced communication capabilities with the reading device. In some examples, the closer data tags can be adjusted to have a resonant frequency that is farther from (e.g., deviates more from) the resonant frequency (e.g., a reader broadcast frequency) of the reading device than the data tags positioned at greater distances from the reading device. Deliberately adjusting a tag's resonant frequency away from the reader broadcast frequency can be referred to as "detuning" the tag. As a result, the closer data tag would have a smaller induced current through it than it would have if it had not been detuned. The smaller induced current creates a smaller counter magnetic flux which results in a greater signal strength between the second data tag and the reading device than would exist without detuning the first data tag.

By way of an example, in some embodiments, a communication signal between the first data tag and the reading device can be about half as strong as a result of detuning than it would be without detuning. For example, a received signal strength indicator (RSSI) (on a scale that can range between 0-7 for some implementations, where 0 is the lowest strength and 7 is the highest strength) between the first data tag (e.g., the closer data tag) and the reading device can be de-tuned to be mid-range, such as between about 2 and about 4 (e.g., about 3), and a signal strength between the second data tag and the reading device can be between about 6 and about 7.

Data tag locations and distances from the reading device coil are typically fixed inside the torch (e.g., when the consumable on which the data tag is attached is installed in the torch) and can be taken advantage of to de-tune the closer data tag (e.g., to reduce the closer data tag coupling with the reading device). For example, the data tag's conductive coil will resonate with the capacitor inside the data tag's integrated circuitry. The resonance will allow a higher current to flow inside the coil than without resonance. The amount of the increase in current due to resonance is defined by the Quality Factor (Q) of the resonant circuit. In some cases, as discussed herein, high current flow through a data tag's conductive coil can interfere with the communications of other data tags. A reduction in the resonant tag current is expected to reduce the interference. The data tag's desired resonant current can be achieved by changing the resonant frequency of the data tag (e.g., slightly), which can have the effect of changing the operating Q of the circuit.

For example, in embodiments in which a resonant frequency of the antenna coil of the reading device can be about 13.5 MHz to about 13.6 MHz, a resonant frequency of the first data tag can be about 17 MHz to about 20 MHz and a resonant frequency of the second data tag can be about 13 MHz to about 14 MHz. It shall be understood that the tag resonant frequencies can deviated from the reading device's broadcast frequency by being either greater than or less than the broadcast frequency, e.g. the first data tag's resonant frequency can alternatively be about 7 MHz to about 10 MHz. In some cases, the first spacing 1809 can be about 1 mm to about 3 mm and the second spacing 1811 can be about 4 mm to about 6 mm.

The resonant frequencies of the data tags can be adjusted by a variety of factors. For example, the data tag's conductive coil and capacitor inside the integrated circuitry (within the chip) form a series resonant circuit. The resonant frequency of the circuit is achieved when the capacitive reactance and the inductive reactance magnitudes of the circuit are equal (and cancel), as shown below in Equation 1. Resonance occurs when $1/j\omega C = j\omega L$, which can be solved to find the resonant frequency as:

$$\omega_0 = \frac{1}{\sqrt{LC}} \qquad \text{Eq. 1}$$

where $\omega_o$ is the resonant frequency in radians/sec (and $\omega_o = 2\pi f_o$), C is the capacitance, and L is the inductance.

Since the capacitance may be fixed based on the integrated circuitry of the chip, a factor that serves to be adjusted to modify the resonant frequency is the inductance of the conductive coil. For example, the inductance (e.g., and therefore the resonant frequencies) can be determined by the number of turns of the conductive coil material. Varying the number of turns can include varying a number of turns along a single layer coil or a multi-layer coil. In some examples, the first tag comprises a conductive coil having a first number of turns and the second tag comprises a second conductive coil having a second number of turns, where the second number of turns is greater than the first number of turns. For example, a first tag positioned about 2 mm from a reading device can have a coil of 10 turns and a second tag positioned about 5 mm from the reading device can have a coil of 15 turns.

Additionally or alternatively, the inductance of the conductive coil (e.g., and therefore the resonant frequencies)

can be determined by the diameter of the conductive coil material. An equation for a simple solenoid is shown below:

$$L = \frac{\mu N^2 (\pi d^2/4)}{l} \qquad \text{Eq. 2}$$

where μ is the permeability of the region containing the magnetic flux, N is the number of turns of the coil, d is the diameter of the coil, and l is the length of the coil. From the equation it can be seen that increasing the diameter of the coil will increase the inductance and decreasing the diameter will decrease the inductance. From equation 1 above, it can be seen that increasing the inductance will decrease the resonant frequency and decreasing the inductance will increase the resonant frequency.

Additionally or alternatively, resonant frequencies can be determined by selecting an integrated circuit (IC) capacitor of the data tags to have different capacitance. For example, to have a higher resonant frequency, the IC capacitor can have a lower value as seen in Equation 1. In some embodiments, the first data tag can include a capacitor with a capacitance that is about 20 pico-Faraday (pF) to about 25 pF and the second data tag can include a capacitor with a capacitance that is about 85 pF to about 105 pF.

Figure 19:
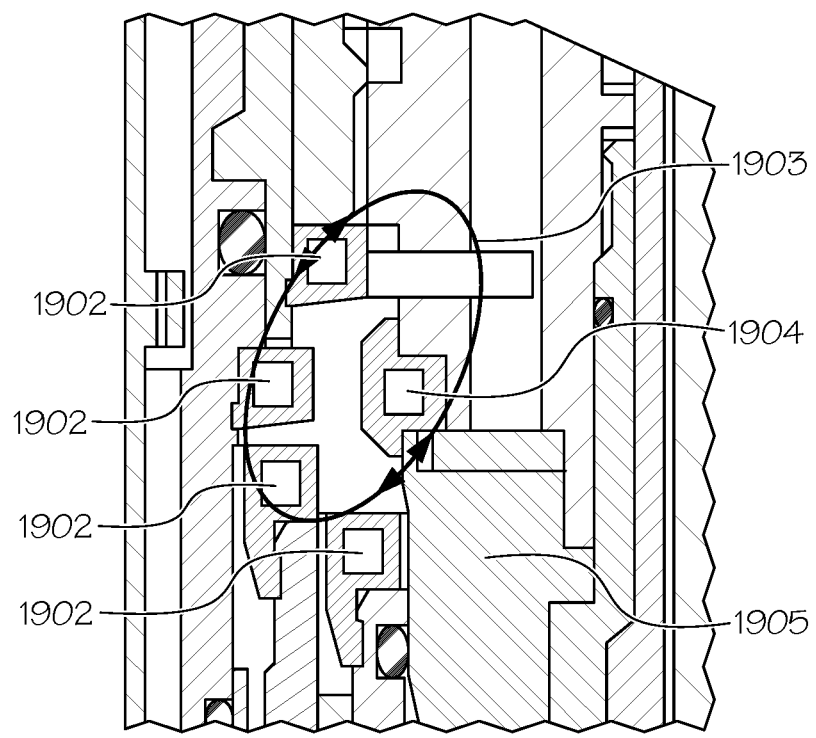
FIG. 19 is a cross sectional view of an example offset magnetic flux field generated from a data tag reading device.

Magnetic field inhibiting materials (e.g., metal materials) and the close grouping of tags near a reading device antenna coil have also been found to interfere with (e.g., inhibit) communication between the reader device and the data tags. That is, a magnetic field extending from a reading device antenna coil typically induces currents in conductor material (e.g., metal material) that it encounters, for example, adjacent the reading device antenna coil. The induced currents create their own fields which are substantially out-of-phase with the incident field, thereby creating a net reduction in the field. For example, referring to FIG. 19, a reading device 1904 positioned near (e.g., adjacent) an area of magnetic field inhibiting material (e.g., a metal material) 1905 can generate and broadcast a skewed (e.g., off center or otherwise distorted) flux field 1903 due to the presence of the metal material. That is, the volume of metal material can serve to effectively "push" the flux field. The skewed flux field 1903 has been depicted, for simplicity purposed in explanation, as a pushed, off-center field. As depicted, the skewed flux path can fail to align with one or more of data tags 1902 positioned around the reading device 1904. As a result, communication between data tags 1902 and the reading device 1904 can be inhibited. Therefore, in addition to tuning for improved communication, the data tags and be selectively positioned in regions of a material processing head that are conducive to providing a pathway for magnetic flux to travel to generate a magnetic field in which an antenna coil can be excited and energized (e.g., a flux communication zone).

The flux communication zone can be toroidal in shape. For example, the flux communication zone can have (e.g., or define) an open space in all directions around the broadcasting antenna. If the flux communication zone below the antenna (e.g., towards the torch tip) is blocked by a magnetic field inhibiting material (e.g., metal), it is expected to interfere with the flux communication zone on all sides of the antenna (e.g., effectively distorting the flux path as described herein). Therefore, in some examples, if a data tag is positioned in a +Y direction (e.g., axial direction positioned proximally (e.g., towards the torch tip)) relative to the reading device at a distance A from the reading device, then the flux communication zone would be expected to be at least the distance A in the −Y direction (e.g., the axial direction positioned distally (e.g., away the torch tip)), +X direction (e.g., the radial direction away from the central axis), and −X direction (e.g., the radial direction towards from the central axis) for the desired communication.

Figure 20:
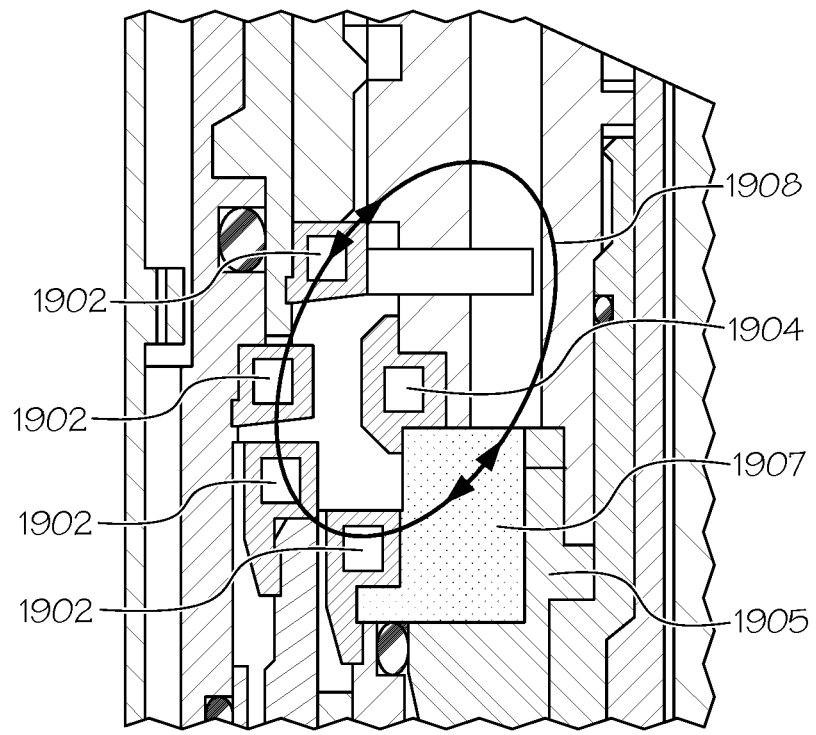
FIG. 20 is a cross sectional view of an example magnetic flux field generated from a data tag reading device within a flux communication zone near an absence of magnetic field inhibiting material.

Flux communication zones can be created in a material processing head to help improve communication between the data tags and the reading device by altering the environment in which the reading device and/or the data tags are disposed. That is, data tags can be "uncovered" by moving (e.g., removing) metal away from them to allow the flux lines to couple with them. For example, referring to FIG. 20, portions of the magnetic field inhibiting materials 1907 around or adjacent to the data tags 1902 and the reading device 1904 can be removed (e.g., by machining processes) or can be replaced by another material that is less likely to inhibit the flux field given off by the reading device, such as a plastic material. Alternatively or additionally, data tags can also be moved or otherwise positioned within the skewed flux path. For example, a data tag can be moved closer to the reading device antenna coil so that they are unobstructed by the presence of metal material and positioned within the skewed flux field.

As illustrated, the reduction in magnetic field inhibiting materials can allow the flux path 1908 to be more centered (e.g., toroidal) about the antenna coil of the reading device 1904 such that the flux 1908 can be received by the data tags 1902 in a more consistent manner. Better reception by the data tags can help to improve communications between the reading device and the data tag.

Figure 21:
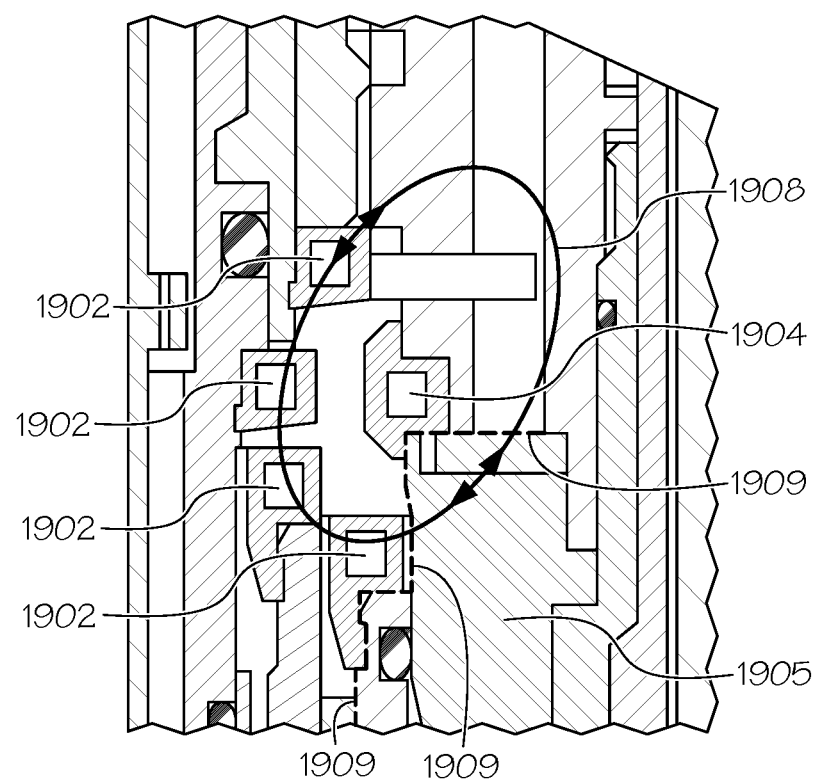
FIG. 21 is a cross sectional view of an example magnetic flux field generated from a data tag reading device within a flux communication zone near a magnetic field amplifier.

Additionally or alternatively, flux communication zones can be created in a material processing head using one or more magnetic field amplifiers to help manipulate the flux generated by the reading device so that the flux better aligns with the data tags. For example, referring to FIG. 21, a material processing head can include a data tag in a flux communication zone formed by one or more magnetic field amplifying materials 1909 applied to (e.g., coated or disposed along) metal components 1905 near or adjacent to the reading device. In some embodiments, magnetic field amplifying materials 1905 can include a ferrite material, such as a flux tape material. For example, the amplifying materials can include an EMI absorber, gasket, or grounding pad. Commercially available products that are expected to be suitable can include AB7000 or AB5000 series products, such as AB5010S, from 3M™ of St. Paul, Minn. and FAM1-100-100-0.2-1A from t-Global Technology™ of Thief River Falls, Minn.

Figure 6:
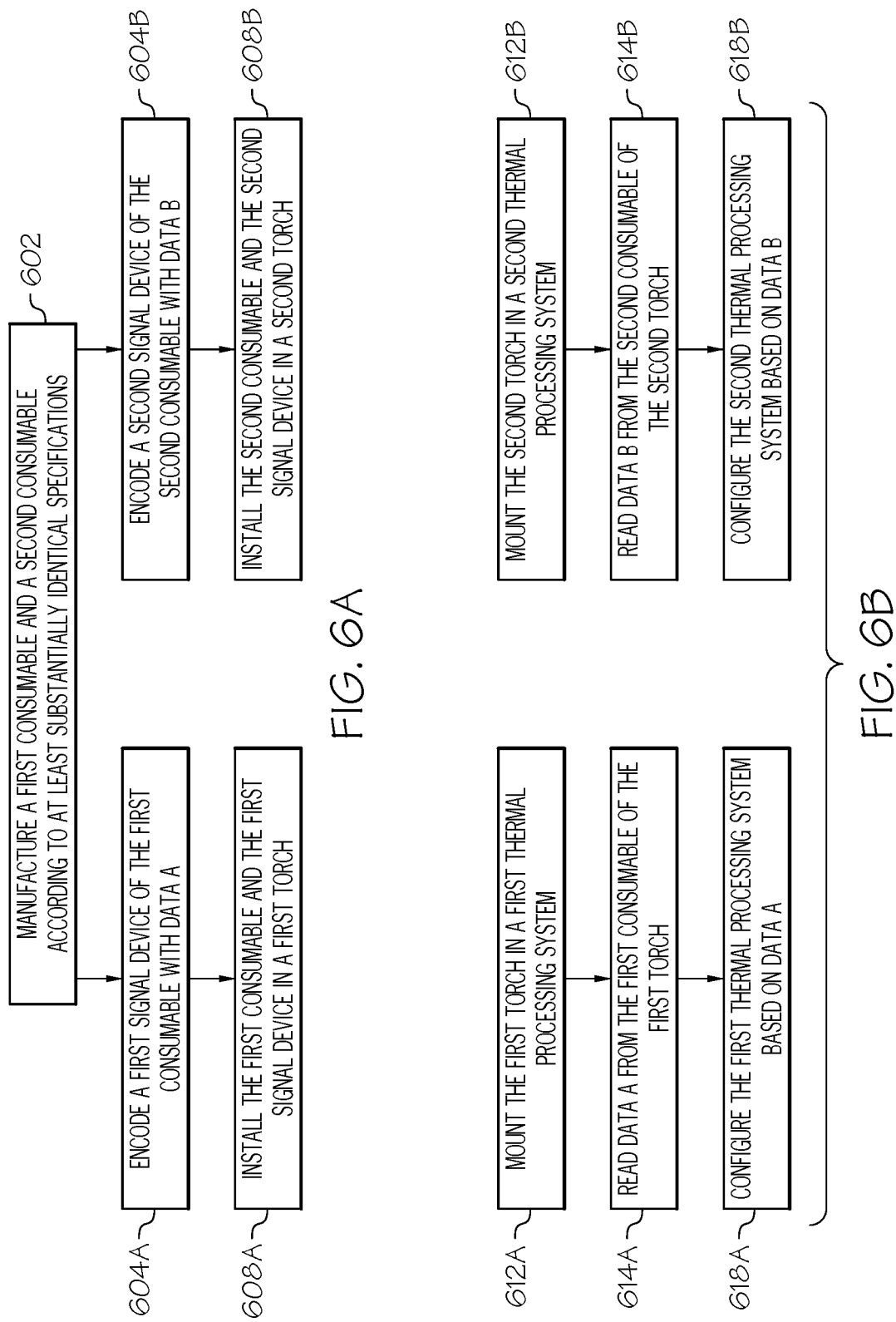
FIGS. 6A and 6B are flow charts illustrating exemplary operations of the communication network of FIG. 2.

FIGS. 6A and 6B are flow diagrams illustrating exemplary operations of the communication network 200 of FIG. 2. FIG. 6A illustrates an exemplary process for assembling thermal processing torches to include one or more consumables and signal devices (e.g., signal devices 202, 1202, 1304). Specifically, at step 602, two consumables are provided, with both consumables manufactured based on the same, or substantially the same, physical specifications. As a result, the two consumables have identical, or substantially identical, physical characteristics. A signal device 202, such as an RFID tag, can be coupled to each of the two consumables. Each signal device 202 can be located on or within the body of the corresponding consumable. At steps 604A and 604B, the signal device 202 for each consumable is encoded with data that can be used to determine system configuration settings for operating the corresponding torch. For example, one consumable can be encoded with data A while the other consumable can be encoded with data B, where data A and data B can be used to set one or more operating parameters of the respective thermal processing systems for operating the respective torches. In some embodiments, data A and data B include different serial numbers assigned to the respective consumables, which correlate to different values for setting the operating parameters of the thermal processing systems. Exemplary operating parameters associated with a thermal processing system include a height of the torch above a workpiece, a flow rate of a plasma gas through the torch and a cutting program for processing a workpiece using the torch. At steps 608A and 608B, each consumable manufactured at step 602, along with its respective signal devices 202, is assembled into a torch.

FIG. 6B illustrates an exemplary process for configuring two thermal processing systems, such as the thermal processing system 400 of FIG. 4 or the thermal processing system 500 of FIG. 5, in preparation for operating the two torches of FIG. 6A. At steps 612A and 612B, the torches are mounted into their respective thermal processing systems. With reference to the thermal process system 500, each torch can be mounted on the gantry 522 above the cutting table 520. At steps 614A and 614B, receivers 204 of the respective thermal processing systems are used to read the consumable data encoded in the signal devices 202 of the corresponding consumables. For example, at step 614A, a receiver 204 can read data A from the signal device 202 associated with the consumable of the first torch. At step 614B, another receiver 204 can read data B from the signal device 202 of the consumable of the second torch. At steps 618A and 618B, the receivers 204 of the thermal processing systems forward the data to the respective CNC's of the thermal processing systems, which set and/or adjust certain parameters of the corresponding thermal processing systems based on the received data to operate the corresponding torches. In some embodiments, the difference in the encoded data for the two consumables translates to different values for setting the operating parameters of the thermal processing systems, even though the consumables are physically identical to each other. In some embodiments, the thermal processing systems assign the same values to the operating parameters despite the dissimilarity in the encoded data.

In some embodiments, the method described with reference to FIG. 6B is implemented by a single thermal processing system, which is adapted to set operating parameters of the system for operating both torches either simultaneously or sequentially (i.e., one torch at a time).

In addition, as one in the art will fully appreciate, the invention described herein is not only applicable to plasma cutting devices, but also welding-type systems and other thermal processing systems. In some embodiments, the invention described herein is configured to operate with a variety of cutting technologies, including, but not limited to, plasma arc, laser, oxy fuel, and/or water-jet technologies. For example, the signal devices 202 can be coupled to one or more consumables configured to operate with one or more of the cutting technologies. The processor 206, using information transmitted by the signal devices 202, can determine whether the consumables installed in a torch are compatible with the specific cutting technology. In some embodiments, based on the selected cutting technology and the consumable information, the processor 206 can set or adjust operating parameters accordingly, such as the height of the cutting head above the workpiece, which can vary depending on the cutting technology and the consumables.

As an example, it is known to use water-jet systems that produce high pressure, high-velocity water jets for cutting various materials. These systems typically function by pressurizing water or another suitable fluid to a high pressure (e.g., up to 90,000 pounds per square inch or more) and force the fluid through a small nozzle orifice at high velocity to concentrate a large amount of energy on a small area. An abrasive jet is a type of water jet, which can include abrasive materials within the fluid jet for cutting harder materials. In some embodiments, the signal devices 202 are attached to consumables of a water-jet system, such as to a water-jet nozzle, an abrasive-jet nozzle, a mixing tube used to mix abrasive particles with fluid, and/or one or more valves and filters. A signal device 202 associated with an abrasive-jet nozzle can identify, for example, the types of abrasives suitable for use with the nozzle, the amount of pressure in the pressurized fluid that can be fed to the nozzle, and can also indicate other consumables that are suitable for use with a particular nozzle. Identification of particular consumable set combinations for a given water-jet system can also be performed, to verify compatibility with a given system or to limit operating conditions and parameters, such as maximum pressure or flow settings, or abrasive types or amounts.

In addition to using signal devices, in some aspects, thermal cutting systems (e.g., plasma arc cutting torches) can also include devices and features that enable detection (e.g., identification) of consumable components installed within the torch by directing a gas flow through the torch (e.g., through a feature of the consumable component) and detecting the manner in which the gas flow is altered as it flows through the torch and the consumable component. For example, in some embodiments, a gas flow is directed through features (e.g., flow-restriction elements including vent holes or gas exit orifices) arranged on a consumable (e.g., a nozzle). Based on observed changes in one or more fluid flow characteristics (e.g., gas pressure or flow rate) upstream and downstream of the flow-restriction elements, the size of the flow-restriction elements, and therefore the consumable itself, can be estimated (e.g., identified).

Figure 7:
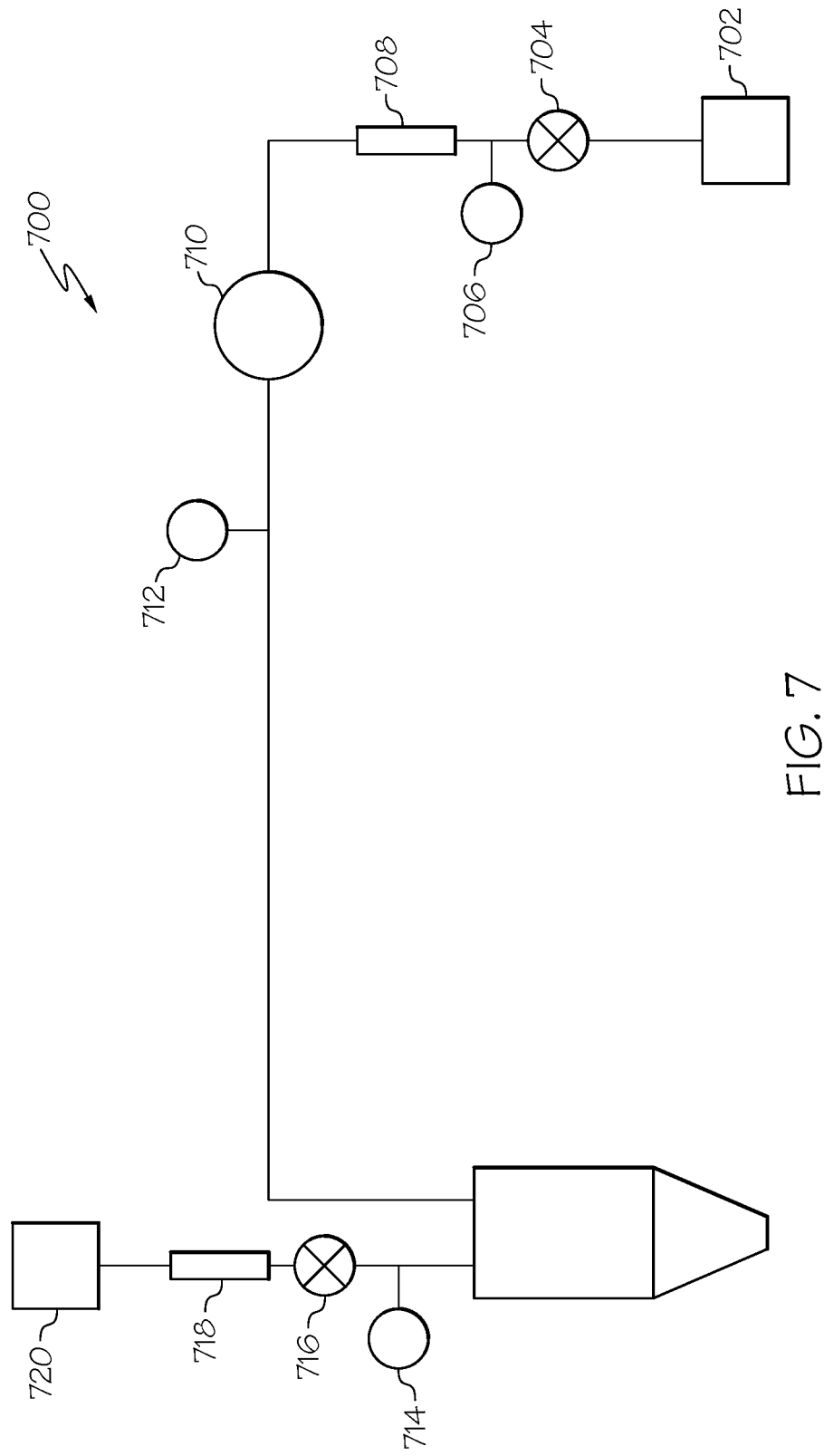
FIG. 7 is a schematic diagram of an exemplary torch gas delivery system including flow detection devices for identifying consumable components installed within a torch of the exemplary torch system.

To monitor gas flow through a torch system, the plasma arc torch system can include various gas flow detection devices, such as valves, pressure detectors, pressure regulators, gas flow meters, and other devices, which can all be fluidly connected to one another by gas tubing (e.g., semi-rigid tubing or flexible hose). Referring to FIG. 7, in some embodiments, a gas delivery system 700 for delivering gas to a torch (e.g., a torch head) 701 can include a gas supply (e.g., a compressed air tank or air compressor) 702, a supply off-valve 704, a supply pressure sensor 706, a supply gas flow detector 708, a supply gas pressure regulator 710, an off-valve pressure sensor 712, a torch plasma plenum pressure sensor 714, a vent off-valve 716, a torch vent gas flow detector 718, and a torch vent gas outlet 720. The gas supply 702 is typically fluidly connected to a torch system control unit (e.g., a power supply), which can house the supply off-valve 704, the supply pressure sensor 706, and the supply gas flow detector 708 (or the combined pressure compensated flow meter).

Some or all of these components can be in communication (e.g., wireless or wired communication) with a control unit (e.g., a processor within a torch system control unit) for monitoring and controlling the gas delivery system. Based on the configurations of these various components, gas flows can exit the torch from one or more different areas. For example, when a gas flow enters the torch head 701, a gas stream G1 is typically expelled out from the torch head (e.g., via the nozzle orifice). The gas stream G1 generally includes gas that would typically be used to generate a plasma stream and process a material. Additionally, when the gas flow G enters a flow restriction element, such as a distribution hole in a swirl ring 727 (shown in schematic form in FIG. 7), the gas flow G can be divided into multiple flow channels to form the gas stream G1 and a second gas stream G2. Additionally, for torch systems having a vent system, a second gas stream G2 can be directed by the swirl ring 727 (or a vent hole of a nozzle as mentioned below) and be emitted from the torch via the vent system based on whether or not certain components of the vent system (e.g., the vent off-valve 716) are opened or closed. In particular, in some embodiments, a gas stream G2 is emitted from the torch head when the vent off-valve 716 is open. The gas stream G2 can be caused by gas flowing within the various flow channels and orifices within the torch head (e.g., out of a vent hole in a consumable (e.g., a nozzle)). That is, as illustrated schematically, gas flow G can enter the torch via the off-valve hose and be divided into the gas stream G1 and the gas stream G2 within the torch head while the gas flows through the consumable components arranged within the torch (e.g., the swirl ring or the nozzle). For simplicity, the division of the gas within the torch into the gas stream G1 and gas stream G2 is schematically illustrated without showing the consumable components. Alternatively or additionally, in some cases, gas flow G is delivered to a nozzle from a swirl ring and a first portion (e.g., gas stream G1) can be directed to be expelled from the torch in the form of plasma gas and a second portion (e.g., gas stream G2) can be directed through the nozzle through a vent region (as discussed below with respect to FIG. 8), on to the flow restriction element, and out of the torch through a vent passage.

The various gas delivery components can be arranged in any number of various different configurations relative to one another as part of the torch system. For example, in some embodiments, the gas supply 702 is fluidly connected (e.g., via rigid gas lines) to a torch system control unit. The supply off-valve 704, supply pressure sensor 706, and supply gas flow detector 708 can all be housed within the torch system control unit. The supply gas pressure regulator 710 and the off-valve pressure sensor 712 can be located separately from the control unit, for example, disposed on or within a torch gas supply lead line connected to the control unit for providing gas and electricity to a torch. In some embodiments, the off-valve pressure sensor 712 can be disposed closer to the torch. In some embodiments, the supply gas pressure regulator 710 and the off-valve pressure sensor 712 are arranged near (e.g., within 10 feet of (e.g., within 6 feet of)) a torch connected to the lead line at an end opposite the control unit. As discussed below, by arranging these components closer to the torch 701, gas pressure controlled and monitored within the lead line by the supply gas pressure regulator 710 and the off-valve pressure sensor 712 can more closely represent the actual pressure delivered to the torch.

As illustrated, these various components can be connected to one another by any of various structurally and chemically suitable tubes or hoses. Examples of suitable hoses include flexible hoses (e.g., flexible plastic or rubber hoses), rigid tubing (e.g., rigid metal, plastic or composite tubing), or tubing made of a combination of flexible and rigid layers, such as a flexible hosing having a braided outer component (e.g., a braided sheath).

In some embodiments, a system (e.g., the system 700) for identifying a consumable component, such as a nozzle or a swirl ring, of a thermal processing torch includes a flow-restriction element (e.g., a nozzle orifice, a metering hole of a nozzle, a vent hole of a nozzle, or a gas distribution hole of a swirl ring) that is associated with the consumable and is configured to receive a gas flow therethrough, a first sensor (e.g., the off-valve pressure sensor 712) to determine the pressure of the gas flow through the flow-restriction element at a location upstream relative to the flow-restriction element, a second pressure determining device to establish a pressure of the gas flow through the flow-restriction element at a location downstream from the flow-restriction element, a flow meter (e.g., the vent gas flow detector 718) for measuring a flow rate of the gas flow passing through the flow-restriction element, and a control unit (e.g., processor) that uses the first pressure, the second pressure, and the flow rate to identify an operating characteristic of the consumable.

In some cases, the second pressure determining device can include a pressure sensor the vent pressure sensor 714) fluidly connected to the torch vent, which can measure the pressure within the plasma plenum, for example, when the vent valve is closed. Alternatively or additionally, in some cases, the second pressure determining device includes a vent valve (e.g., the vent off-valve 716) that is configured to expose the location downstream from the flow-restriction element (e.g., the torch vent passage) to the atmosphere to set the pressure to atmospheric pressure. That is, in some cases, the second pressure is not explicitly measured by one of the components of the gas delivery system, but is rather set to atmospheric pressure (e.g., 0 psig). As discussed below, such a configuration can permit identification of a consumable using only one pressure sensor when the region downstream of the flow restriction element can be exposed to atmospheric pressure, for example, by opening the vent valve 716.

Additionally, as described above, in some embodiments, the system can include at least one radio-frequency identification (RFID) tag affixed on, in or in communication with the consumable for identifying the consumable.

Figure 8:
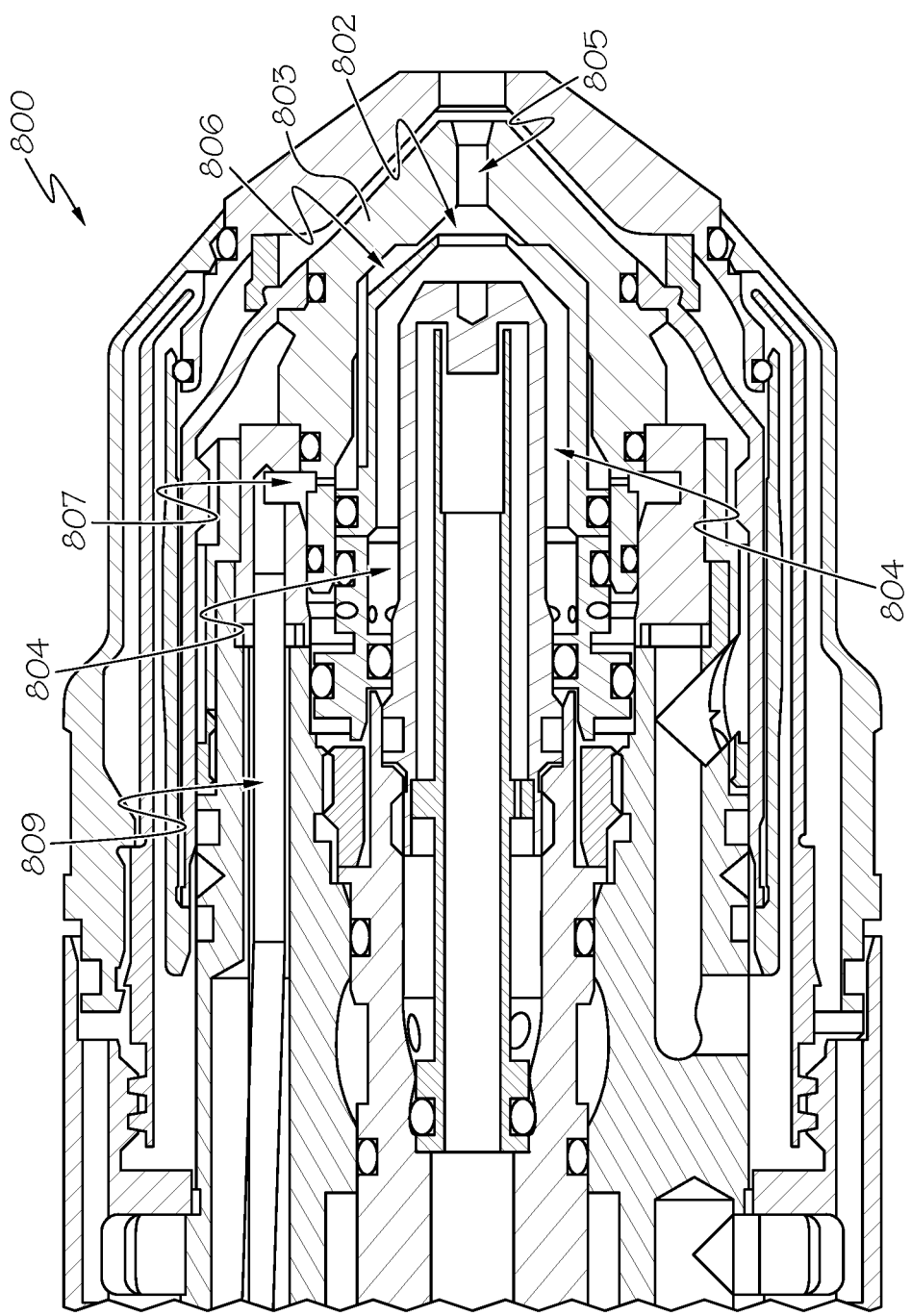
FIG. 8 is a cross-sectional view of an exemplary plasma arc torch illustrating geometric features within the plasma arc torch that can be utilized for identifying consumable components installed within a torch.

To measure and control gas pressure within various gas passageways of a torch head, the gas passageways can be fluidly connected to gas flow measurement devices (e.g., gas pressure or flow sensors). Alternatively, in some cases, gas flow measurement devices can be arranged within the torch head. Referring to FIG. 8, in some embodiments, a torch 800 includes a plasma chamber 802 located at an end of a consumable (e.g., nozzle) 803 having one or more flow-restriction elements (e.g., a nozzle exit orifice 805 or a nozzle vent hole 807). The plasma chamber 802 can be fluidly connected to a pressure sensor (e.g., the torch plasma plenum pressure sensor 714) so that gas pressure within the plasma chamber 802 and/or the plasma plenum 806 can be monitored and measured. In some cases, the plasma chamber 802 is fluidly connected to the pressure sensor via the plasma plenum 806 fluidly connected to a vent line 809. During use, gas (e.g., plasma cutting gas) can be delivered from the gas delivery system 700 to the gas supply region 804, and then be directed to the plasma plenum 806 (towards the vent hole 807 and vent system) and/or be directed through orifice 805 expelled out of the torch. In some cases, the consumable installed within the torch can be identified by directing and monitoring gas flow through these flow-restriction elements (e.g., the vent hole 807 and/or the orifice 805).

As discussed herein, the gas flow properties observed at various locations within gas delivery systems can be used to identify the consumable installed in the torch. For example, torch gas delivery systems (e.g., the torch gas delivery system 700) can be used to implement one or more various torch consumable component identification methods by manipulating and monitoring gas flow within the torch system. In some embodiments, a gas flow (e.g., the gas flow G) can be provided to the torch and consumables can be detected (e.g., identified) by first closing a torch vent valve (e.g., the vent off-valve 716) to limit gas from flowing out the torch vent system (e.g., through the plasma plenum 806, nozzle vent hole 807, and vent line 809). With the vent closed, pressure supplied to the torch can be adjusted (e.g., via the gas regulator 710) to achieve a predetermined pressure within the plasma plenum (e.g., 4 psig). Specifically, with the vent off-valve closed, gas pressure begins to build within the torch plasma plenum region and the vent passage line so that gas substantially only exits through the torch exit orifice (i.e., in the form of the gas stream G1). In some cases, once the predetermined pressure is achieved within the plasma plenum region and the vent passage line, the consumable can be identified. For example, in some cases, the gas flow provided to the torch (e.g., as measured by the supply gas flow detector 708) can be measured. As another example, the pressure and gas flow rate of the gas flow directed through the consumable (e.g., the flow rate upstream of the consumable, such as the flow rate provided to the swirl ring) can be monitored and measured. The measured gas flow rates and pressures can be compared to known (or expected) values for different torch consumables to indicate the type of consumable installed in the torch. For example, measured values can be compared to a lookup table of previously measured values for various particular consumables. Alternatively or additionally, in some cases, the pressure of gas flow upstream of the torch that is needed to achieve the predetermined pressure in the plasma plenum (e.g., as measured by the off-valve pressure sensor 712) can be measured and used to identify the consumable installed in the torch. For example, the measured gas pressure can be compared to expected pressure values for different consumables.

Alternatively or additionally, in some embodiments, once the predetermined gas pressure is achieved, the vent can be opened (e.g., by opening the vent off-valve 716) to expose the flow region downstream of the flow restriction (e.g., the vent passage line) to atmospheric pressure so that gas can exit the torch through the torch head (gas stream G1), as well as through the vent (to form gas stream G2) and the flow characteristics can be observed to identify the consumable. For example, with the gas stream G1 and the gas stream G2 flowing from the torch, the pressure and flow rate of gas directed to the consumable, as well as the gas flow through the vent can be measured. Similarly, the measured pressure and gas flow values can be compared to typical expected values associated with certain consumables to predict what type of consumable is installed in the torch. More specifically, when the vent off-valve is opened, some gas will flow from the plasma plenum, through the nozzle vent hole, and out of the vent (i.e., the gas stream G2). While the vent is then opened to atmospheric pressure, it is expected that the plasma plenum pressure will not significantly drop (e.g., will not significantly drop below the predetermined pressure) so that there will be a certain pressure upstream of the vent hole (e.g., in the plasma plenum, such as the predetermined pressure), a different (e.g., atmospheric) pressure downstream of the vent hole, and a gas flow therethrough. In some cases, the gas flow through the vent hole can be measured by vent gas flow detector 718 or by supply gas flow detector 708. In this manner, the pressures upstream and downstream of the flow-restriction element (e.g., the nozzle vent hole) and the gas flow therethrough can be measured and used to identify the consumable. For example, the measured values can be compared to example expected values (e.g., lookup tables of empirical data) associated with different consumables to identify the consumable. While certain embodiments of using flow characteristics to identify consumables have been described, other embodiments are possible.

Figure 22:
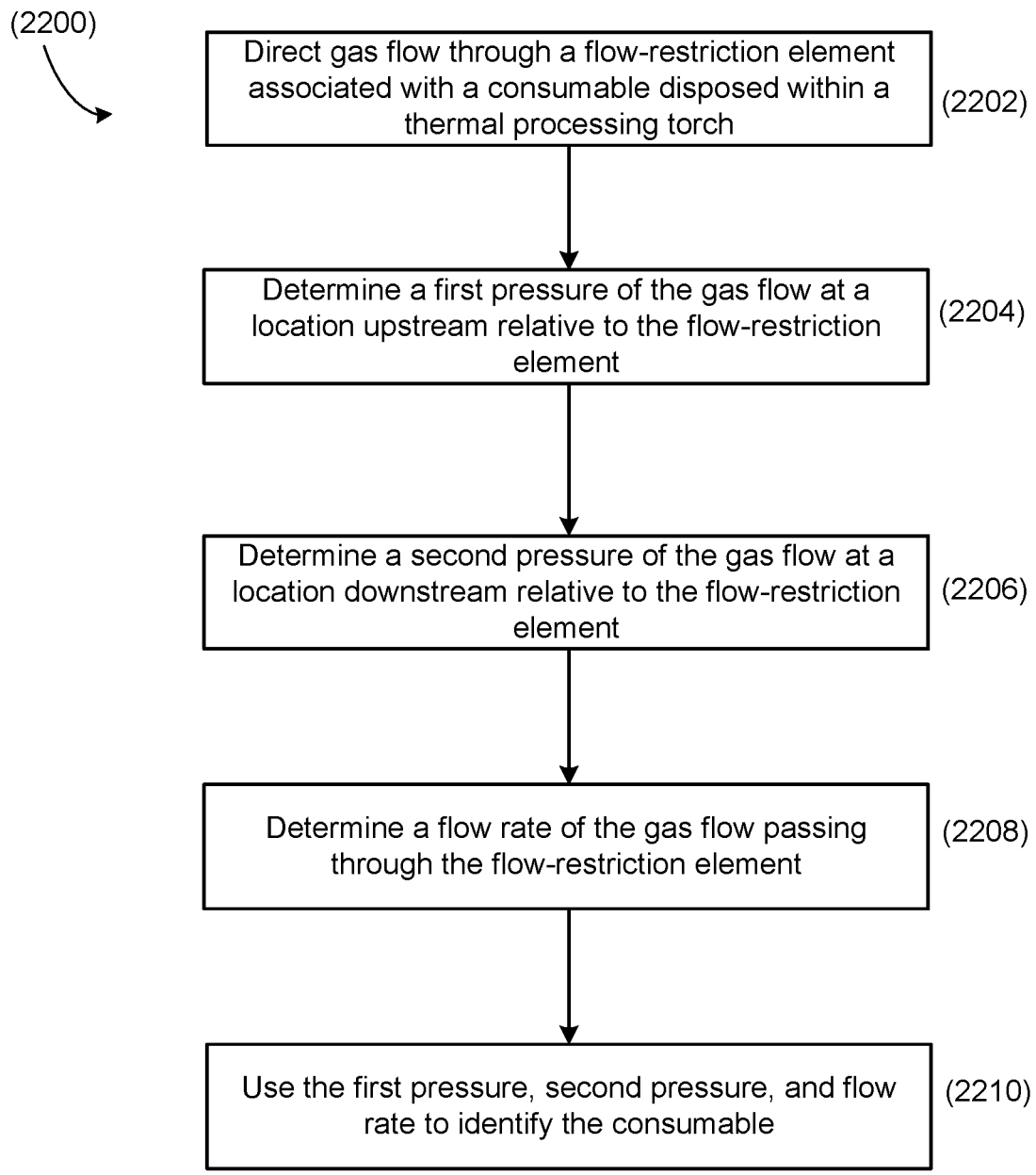
FIG. 22 is a flow chart illustrating an exemplary method for identifying a consumable component of a thermal processing torch by measuring gas flow changes through a feature of the consumable component.

Referring to FIG. 22, in some aspects, an exemplary method (2200) for identifying a consumable of a thermal processing torch includes first directing a gas flow through a flow-restriction element associated with the consumable (e.g., a nozzle or a swirl ring) disposed within the thermal processing torch (2202). For example, in some embodiments, gas is delivered to a torch head from a gas supply (e.g., the gas supply 702) via a gas delivery system (e.g., the regulator 710). The gas can be delivered to the torch head and directed through the flow-restriction element, such as an orifice associated with the consumable (e.g., an exit orifice of a nozzle (e.g., a plasma exit orifice), a gas distribution hole of a swirl ring, or another vent or metering hole of the consumable). In some embodiments, different flow-restriction elements can be used to identify different types of consumables. For example, when using a nozzle, the flow-restriction element can include an identifying vent hole or the plasma exit orifice of the nozzle and when using a shield, the flow-restriction element can include the vent holes of the shield. In some cases, a gas distribution hole can be used to identify a swirl ring.

In some embodiments, the flow-restriction element comprises an absence of a hole, for example, an absence of a vent hole on a nozzle. For example, a nozzle may not include an identifying vent hole such that when a vent valve is open, which would be expected to cause gas flow to begin flowing from the vent hole of the nozzle and out of the vent, no gas flow is detected by the vent flow detector. The lack of a detected vent flow when the vent valve is open would therefore indicate that a consumable without a vent hole is installed in the torch.

Next, a first pressure can be determined (2204). For example, a pressure of the gas flow at a location upstream relative to the flow-restriction element can be determined. In some embodiments, the vent off-valve 716 can be closed to allow a pressure to build within the vent region and the plasma plenum, which can also cause the torch to substantially only produce the gas stream G1. With the vent off-valve 716 closed, the first pressure can be manually adjusted, for example using the pressure regulator 710, to set the pressure within the vent passage and the plasma plenum to a predetermined value. In some cases, the predetermined pressure value can be about 4 psig or another predetermined pressure based on the equipment's capabilities. Therefore, the pressure (e.g., the first pressure) of the gas being delivered to the torch head can be measured once the predetermined plasma plenum pressure is established. In some cases, the off-valve pressure sensor 712 is used to determine the pressure of gas directed to the flow-restriction element once the predetermined plasma plenum pressure is established. Alternatively, in some embodiments, the vent off-valve 716 can be opened to vent the region downstream of the flow restriction, such as downstream of a vent hole of a nozzle to atmospheric pressure, and the first pressure can be determined (e.g., measured) upstream using a sensor (e.g., an off-valve pressure sensor 712).

A second pressure is also determined (2206). In particular, the pressure of the gas that has passed through the flow-restriction element and exits the torch head can be measured. For example, as discussed above, in some cases, the vent off-valve can be closed so that a pressure (e.g., the second pressure) is generated within the vent region and the plasma plenum. In particular, the second pressure can be determined by manually setting the second, downstream pressure (i.e., within the non-vented plasma plenum) to a predetermined pressure (e.g., 4 psig), for example, by adjusting the pressure regulator 710. Alternatively, in some embodiments, the second pressure is determined by setting the downstream pressure (e.g., the pressure within the vent region) to another known pressure (e.g., atmospheric pressure), for example, by opening the vent off-valve 716 to open the vent passage to the atmosphere.

With the first and second pressures determined, a flow rate of the gas flow passing through the flow-restriction element can be determined (2208). For example, in some embodiments, a flow rate of gas provided to the torch can be measured, for example, using the flow detector 708. Alternatively or additionally, a flow rate of gas exiting the torch head through the vent (i.e., the gas stream G2) can be measured, for example, using the vent flow detector 718.

Then, using the detected first pressure, second pressure, and flow rate, the consumable can be identified (2210). For example, once the gas pressures upstream and downstream of the flow-restriction element are determined and the flow rate of gas exiting the torch through the vent off-valve (i.e., the gas stream G2) is determined, the consumable can be identified (estimated) by accessing a look-up table. In some cases, a look-up table can include a listing of multiple torch consumables that are defined by their respective expected flow characteristics that would be produced using the identification methods described herein. In some cases, the look-up table can be electronically stored in a memory device of the torch control unit and accessed by the processor to identify the consumable (e.g., automatically identify). Briefly referring to FIG. 25, in some embodiments, a lookup table 2500 can include expected values for plasma gas flow rates (e.g., as measured by the flow detector 708), plasma gas pressure (e.g., as measured by the off-valve pressure sensor 712), vent gas flow rates (e.g., as measured by the vent flow detector 718), and plasma plenum pressure (e.g., as measured by the plenum pressure sensor 714). Example values are provided for a variety of different consumables (e.g., nozzles), which can be described according to a cutting process in which they are used (e.g., 400 amp (A) mild steel (MS), 260 A MS, 200 A MS, 130 A MS, 80 A MS, 50 A MS, and 30 A MS in the example chart listed). Using the lookup table 2500 and the example pressure and flow detection methods described herein, the type of consumable installed in the torch can be determined (estimated).

In some embodiments, the methods described herein with respect to FIGS. 7, 8 and 22-25 (e.g., the method 2200, the method 2300, and the method 2400) can also include using a flow coefficient equation, which is used to describe the relationship between the pressure drop across an orifice and the corresponding flow rate through the orifice, to determine a dimension (e.g., a characteristic dimension, such as average width (e.g., average diameter)) of the orifice based the first pressure, the second pressure and the flow rate. For example, by knowing the pressure of fluid entering the orifice (e.g., the first pressure), the pressure of the fluid exiting the orifice (e.g., the second pressure), and the flow rate of fluid passing through the orifice, the flow coefficient can be calculated using commonly used flow coefficient equations. For example, alternatively or in addition to using the determined first pressure, second pressure, and flow rate to reference a look-up table to identify a consumable, in some embodiments, a control unit (e.g., a processor) can use the flow coefficient equations to determine what type of consumable is installed in the torch, for example, based on calculating and comparing the estimated flow-restriction element (e.g., orifice) dimension to known or expected flow-restriction element (e.g., orifice) sizes for different consumable types.

Figure 23:
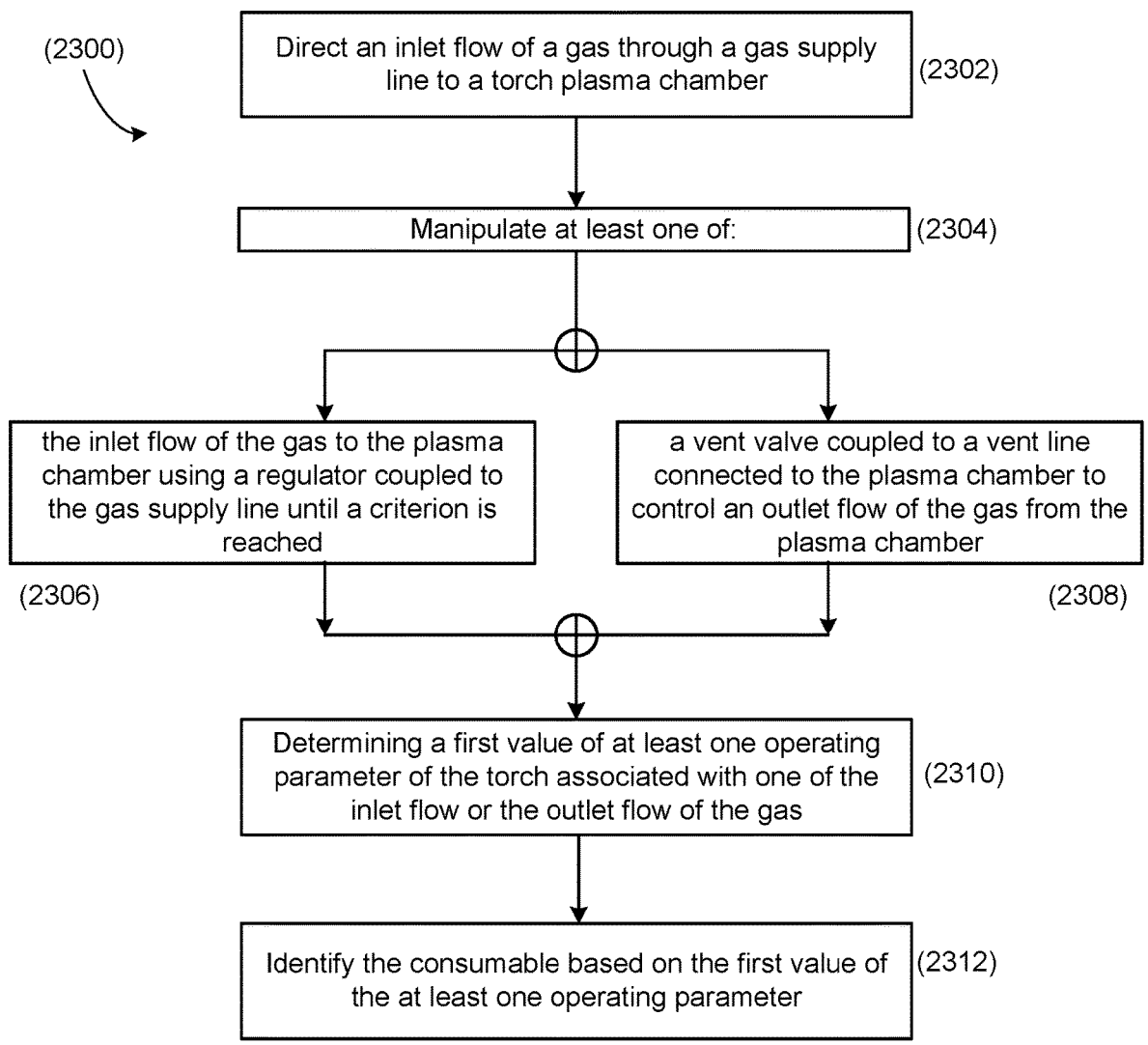
FIG. 23 is a flow chart illustrating another exemplary method for identifying a consumable component of a thermal processing torch by measuring gas flow changes through a feature of the consumable component.

Referring to FIG. 23, other methods, such as example method (2300) can also be implemented to identify a consumable of a thermal processing torch having a plasma chamber defined by an electrode and a nozzle. As described below, various methods can include adjusting gas flow through the consumable and monitoring the effect of the adjustments on flow characteristics observed upstream and/or downstream of the consumable.

For example, first, an inlet flow of a gas can be directed through a gas supply line to the plasma chamber (2302). For example, gas can be delivered to a gas delivery system (e.g., the system 700) from a gas supply (e.g., the gas supply 702) through a gas supply line (e.g., a lead line) to a plasma torch.

With gas being delivered, at least one of several gas flow characteristics can be manipulated (e.g., adjusted) (2304). For example, in some embodiments, the inlet flow of the gas to the plasma chamber can be manipulated using a pressure regulator (e.g., the regulator 710) coupled to the gas supply line until a criterion, such as a threshold pressure including a threshold plasma pressure is reached (2306). That is, if a vent valve (e.g., the vent valve 716) is already closed (based on use of the torch), the regulator can be adjusted until the criterion (e.g., threshold plasma pressure value) is established. The threshold plasma pressure value can be chosen based on the capabilities of the gas delivery system. For example, in some cases, the threshold pressure value is about 4.0 pound per square inch (psig).

Alternatively or additionally, a vent valve (e.g., the vent off-valve 716) coupled to a vent line connected to the plasma chamber can be manipulated to control an outlet flow of the gas from the plasma chamber (2308). That is, in some embodiments, a previously open vent valve can be manipulated (e.g., closed) to control the outlet flow of the gas from the plasma chamber to limit or prevent the outlet flow of the gas from the plasma chamber via the vent system prior to the criterion being reached. For example, the vent valve can be closed to limit the outlet flow of the gas from the plasma chamber (e.g., substantially eliminating the gas stream G2) so that the plasma plenum pressure can build to the threshold plasma plenum pressure value. Alternatively or additionally, in some embodiments, the vent valve can be opened to vent the vent region downstream of the flow restriction to establish the downstream pressure to be atmospheric pressure.

Next, a first value of an operating parameter of the torch associated with one of the inlet flow or the outlet flow of the gas can be determined (2310). The operating parameter can include any of various gas flow properties, such as a pressure or flow rate into or out of the consumable. For example, in some embodiments, the at least one operating parameter can include a supply pressure of the inlet flow (e.g., as measured by the supply pressure sensor 706), a flow rate of the inlet flow (e.g., as measured by the supply flow detector 708), an off-valve pressure of the inlet flow (e.g., as measured by the off-valve pressure sensor 712), or a flow rate of an outlet flow (e.g., the flow rate measured at the vent line (e.g., by the torch vent gas flow detector 718) or the plasma gas flow rate). In some cases, the supply pressure of the inlet flow or the flow rate of the inlet flow can be measured (e.g., measured using the supply pressure sensor 706) between a gas supply valve and the regulator (for example, when the regulator is positioned downstream from the gas supply valve) coupled to the gas supply line. In some embodiments, the off-valve pressure of the inlet flow is measured by a pressure transducer, such as the off-valve pressure sensor 712 positioned downstream from the regulator on the gas supply line.

Then, based on the first value of the operating parameter, the consumable can be identified (2312). For example, a lookup table that correlates one or more consumables with respective values of one or more operating parameters can be used to identify the consumable based on the first value of the operating parameter. For example, the lookup table 2500 as discussed above can be used to identify a consumable installed in the torch.

In some cases, the method 2300 also includes manipulating (e.g., opening) the vent valve to permit the outlet flow of the gas from the plasma chamber through the vent line after the criterion is reached (e.g., to produce the gas stream G2) and determining a second value of the operating parameter. Then, the first value and the second value of the observed operating parameter can be used to identify the consumable. For example, in some embodiments, the vent valve can be first closed so that substantially only the gas stream G1 exits the torch and pressure can build within the plasma plenum to the threshold pressure value (e.g., 4 psig) by adjusting a supply pressure regulator (e.g., regulator 710). With the criterion reached (i.e., the threshold pressure value reached within the vent passage line and the plasma plenum) and the first value of the plasma gas flow or the off-valve pressure (e.g., as measured by the pressure sensor 712) determined, the vent valve can be manipulated (e.g., partially or fully opened) so that the downstream vent region becomes exposed to atmospheric pressure and thereby produces the gas stream G2.

With the vent valve opened, a second value of the operating parameter can be measured. That is, when the vent valve is opened and both the gas streams G1 and G2 are being expelled from the torch, the various operating parameters (e.g., the supply pressure of the inlet flow, the flow rate of the inlet flow, the off-valve pressure of the inlet flow, or the flow rate of an outlet flow (e.g., G1 and/or G2)) are expected to change as a result of the additional gas flows. Therefore, the second value of the operating parameter and/or the difference or other change between the first and second values can be used to identify the consumable disposed within the torch, for example, using a lookup table.

In some cases, the consumable can be a nozzle having at least one metering hole of a unique dimension for a given nozzle design. That is, different nozzle designs (e.g., nozzles designed for different material types or current values) can include differently sized metering holes, which can be determined using these methods. For example, a particular product line of nozzle, for example an entire line of gouging nozzles, piercing nozzles, or fine cut nozzles can all include the same configuration (e.g., the same size) metering holes.

Figure 24:
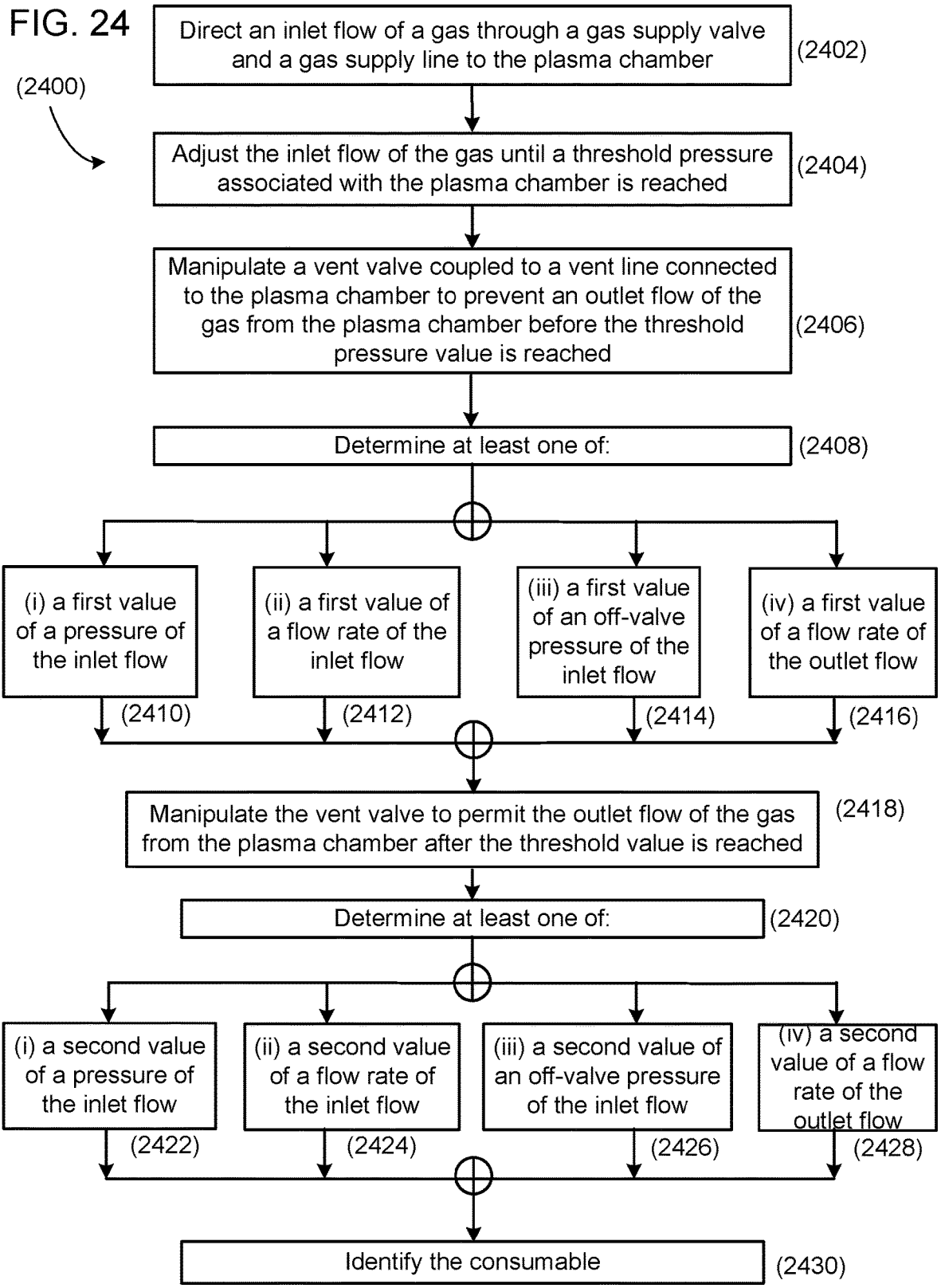
FIG. 24 is a flow chart illustrating another exemplary method for identifying a consumable component of a thermal processing torch by measuring gas flow changes through a feature of the consumable component.

Additionally, in some aspects, another example method (2400), as shown in FIG. 24, can be implemented for identifying a consumable, such as a nozzle or a swirl ring, of a thermal processing torch having a plasma chamber defined by an electrode and a nozzle.

First, an inlet flow of a gas can be directed through a gas supply valve (e.g., the supply off-valve 704) and a gas supply line to the plasma chamber of the torch (2402). For example, in some embodiments, the gas supply line can include a regulator (e.g., the regulator 710) and a plasma off-valve (e.g., the off-valve 704) coupled thereto to deliver gas to the torch.

Next, the inlet flow of the gas can be adjusted until a threshold pressure associated with the plasma chamber is readied (2404). For example, the regulator can be adjusted to change the pressure within the plasma chamber. In some embodiments, the threshold pressure is a pressure of about 4.0 pound per square inch (psig) in the plasma chamber. As discussed above, a vent valve (e.g., the vent off valve 716) coupled to a vent line connected to the plasma chamber can be manipulated (e.g., adjusted) to limit or prevent an outlet flow of the gas from the plasma chamber before the threshold pressure value is reached (2406). For example, in some cases, the vent valve can be closed (eliminating the gas stream G2) so that pressure can build within the plasma plenum and the threshold can be reached.

Once the threshold pressure is reached, a flow characteristic can be determined (2408). For example, in some embodiments, at least one of: (i) a first value of a pressure of the inlet flow (e.g., as measured by the pressure sensor 706) (2410); (ii) a first value of a flow rate of the inlet flow (e.g., as measured by flow detector 708) (2412); (iii) a first value of an off-valve pressure of the inlet flow (e.g., as measured by the off-valve pressure sensor 712) (2414); or (iv) a first value of a flow rate of the outlet flow (e.g., as measured by the vent flow detector 718) (2416) can be determined.

After the first value of the flow characteristic is determined, the vent valve can be adjusted (e.g., manipulated) to permit the outlet flow of the gas from the plasma chamber (2418). For example, in some embodiments, after the threshold value has been reached and the flow characteristic has been measured, the vent valve can be opened (e.g., partially or fully opened) to permit an outlet flow of gas from the plasma chamber (e.g., through the flow restriction element and downstream of the flow restriction element out of the vent passage). That is, opening the vent valve can cause the torch to begin expelling the gas stream G2 from the torch. In some cases, adjusting (e.g., manipulating) the vent valve to permit the outlet flow of the gas from the plasma chamber is performed prior to ignition of the torch.

The opening of the vent valve is expected to alter the flow characteristics of the torch system based on some of the gas entering the torch being expelled as the gas stream G2. Therefore, with the outlet flow of gas from the plasma chamber, at least one of various flow characteristics can be determined (e.g., re-measured) (2420). For example, at least one of: (i) a second value of the pressure of the inlet flow (2422), (ii) a second value of the flow rate of the inlet flow (2424), (iii) a second value of the off-value pressure of the inlet flow (2426), or (iv) a second value of the flow rate of the outlet flow (2428) can be determined.

Then, using the first and/or second values of the measured flow characteristics, the consumable can be identified (2430). For example, the measured flow characteristics can be referenced to a lookup table (e.g., the lookup table 2500, as shown in FIG. 25).

Additionally, one or more of the steps or features of the various methods described herein can be implemented in a variety of combinations with one another for identifying torch consumables.

While many of the systems and methods herein with respect to FIGS. 7, 8 and 22-25 (e.g., the method 2200, the method 2300, and the method 2400) have generally been described and illustrated as being used and implemented primarily in association with plasma arc torches, they can also be implemented with other material processing systems, such as water-jet systems. For example, during use, fluids, such as gases or liquids (e.g., water) can be directed to one or more components of a water-jet cutting system, such as a water-jet orifice, a mixing tube used to mix abrasive particles with fluid, and/or one or more high pressure cylinders or pump components to generate the high velocity water flow used to cut material. As with the plasma arc torches discussed above, the fluids can be directed through one or more of these components in accordance with the methods described herein to identify the consumables installed in the water-jet system. For example, fluid pressure and/or flow rate can be monitored upstream and downstream of the water-jet orifice to identify the type of orifice installed in the system.

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification. The present application includes such modifications and is limited only by the scope of the claims.

What is claimed:

1. A plasma processing system, comprising:
   a torch comprising a torch consumable;
   a fluid delivery system including a supply gas pressure regulator and a supply pressure sensor configured to sense a supply pressure of an inlet flow to the supply gas pressure regulator;
   a gas supply line supplying gas from the gas pressure regulator to the torch; and
   a controller comprising a processor and a memory, wherein the controller is operatively connected to the gas pressure regulator and the supply pressure sensor to receive a pressure signal from the supply pressure sensor and to provide a control signal to the gas pressure regulator to set an output pressure of the gas pressure regulator,
   wherein the memory stores a lookup table establishing a correlation between supply pressures to the supply gas pressure regulator and respective levels of the control signal for one or more consumables, wherein the controller is configured to identify the consumable based on the supply pressure to the gas pressure regulator and the control signal provided to the gas pressure regulator.

2. The plasma processing system of claim 1, further comprising an output pressure sensor downstream of the gas pressure regulator and configured to sense the output pressure of the gas pressure regulator.

3. The plasma processing system of claim 2, wherein the controller is configured to identify the consumable based on one or more of the supply pressure to the gas pressure regulator and the output pressure of the gas pressure regulator.

4. The plasma processing system of claim 3, wherein the controller is configured to identify the consumable by comparing at least one of (i) the sensed supply pressure to expected supply pressures associated with known consumables or (ii) the sensed output pressure to expected output pressures associated with known consumables.

5. The plasma processing system of claim 1, wherein the consumable is a swirl ring.

6. The plasma processing system of claim 1, wherein the consumable includes at least one of a swirl ring or a nozzle.

7. A plasma processing system, comprising:
   a torch comprising a consumable installed on the torch;
   a fluid delivery system including a supply gas pressure regulator and a supply pressure sensor;
   a gas conduit supplying gas from the gas pressure regulator to the torch;
   a controller operatively connected to the gas pressure regulator and the supply pressure sensor to receive a pressure signal from the pressure sensor and to provide a control signal to the gas pressure regulator to set an output pressure, and
   a memory, accessible by the controller, configured to store consumable parameters including a valve position,
   wherein the controller is configured to identify the consumable based on the consumable parameters including the valve position.

8. The plasma processing system of claim 1, further comprising an output pressure sensor downstream of the gas pressure regulator and configured to sense the output pressure of the gas pressure regulator.

9. The plasma processing system of claim 7, wherein the consumable is a swirl ring.

10. The plasma processing system of claim 7, wherein the consumable includes at least one of a swirl ring or a nozzle.

11. A plasma processing system, comprising:
    a torch comprising a consumable;
    a fluid delivery system including a regulator means and a sensing means for sensing a supply pressure of an inlet flow supplied to the regulator means;
    a means for supplying gas from the regulator means to the torch; and
    a control means comprising a memory means, wherein the controller means is operatively connected to the regulator means and sensing means to provide a control signal to the regulator means for setting an output pressure based on a pressure signal received from the sensing means,
    wherein the memory means stores a lookup table establishing a correlation between supply pressures to the supply gas pressure regulator and respective levels of the control signal for one or more consumables, wherein the control means is configured to identify the consumable based on the supply pressure and the control signal.

12. The plasma processing system of claim 11, further comprising a second sensing means downstream of the regulator means and configured to sense the output pressure.

13. The plasma processing system of claim 12, wherein the controller means is configured to identify the consumable by comparing at least one of (i) the sensed supply pressure to expected supply pressures associated with known consumables or (ii) the sensed output pressure to expected output pressures associated with known consumables.

14. The plasma processing system of claim 11, wherein the consumable is one of a swirl ring or a nozzle.

* * * * *